US012795534B2

(12) United States Patent
Lee et al.
(10) Patent No.: US 12,795,534 B2
(45) Date of Patent: Nov. 10, 2026

(54) METHOD AND APPARATUS FOR ENERGY SAVING IN WIRELESS COMMUNICATION SYSTEM

(71) Applicant: Samsung Electronics Co., Ltd., Gyeonggi-do (KR)

(72) Inventors: Jaewon Lee, Gyeonggi-do (KR); Youngbum Kim, Gyeonggi-do (KR); Younsun Kim, Gyeonggi-do (KR); Junyung Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/636,779

(22) Filed: Apr. 16, 2024

(65) Prior Publication Data

US 2024/0357487 A1 Oct. 24, 2024

(30) Foreign Application Priority Data

Apr. 17, 2023 (KR) ........................ 10-2023-0050297

(51) Int. Cl.

| | |
|---|---|
| ***H04W 52/02*** | (2009.01) |
| ***H04W 8/22*** | (2009.01) |
| ***H04W 72/1273*** | (2023.01) |
| ***H04W 72/232*** | (2023.01) |

(52) U.S. Cl.

CPC ......... *H04W 52/0206* (2013.01); *H04W 8/22* (2013.01); *H04W 72/1273* (2013.01); *H04W 72/232* (2023.01)

(58) Field of Classification Search

None

See application file for complete search history.

(56) References Cited

U.S. PATENT DOCUMENTS

| | | | | |
|---|---|---|---|---|
| 2012/0275335 | A1* | 11/2012 | Huang | H04W 52/0206 370/252 |
| 2018/0368112 | A1* | 12/2018 | Sebeni | H04W 76/28 |
| 2020/0267648 | A1 | 8/2020 | Kim et al. | |
| 2021/0144808 | A1* | 5/2021 | Zhang | H04W 72/1273 |
| 2021/0273771 | A1 | 9/2021 | Takeda et al. | |
| 2022/0046522 | A1* | 2/2022 | Kim | H04W 48/16 |
| 2022/0103232 | A1* | 3/2022 | Zhou | H04W 72/046 |
| 2022/0286966 | A1 | 9/2022 | Zhao et al. | |
| 2022/0303080 | A1* | 9/2022 | Sun | H04L 1/1829 |

(Continued)

FOREIGN PATENT DOCUMENTS

| | | |
|---|---|---|
| CN | 115915358 | 4/2023 |
| KR | 10-2024-0018330 | 2/2024 |

OTHER PUBLICATIONS

ETSI TS 138 213 V16.4.0 5G; NR; Physical Layer Procedures for Control (3GPP TS 38.213 version 16.4.0 Release 16) (Year: 2021).*

(Continued)

*Primary Examiner* — Luna Weissberger

(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. The disclosure provides a method performed by a terminal in a wireless communication system, including receiving, from a base station while operating in a normal mode, an indicator indicating a base station energy saving mode, and operating in the base station energy saving mode based on the indicator.

18 Claims, 25 Drawing Sheets

(56) References Cited

U.S. PATENT DOCUMENTS

| | | | | |
|---|---|---|---|---|
| 2022/0361279 | A1* | 11/2022 | Chin | H04W 24/04 |
| 2023/0066679 | A1 | 3/2023 | Xu et al. | |
| 2023/0262600 | A1* | 8/2023 | Wallentin | H04L 1/0026 370/311 |
| 2024/0049069 | A1* | 2/2024 | Zhou | H04W 74/0833 |
| 2025/0247785 | A1 | 7/2025 | Niu et al. | |

OTHER PUBLICATIONS

International Search Report dated Jul. 26, 2024 issued in counterpart application No. PCT/KR2024/005088, 8 pages.
Samsung, "Network Energy Saving Techniques", R1-2212057, 3GPP TSG RAN WG1 #111, Nov. 14-18, 2022, 22 pages.
LG Electronics, "Discussion on Physical Layer Techniques for Network Energy Savings", R1-2212302, 3GPP TSG RAN WG1 #111, Nov. 14-18, 2022, 23 pages.
European Search Report dated Jun. 23, 2026 issued in counterpart application No. 24792976.3-1206, 15 pages.

* cited by examiner

METHOD AND APPARATUS FOR ENERGY SAVING IN WIRELESS COMMUNICATION SYSTEM

CROSS-REFERENCE TO RELATED APPLICATION(S)

This application is based on and claims priority under 35 U.S.C. § 119 to Korean Patent Application No. 10-2023-0050297, filed on Apr. 17, 2023, in the Korean Intellectual Property Office, the disclosure of which is incorporated herein by reference in its entirety.

BACKGROUND

1. Field

The disclosure relates generally to a wireless communication system, and more particularly, to a method and an apparatus for energy saving of a base station in a wireless communication system.

2. Description of Related Art

Fifth generation (5G) mobile communication technologies define broad frequency bands such that high transmission rates and new services are possible and can be implemented not only in sub 6 gigahertz (GHz) bands such as 3.5 GHz, but also in above 6 GHz bands referred to as millimeter wave (mmWave) bands including 28 GHz and 39 GHz. In addition, it has been considered to implement sixth generation (6G) mobile communication technologies referred to as beyond 5G systems, in terahertz (THz) bands such as 95 GHz to 3 THz bands, to accomplish transmission rates fifty times faster than those of 5G mobile communication technologies and ultra-low latencies one-tenth of 5G.

In the initial stage of 5G mobile communication technologies, to support services and to satisfy performance requirements in connection with enhanced mobile broadband (eMBB), ultra reliable & low latency communications (URLLC), and massive machine-type communications (mMTC), there has been ongoing standardization regarding beamforming and massive multiple input multiple output (MIMO) for alleviating radio-wave path loss and increasing radio-wave transmission distances in mmWave, numerology, such as operating multiple subcarrier spacings, for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large-capacity data transmission and a polar code for highly reliable transmission of control information, layer 2 (L2) pre-processing, and network slicing for providing a dedicated network customized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for securing coverage in an area in which communication with terrestrial networks is unavailable, and positioning.

Moreover, there has been ongoing standardization in wireless interface architecture/protocol fields regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service fields regarding a 5G baseline architecture, such as service based architecture or service based interface, for combining network functions virtualization (NFV) and software-defined networking (SDN) technologies, and mobile edge computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), and the like, 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for securing coverage in THz bands of 6G mobile communication technologies, full dimensional MIMO (FD-MIMO), multi-antenna transmission technologies such as array antennas and large-scale antennas, metamaterial-based lenses and antennas for improving coverage of THz band signals, high-dimensional space multiplexing technology using orbital angular momentum (OAM), and reconfigurable intelligent surface RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Herein, a base station (BS) is an entity that allocates resources to terminals, and may be at least one of a gNode B, a gNB, an eNode B, an eNB, a Node B, a wireless access unit, a base station controller, and a node on a network. A terminal may include a user equipment (UE), a mobile station (MS), a cellular phone, a smartphone, a computer, or a multimedia system capable of performing a communication function. However, the disclosure is not limited thereto.

As such, there is a need in the art for a method of transmitting a signal by a BS in a wireless communication system, to cure the problem of excessive energy consumption and achieve higher energy efficiency in the wireless communication system.

SUMMARY

The disclosure has been made to address at least the above-mentioned problems and/or disadvantages and to provide at least the advantages described below.

Accordingly, an aspect of the disclosure is to provide a method and an apparatus for energy saving of a BS in a wireless communication system.

In accordance with an aspect of the disclosure, a method performed by a terminal in a wireless communication system includes receiving, from a base station while operating in a normal mode, an indicator indicating a base station energy saving mode, and operating in the base station energy saving mode based on the indicator.

In accordance with an aspect of the disclosure, a terminal in a wireless communication system includes a transceiver, and a controller coupled with the transceiver and configured to receive, from a base station while operating in a normal mode, an indicator indicating a base station energy saving mode, and operate in the base station energy saving mode based on the indicator.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
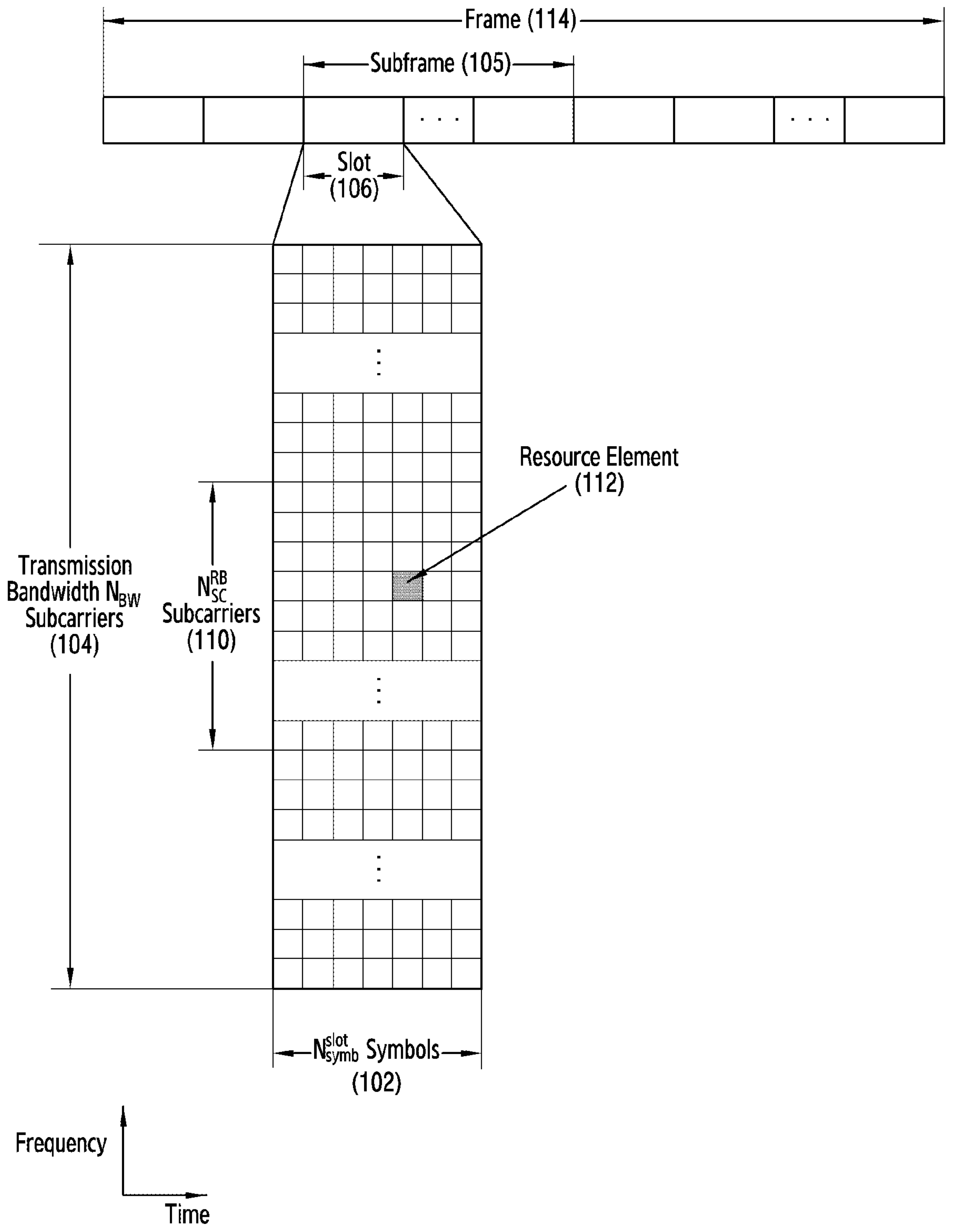
FIG. 1 illustrates the basic structure of a time-frequency resource region of a 5G system to which the disclosure is applied.

The following description with reference to the accompanying drawings is provided to assist in a comprehensive understanding of embodiments of the present disclosure. Accordingly, those of ordinary skill in the art will recognize that various changes and modifications of the embodiments described herein can be made without departing from the scope and spirit of the present disclosure. Descriptions of well-known functions and constructions may be omitted for the sake of clarity and conciseness.

The advantages and features of the disclosure and manners to achieve them will be apparent by making reference to embodiments as described below in detail in conjunction with the accompanying drawings. However, the disclosure is not limited to the embodiments set forth below and may be implemented in various different forms. Throughout the specification, the same or like reference signs indicate the same or like elements.

Herein, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

As used herein, a unit refers to a software element or a hardware element, such as a field programmable gate array (FPGA) or an application specific integrated circuit (ASIC), which performs a predetermined function. However, the unit does not always have a meaning limited to software or hardware. The unit may be constructed either to be stored in an addressable storage medium or to execute one or more processors. Therefore, the unit includes software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the unit may be either combined into fewer elements, or a unit, or divided into more elements, or a unit. Moreover, the elements and units or may be implemented to reproduce one or more central processing units (CPUs) within a device or a security multimedia card. The unit in the embodiments may include one or more processors.

Herein, terms for identifying access nodes and referring to network entities, messages, interfaces between network entities, various identification information, and the like are illustratively used for the sake of descriptive convenience. Therefore, the disclosure is not limited by the terms as used below, and other terms referring to subjects having equivalent technical meanings may be used.

The terms physical channel and signal may be interchangeably used herein with the term data or control signal. For example, physical downlink shared channel (PDSCH) refers to a physical channel over which data is transmitted, but the PDSCH may also be used to refer to the data. That is, the expression transmitting a physical channel may be construed as having the same meaning as the expression transmitting data or a signal over a physical channel.

Herein, higher signaling refers to a signal transfer scheme from a BS to a terminal via a downlink data channel of a physical layer, or from a terminal to a BS via an uplink data channel of a physical layer. The higher signaling may also be understood as radio resource control (RRC) signaling or a MAC CE.

In addition, terms and names defined in the 3$^{rd}$ generation partnership project new radio (3GPP NR: standards for 5$^{th}$ generation mobile communication) standards are used herein for the sake of descriptive convenience. However, the disclosure is not limited by these terms and names and may be similarly applied to systems that conform other standards. The term "terminal" may refer to not only cellular phones, smartphones, IoT devices, and sensors, but also other wireless communication devices.

In the following description, a base station is an entity that allocates resources to terminals, and may be at least one of a gNode B, a gNB, an eNode B, an eNB, a Node B, a base station (BS), a wireless access unit, abase station controller, and a node on a network. A terminal may include a user equipment (UE), a mobile station (MS), a cellular phone, a smartphone, a computer, or a multimedia system capable of performing a communication function. Of course, examples of the base station and the terminal are not limited thereto.

To handle the proliferation of mobile data traffic, an initial standard for a 5th generation (5G) system or new radio (NR) access technology, which is a next-generation communication system after long term evolution (LTE) or evolved universal terrestrial radio access (E-UTRA) and LTE-advanced (LTE-A) or E-UTRA evolution, has been finalized. While the existing mobile communication systems focused on general voice/data communication, 5G systems aim to satisfy various services and requirements, such as eMBB services for improving the existing voice/data communication, URLLC services, mMTC services for supporting communication between a massive number of devices, etc.

In contrast to legacy LTE and LTE-A systems where a maximum system transmission bandwidth per carrier is limited to 20 megahertz (MHz), 5G systems mainly aim at providing data services at ultra-high speeds of several gigabits per second (Gbps) by using a ultrawide bandwidth that is much wider than the transmission bandwidth of the legacy LTE and LTE-A systems. Accordingly, for the 5G systems, an ultra-high frequency band from several GHz up to 100 GHz, in which frequencies having ultrawide bandwidths are easily made available, is being considered as a candidate frequency. Additionally, wide-bandwidth frequencies for the 5G systems may be obtained by reassigning or allocating frequencies among frequency bands included in a range of several hundreds of MHz to several GHz used by the existing mobile communication systems.

A radio wave in the ultra-high frequency band has a wavelength of several millimeters (mm) and is also referred to as mmWave. However, in the ultra-high frequency band, a pathloss of radio waves increases with an increase in frequency, and thus, a coverage range of a mobile communication system is reduced.

To overcome the reduction in coverage in the ultra-high frequency band, a beamforming technology is applied to increase a radio wave arrival distance by focusing a radiation energy of radio waves to a predetermined target point using a plurality of antennas. In other words, a signal to which the beamforming technology is applied has a relatively narrow beamwidth, and radiation energy is concentrated within the narrow beam width, so that the radio wave arrival distance is increased. The beamforming technology may be applied at both a transmitter and a receiver. In addition to increasing the coverage range, the beamforming technology also has an effect of reducing interference in a region other than a beamforming direction. To properly implement the beamforming technology, an accurate transmit/receive beam measurement and feedback method is required. The beamforming technology may be applied to a control channel or a data channel having a one-to-one correspondence between a predetermined UE and a BS, and for control channels and data channels via which the BS transmits, to multiple UEs in a system, common signals such as an SS, a PBCH, and system information. When the beamforming technology is applied to the common signals, a beam sweeping technique for transmitting a signal by changing a beam direction is additionally applied to allow the common signals to reach a UE located at any position within a cell.

As another requirement for the 5G systems, an ultra-low latency service with a transmission delay of about 1 millisecond (ms) between a transmitter and a receiver is required. To reduce the transmission delay, a frame structure based on a short transmission time interval (TTI) compared to that in LTE and LTE-A needs to be designed for better energy efficiency in the system. A TTI is a basic time unit for performing scheduling, and a TTI in the legacy LTE and LTE-A systems corresponds to one subframe with a length of 1 ms. For example, as a short TTI for satisfying the requirement for the ultra-low latency service in the 5G systems, TTIs of 0.5 ms, 0.25 ms, 0.125 ms, etc. that are shorter than the TTI in the legacy LTE and LTE-A systems may be supported.

FIG. 1 illustrates the basic structure of a time-frequency resource region of a 5G system according to an embodiment. That is, FIG. 1 illustrates the basic structure of a time-frequency domain, which is a radio resource domain in which data or a control channel is transmitted in a 5G system.

Referring to FIG. 1, the horizontal axis represents a time domain, and the vertical axis represents a frequency domain.

The minimum transmission unit in the time domain is an orthogonal frequency division multiplexing (OFDM) symbol, $$N_{symb}^{slot}$$

symbols 102 are gathered to constitute one slot 106, and $$N_{slot}^{subframe}$$

slots are gathered to constitute one subframe 105. The length of a subframe may be defined as 1.0 ms, and 10 subframes are gathered to constitute a frame 114 of 10 ms. The minimum transmission unit in the frequency domain is a subcarrier, and the bandwidth (BW) of the entire system transmission bandwidth may be configured by a total of NBW subcarriers 104.

The basic unit of the time-frequency resource region is a resource element (RE) 112 and may be represented by an orthogonal frequency division multiplexing (OFDM) symbol index and a subcarrier index. A resource block (RB) 108 may be defined as NRB consecutive subcarriers 110 in the frequency domain. In the 5G system, $$N_{sc}^{RB} = 12,$$

and a data rate may increase in proportion to the number of RBs scheduled to a UE.

In the 5G system, a BS may map data in units of an RB and generally perform scheduling for a predetermined UE in units of an RB constituting one slot. Thus, a basic time unit for scheduling may be a slot, and a basic frequency unit for scheduling may be an RB.

The number $$N_{symb}^{slot}$$

of OFDM symbols is determined based on a length of a cyclic prefix (CP) added to each symbol to prevent inter-symbol interference. For example, $$N_{symb}^{slot} = 14$$

when a normal CP is applied, and $$N_{symb}^{slot} = 12$$

when an extended CP is applied. The extended CP may be applied to a system having a relatively long radio wave transmission distance compared to that for the normal CP, thereby maintaining orthogonality between symbols. For the normal CP, a ratio of a CP length to a symbol length may be maintained at a constant value to keep an overhead due to the CP constant regardless of a subcarrier spacing. In other words, as a subcarrier spacing decreases, a symbol length may increase, and accordingly, a CP length may increase. However, as a subcarrier spacing increases, a symbol length may decrease, and accordingly, a CP length may decrease, A symbol length and a CP length may be inversely proportional to a subcarrier spacing.

In the 5G system, to satisfy various services and requirements, various frame structures may be supported by adjusting a subcarrier spacing. An example may include the following:

Regarding an operating frequency band, a wider subcarrier spacing is more beneficial for recovery from phase noise in a high frequency band.

Regarding a transmission time, when a subcarrier spacing increases, a symbol length in the time domain is shortened, which leads to a shorter slot, and thus, the wider subcarrier spacing is more advantageous for supporting ultra-low latency services such as URLLC.

Regarding cell size, a larger cell may be supported as a CP length increases, and thus, as a subcarrier decreases, a relatively larger cell may be supported. A cell is a concept indicating an area covered by one BS in mobile communication.

The subcarrier spacing, the CP length, etc. are essential information for OFDM transmission and reception, and the BS and the ULE need to recognize such information as a common value to enable seamless transmission and reception. Table 1 below shows a relationship among a subcarrier spacing configuration μ, a subcarrier spacing Δf, and a CP length supported by the 5G system.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number $$N_{symb}^{slot}$$

of symbols per slot, the number $$N_{slot}^{frame,\mu}$$

of slots per frame, and the number $$N_{slot}^{subframe,\mu}$$

of slots per subframe for each subcarrier spacing configuration (μ) in the case of a normal CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 2-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

Table 3 below shows the number $$N_{symb}^{slot}$$

of symbols per slot, the number $$N_{slot}^{frame,\mu}$$

of slots per frame, and the number $$N_{slot}^{subframe,\mu}$$

of slots per subframe for each subcarrier spacing configuration pin the case of an extended CP.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

When the 5G system was introduced, at least coexistence or dual mode operation with a legacy LTE/LTE-A system was expected. As a result, the legacy LTE/LTE-A system may provide a stable system operation to the UE, and the 5G system may provide enhanced services to the UE. Therefore, a frame structure of the 5G system needs to include at least a frame structure or an essential parameter set (subcarrier spacing=15 kilohertz (kHz)) of the legacy LTE/LTE-A system.

For example, when comparing a frame structure with a subcarrier spacing configuration μ=0 (hereinafter, frame structure A) and a frame structure with a subcarrier spacing configuration μ=1 (hereinafter, frame structure B), the subcarrier spacing and the RB size of the frame structure B are twice as large as those of the frame structure A, whereas a slot length and a symbol length of the frame structure B are twice as small as those of the frame structure A. In frame structure B, 2 slots may constitute a subframe, and 20 subframes may constitute a frame.

Generalizing the frame structure of 5G systems provides high scalability by ensuring that the essential parameter sets, such as subcarrier spacing, CP length, and slot length, have an integer multiple relationship with each other for each frame structure. A subframe having a fixed length of 1 ms may be defined to indicate a reference time unit regardless of the frame structure type.

The frame structures may correspond to various scenarios. In terms of a cell size, because a larger cell may be supported as a CP length increases, the frame structure A may support a relatively large cell compared to the frame structure B. In terms of an operating frequency band, because a wider subcarrier spacing is more beneficial for recovery from phase noise in a high frequency band, the frame structure B may support a relatively high operating frequency compared to the frame structure A. From a service perspective, because a shorter length of a slot as a basic scheduling unit is more advantageous for supporting ultra-low latency services such as URLLC, the frame structure B may be more suitable for a URLLC service than the frame structure A.

Furthermore, uplink (UL) refers to a radio link through which a UE transmits data or a control signal to a BS, and downlink (DL) refers to a radio link through which the base station transmits data or a control signal to the UE.

During an initial access stage in which the UE accesses a system, the UE may perform cell search to attain DL time and frequency synchronization and obtain a cell identity (ID) from a synchronization signal (SS) transmitted by the BS. The UE may then use the obtained cell ID to receive a physical broadcast channel (PBCH), and obtain a master information block (MIB) that is essential system information from the PBCH. The UE may receive system information (e.g., a system information block (SIB)) transmitted by the BS to obtain cell-common transmission/reception related control information. The cell-common transmission/reception related control information may include random access-related control information, paging-related control information, common control information regarding various physical channels, etc.

An SS is used as a reference for the cell search, and a subcarrier spacing may be applied to the SS for each frequency band and to be suitable for a channel environment, e.g., phase noise. For a data channel or a control channel, different subcarrier spacings may be applied depending on a service type to support various services as described above.

Figure 2:
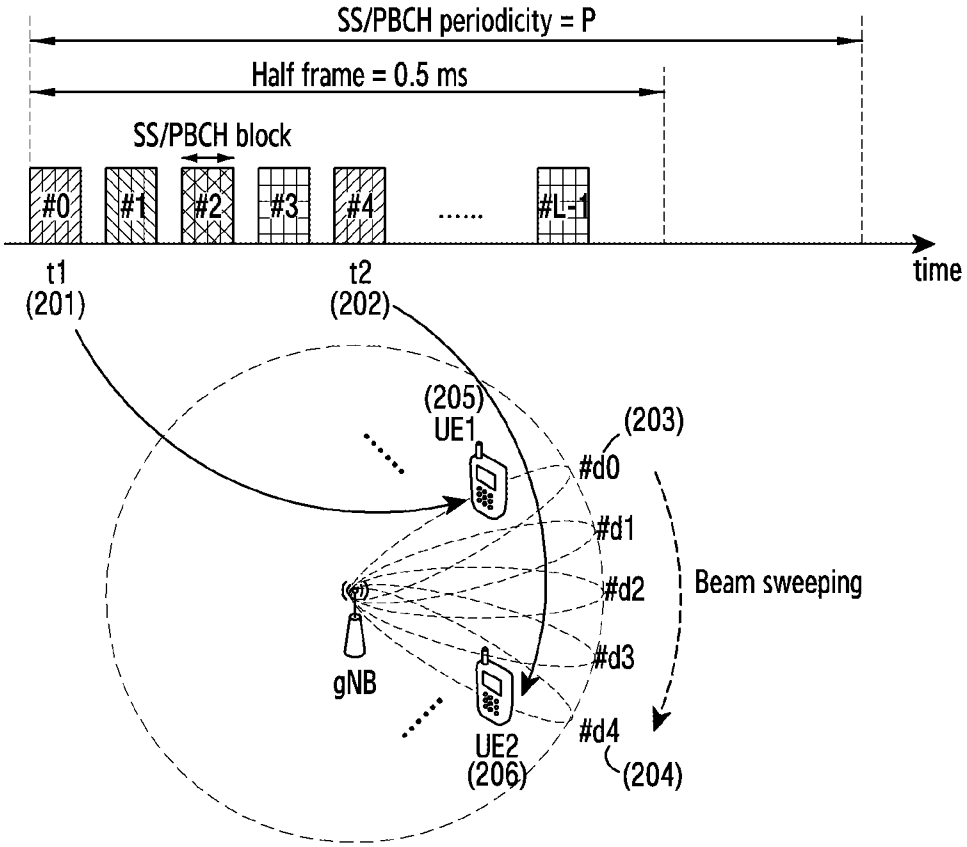
FIG. 2 illustrates a time-domain mapping structure and a beam sweeping operation of an SS according to an embodiment.

FIG. 2 illustrates a time-domain mapping structure and a beam sweeping operation for an SS according to an embodiment.

Herein, a primary SS (PSS) serves as a reference for DL time/frequency synchronization and provides some pieces of information of cell ID. A secondary SS (SSS) serves as a reference for DL time/frequency synchronization, provides remaining cell ID information, and serves as a reference signal for demodulation of a PBCH.

A PBCH provides an MIB that is essential system information needed for the UE to transmit and receive a data channel and a control channel. The essential system information may include search space-related control information indicating radio resource mapping information of a control channel, scheduling control information of a separate data channel for transmitting system information, information such as a system frame number (SEN) that is an index in a frame level that becomes a timing reference.

An SS/PBCH block (or SSB) includes N OFDM symbols and is a combination of the PSS, the SSS, and the PBCH. For a system using a beam sweeping technique, the SS/PBCH block is the smallest unit for applying beam sweeping. In the 5G system, N=4. The BS may transmit a maximum of L SS/PBCH blocks, and the L SS/PBCH blocks are mapped within a half frame (0.5 ms). The L SS/PBCH blocks are periodically repeated with a periodicity P. The BS may inform the UE of the periodicity P via signaling. If there is no separate signaling for the periodicity P, the UE applies a predetermined default value.

FIG. 2 illustrates an example in which beam sweeping is applied in units of an SS/PBCH block over time. Referring to FIG. 2, a first UE (UE1) 205 receives an SS/PBCH block via a beam radiated in direction #d0 203 due to beamforming applied to SS/PBCH block #0 at time point t1 201. A second UE (UE2) 206 may receive an SS/PBCH block via a beam radiated in direction #d4 204 due to beamforming applied to SS/PBCH block #4 at time point t2 202. The UE may obtain an optimal SS via a beam radiated from the BS in a direction toward the location of the UE. For example, UE1 205 may be difficult to obtain time/frequency synchronization and essential system information from an SS/PBCH block via the beam radiated in the direction #d4 204 that is far away from UE1 205.

In addition to the initial access procedure, the UE may receive an SS/PBCH block to determine whether a radio link quality of a current cell is maintained above a predetermined threshold level. Furthermore, in a procedure for performing handover of a UE from the current cell to a neighboring cell, the UE may receive an SS/PBCH block from the neighboring cell to determine a radio link quality of the neighboring cell and obtain time/frequency synchronization of the neighboring cell.

After the UE obtains MIB and system information from the BS through the initial access procedure, the UE may perform an RA procedure to switch a link with the BS to a connected state (or RRC CONNECTED state). Upon completion of the RA procedure, the UE transitions to a connected state, and one-to-one communication is enabled between the BS and the UE.

Figure 3:
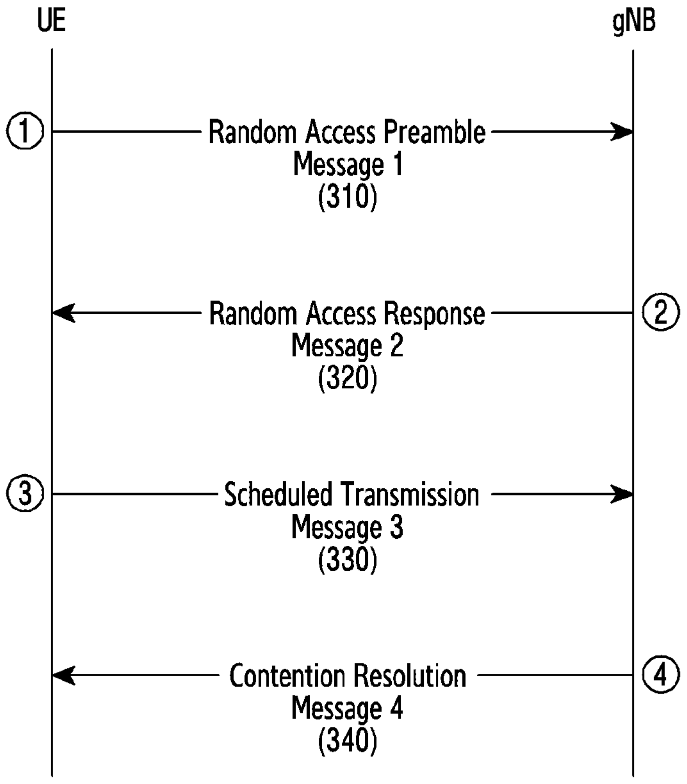
FIG. 3 illustrates an RA procedure according to an embodiment.

FIG. 3 illustrates an RA procedure according to an embodiment.

Referring to FIG. 3, in stage 1 310 of the RA procedure, a UE transmits an RA preamble to a BS. In the RA procedure, the RA preamble, which is a first message transmitted by the UE, may be referred to as Message 1. The BS may measure a propagation delay value between the UE and the BS from the RA preamble and achieve UL synchronization. In this case, the UE may randomly select an RA preamble to use from a set of RA preambles given by system information in advance. In addition, an initial transmission power for the RA preamble may be determined according to a pathloss between the BS and the UE, which is measured by the UE. The UE may transmit the RA preamble by determining a direction of a transmit beam for the RA preamble based on an SS received from the BS.

In stage 2 (320), the BS transmits a UL transmission timing control command to the UE based on the propagation delay value measured from the RA preamble received in stage 1 310. The BS may also transmit, to the UE, a UL resource to be used by the UE and a power control command as scheduling information. Control information regarding a UL transmit beam of the UE may be included in the scheduling information.

If the UE does not successfully receive, from the BS, an RA response (RAR) (or Message 2) that is scheduling information for Message 3 within a predetermined time period in the second stage 320, the UE may perform the first stage 310 again. If the UE performs the first stage 310 again, the UE may transmit the RA preamble with transmission power increased by a predetermined stage (power ramping), thereby increasing the probability of reception of the RA preamble of the BS.

In a stage 3 (330), the UE transmits UL data (message 3) including its UE ID to the BS through a UL data channel (e.g., a physical UL shared channel (PUSCH)) by using the UL resource allocated in the second stage 320. A transmission timing of the UL data channel for transmitting the Message 3 may be controlled according to the timing control command received from the BS in the second stage 320. In addition, a transmission power for the UL data channel for transmitting the Message 3 may be determined by considering the power control command received from the BS in the second stage 320 and a power ramping value applied to the RA preamble. The UL data channel for transmitting the Message 3 may refer to a first UL data signal transmitted by the UE to the BS after the UE transmits the RA preamble.

In stage 4 (340), when the BS determines that the UE has performed the RA procedure without colliding with another UE, the BS may transmit contention resolution data (Message 4) including an ID of the UE that has transmitted the UL data in the third stage 330 to the corresponding UE. Upon receiving a signal transmitted by the BS in the fourth stage 340, the UE may determine that the RA procedure is successful. The UE may transmit, to the BS, hybrid automatic repeat request acknowledgement (HARQ-ACK) information indicating whether the Message 4 has been successfully received through a physical UL control channel (PUCCH).

If the data transmitted by the UE in the third stage 330 collides with data transmitted by another UE and thus the BS fails to receive a data signal from the UE, the BS may no longer transmit data to the UE. Accordingly, if the UE fails to receive the data transmitted by the BS in the fourth stage 340 within a predetermined time period, the UE may determine that the RA procedure has failed and restart the RA procedure from the first stage 310.

Upon successful completion of the RA procedure, the UE may transition to a connected state, and one-to-one communication between the BS and UE is enabled. The BS may receive UE capability information from the UE in the connected state and adjust scheduling based on the UE capability information of the corresponding UE. The UE may inform, via the UE capability information, the BS of whether the UE itself supports a predetermined functionality, a maximum allowable value of the functionality supported by the UE, etc. Accordingly, the UE capability information reported by each UE to the BS may have a different value for each UE.

As an example, the UE may report, to the BS, UE capability information including at least some of the following control information as the UE capability information.

Figure 4:
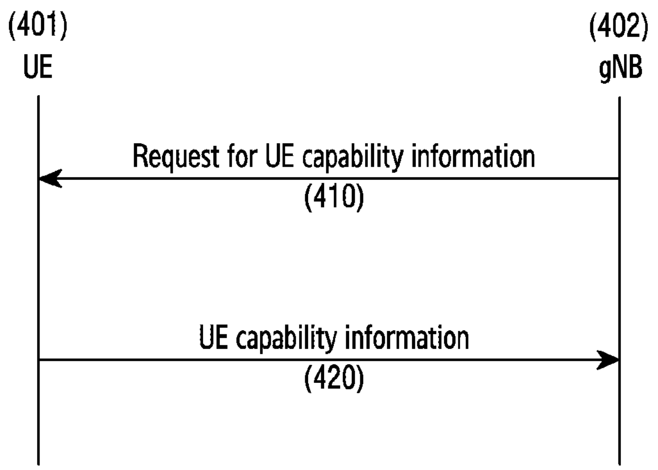
FIG. 4 illustrates a procedure in which a UE reports UE capability information to a BS according to an embodiment.

- Control information related to a frequency band supported by the UE
- Control information related to a channel bandwidth supported by the UE
- Control information related to a highest modulation scheme supported by the UE
- Control Information related to a maximum number of beams supported by the UE
- Control information related to a maximum number of layers supported by the UE
- Control information related to CSI reporting supported by the UE
- Control information about whether the UE supports frequency hopping
- Control information related to a bandwidth when carrier aggregation (CA) is supported
- Control information about whether cross-carrier scheduling is supported when CA is supported FIG. 4 illustrates a procedure in which a UE reports UE capability information to a stations according to an embodiment.

Referring to FIG. 4, in step 410, a BS 402 may transmit a UE capability information request message to a UE 401.

In response to the request for UE capability information from the BS, the UE transmits UE capability information to the BS in step 420.

A UE connected to a BS through the above process is a UE in the RRC_CONNECTED state, and the UE connected to the BS may perform one-to-one communication. However, a UE that is not connected is a UE in the RRC_IDLE state, and the operation of the UE in the RRC_IDLE state may be categorized as follows.

Operate the UE-specific discontinuous reception (DRX) cycle configured by a higher layer.

Receive paging messages from a core network

Obtain system information

Neighboring cell-related measurement operation and cell reselection

In 5G systems, a new state of the UE called RRC_INACTIVE has been defined to reduce the energy and time consumed by the initial access of the UE. The RRC_INACTIVE UE, in addition to the operations performed by an RRC_IDLE UE, may store access stratum (AS) information required to access a cell, perform UE-specific DRX cycle operation configured by the RRC layer, configure and periodically update a RAN-based notification area (RNA), which can be utilized by the RRC layer for handover, and monitor RAN-based paging messages transmitted over I-radio network temporary identifier (I-RNTI).

Hereinafter, a scheduling method in which a base station transmits DL data to a UE or indicates UL data transmission performed by the UE.

DCI is control information transmitted by the BS to the UE via a DL link and may include DL data scheduling information or UL data scheduling information for a predetermined UE. The BS may independently channel-code DCI for each UE and then transmit it to a corresponding UE through a physical downlink control channel (PDCCH) that is a physical control channel for DL.

The BS may apply and operate a predefined DCI format for a UE to be scheduled according to purposes such as whether DCI carries scheduling information for DL data (DL assignment), whether the DCI carries scheduling information for UL data (UL grant), whether spatial multiplexing using multiple antennas is applied, whether the DCI is DCI for power control, etc.

The BS may transmit DL data to the UE through a physical downlink shared channel (PDSCH) that is a physical channel for DL data transmission. The BS may inform the UE of scheduling information, such as a specific mapping location in the time-frequency domain for the PDSCH, a modulation scheme, HARQ related control information, power control information, etc., via DCI related to DL data scheduling information among DCIs transmitted on the PDCCH.

The UE may transmit UL data to the BS through a PUSCH, which is a physical channel for UL data transmission. The BS may inform the UE of scheduling information, such as a specific mapping location in the time-frequency domain for the PUSCH, a modulation scheme, HARQ-related control information, power control information, etc., via DCI related to UL data scheduling information among DCIs transmitted through the PDCCH.

Figure 5:
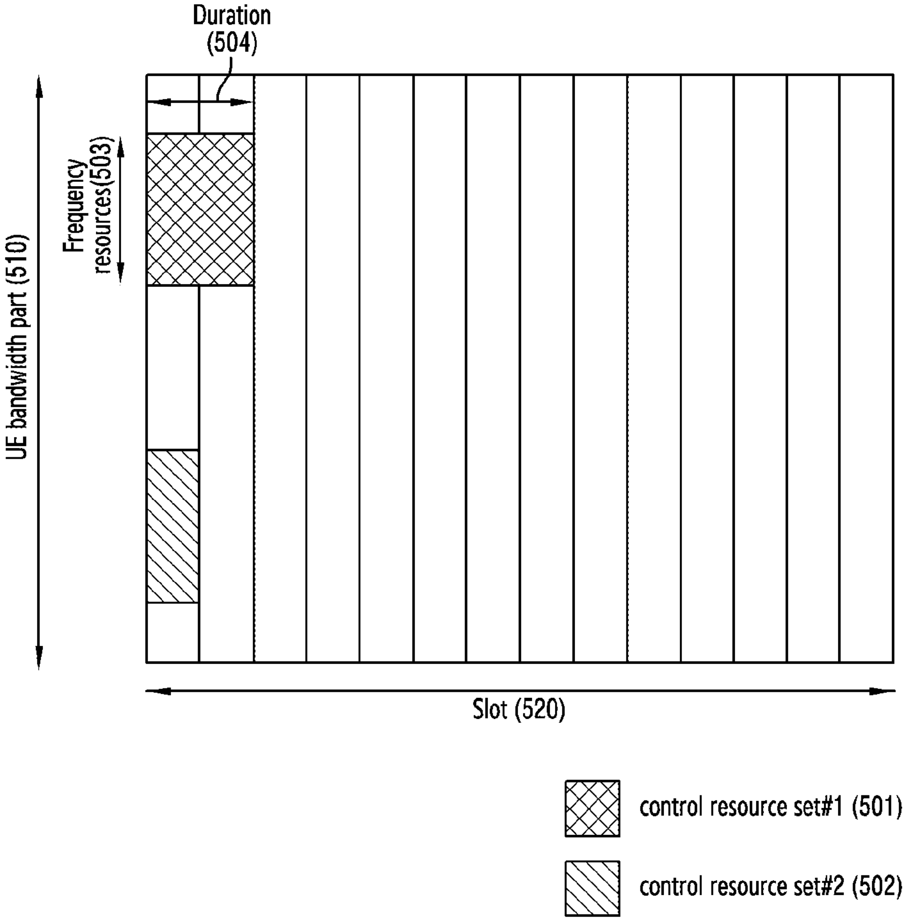
FIG. 5 illustrates a control resource set (CORESET) including time-frequency resources, to which a PDCCH is mapped according to an embodiment.

FIG. 5 illustrates a CORESET including time-frequency resources, to which a PDCCH is mapped according to an embodiment.

Referring to FIG. 5, a UE BWP 510 may be configured in a frequency domain and two CORESETs (CORESET #1 501 and CORESET #2 502) may be configured in one slot 520 in a time domain. The CORESETs 501 and 502 may be configured in a specific frequency resource within the entire UE BWP 510 in the frequency domain. For example, CORESET #1 501 may be configured in a specific frequency resource 503 within the entire UE BWP 510 in the frequency domain. CORESETs 501 and 502 may be configured with one or multiple OFDM symbols in the time domain and, in this regard, a CORESET duration may be defined. For example, CORESET #1 501 may be configured with two OFDM symbols on the time domain, and configured with a CORESET duration 504.

CORESET #1 501 may be configured with the CORESET duration of two symbols, and CORESET #2 502 may be configured with the CORESET duration of one symbol.

The BS may configure one or multiple CORESETs for the UE via higher layer signaling (e.g., system information, MIB or RRC signaling). Configuration of the CORESET for the UE may be understood as providing information such as a CORESET identity, a frequency location of the CORESET, a symbol length of the CORESET, and the like. Pieces of information provided by the BS to the U to establish CORESET may include at least some of the information shown below in Table 4.

TABLE 4

```
ControlResourceSet ::=            SEQUENCE {
  controlResourceSetId              ControlResourceSetId,
(CORESET Identity)
  frequencyDomainResources            BIT STRING (SIZE (45)),
(Frequency Domain Resources)
duration                          INTEGER (1..maxCoReSetDuration),
(CORESET Duration)
  cce-REG-MappingType                   CHOICE {
(CCE-to-REG mapping type)
    interleaved                           SEQUENCE {
      reg-Bundle Size                 ENUMERATED {n2, n3, n6},
        (REG bundle size)
        interleaverSize                 ENUMERATED {n2, n3, n6},
        (Interleave size)
        shiftIndex                          INTEGER(0..maxNrofPhysicalResourceBlocks-1)
OPTIONAL -- Need S
        (Interleaver Shift)
    },
    nonInterleaved                        NULL
  },
  precoderGranularity                       ENUMERATED {sameAsREG-bundle,
allContiguousRBs},
  (Precoding unit)
```

TABLE 4-continued

```
tci-StatesPDCCH-ToAddList          SEQUENCE(SIZE (1..maxNrofTCI-StatesPDCCH)) OF
TCI-StateId OPTIONAL, -- Cond NotSIB1-initialBWP
  (QCL Configuration Information)
    tci-StatesPDCCH-ToReleaseList      SEQUENCE(SIZE (1..maxNrofTCI-StatesPDCCH)) OF
TCI-StateId OPTIONAL, -- Cond NotSIB1-initialBWP
  (QCL Configuration Information)
    tci-PresentInDCI                   ENUMERATED {enabled}
OPTIONAL, -- Need S
  (QCL Indicator Configuration Information in DCI)
    pdcch-DMRS-ScramblingID            INTEGER (0..65535)
OPTIONAL, -- Need S
  (PDCCH DMRS Scrambling Identity)
  }
```

A CORESET may consist of $$N_{RB}^{CORESET}$$

RBs in the frequency domain and $$N_{symb}^{CORESET} \in \{1, 2, 3\}$$

symbols in the time domain. An NR PDCCH may consist of one or a plurality of control channel elements (CCEs). A CCE may consist of 6 resource element groups (REGs), and a REG may be defined as 1 RB in one OFDM symbol. In a CORESET, REGs may be indexed in a time-first manner starting at REG index 0 for a first OFDM symbol and a lowest-numbered RB in the CORESET.

An interleaved method and a non-interleaved method may be supported as a transmission method for a PDCCH. The BS may configure the UE with information indicating whether a transmission type is interleaved or non-interleaved for each CORESET, via higher layer signaling. Interleaving may be performed in units of REG bundles. A REG bundle may be defined as a set of one or a plurality of REGs. The UE may determine a CCE-to-REG mapping type for a corresponding CORESET as shown below in Table 5, based on whether the transmission type is interleaved or non-interleaved as configured by the BS.

TABLE 5

The CCE-to-REG mapping for a control-resource set can be interleaved or non-interleaved and is described by REG bundles:

REG bundle i is defined as REGs {iL, iL + 1, ... , iL + L − 1} where L is the REG bundle size, $i = 0, 1, \ldots, N_{REG}^{CORESET}/L - 1$, and $N_{REG}^{CORESET} = N_{RB}^{CORESET} N_{symb}^{CORESET}$ is the number of REGs in the CORESET CCE j consists of REG bundles {f(6j/L), f(6j/L + 1), . . . , f(6j/L + 6/L − 1)} where f (·) is an interleaver For non-interleaved CCE-to-REG mapping, L = 6 and f (x) = x.

For interleaved CCE-to-REG mapping, $L \in \{2, 6\}$ for $N_{symb}^{CORESET} = 1$ and $L \in \{N_{symb}^{CORESET}, 6\}$ for $N_{symb}^{CORESET} \in \{2, 3\}$. The interleaver is defined by $$f(x) = (rC + c + n_{shift}) \bmod \left(N_{REG}^{CORESET}/L\right)$$

$$x = cR + r$$
$$r = 0, 1, \ldots, R - 1$$
$$c = 0, 1, \ldots, C - 1$$

$$C = N_{REG}^{CORESET}/(LR)$$

where $R \in \{2, 3, 6\}$.

The BS may inform, via signaling, the UE of configuration information such as symbols to which the PDCCH is mapped in a slot, a transmission periodicity, etc.

Figure 6:
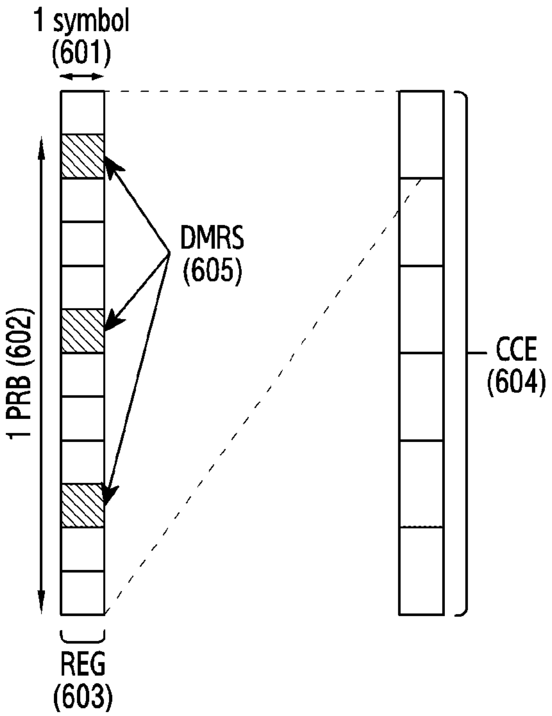
FIG. 6 illustrates downlink control information (DCI) and a demodulation reference signal (DMRS) being mapped to REG, which is a basic unit of a downlink control channel according to an embodiment.

FIG. 6 illustrates the mapping of DCI and DMRS to a REG, which is a basic unit of a DL control channel according to an embodiment.

Referring to FIG. 6, the basic unit of the DL control channel, i.e., REG 603, may include both REs to which DCI is mapped and regions to which a DMRS 605, which is a reference signal for decoding the REs, is mapped. Three DMRS 605 may be transmitted within one REG 603.

In a search space for a PDCCH, the number of CCEs required to transmit the PDCCH may be 1, 2, 4, 8, or 16 depending on an aggregation level (AL), and a different number of CCEs may be used to implement link adaptation of a DL control channel. For example, when AL=L, one DL control channel may be transmitted using L CCEs. The UE may perform blind decoding for detecting a signal while the UE is unaware of information about a DL control channel, and a search space representing a set of CCEs may be defined for the blind decoding. The search space is a set of DL control channel candidates, each candidate being composed of CCEs, intended for the UE to attempt to decode at a given AL. Since there are various ALs respectively corresponding to sets of 1, 2, 4, 8, and 16 CCEs, the UE may have a plurality of search spaces. A search space set may be defined as a set of search spaces at all configured ALs.

The search space may be classified into a common search space (CSS) and a UE-specific search space (USS). A predetermined group of UEs or all UEs may monitor a CSS for the PDCCH to receive cell-common control information such as dynamic scheduling of SIBs or paging messages. For example, the UE may receive scheduling allocation information for the PDSCH for receiving the system information, by monitoring the CSS for the PDCCH. For the CSS, because a predetermined group of UEs or all UEs need to receive an PDCCH, the CSS may be defined as a predetermined set of CCEs. The UE may receive scheduling allocation information for UE-specific PDSCH or PUSCH, by monitoring a USS for an PDCCH. A USS may be defined in a UE-specific manner, based on the ID of the UE and a function of various system parameters.

The BS may configure the UE with configuration information for a search space of PDCCH via higher layer signaling (e g, SIB, MIB, or RRC signaling). For example, the BS may configure the UE with the number of PDCCH candidates at each aggregation level L, a monitoring periodicity for a search space, monitoring occasions in symbols within slots for the search space, a search space type (a CSS or a USS), a combination of DCI format and RNTI to be monitored in the search space, and an index of a CORESET in which the search space is to be monitored. For example, parameters for the search space for the PDCCH may include the pieces of information as listed in Table 6 below.

TABLE 6

```
  SearchSpace ::=                    SEQUENCE {
    searchSpaceId                      SearchSpaceId,
  (Search Space Identity)
    controlResourceSetId               ControlResourceSetId          OPTIONAL,
-- Cond SetupOnly
  (CORESET Identity)
    monitoringSlotPeriodicityAndOffset CHOICE {
  (Monitoring Slot Level Periodicity and Offset)
      sl1                                  NULL,
      sl2                                  INTEGER (0..1),
      sl4                                  INTEGER (0..3),
      sl5                                  INTEGER (0..4),
      sl8                                  INTEGER (0..7),
      sl10                                 INTEGER (0..9),
      sl16                                 INTEGER (0..15),
      sl20                                 INTEGER (0..19),
      sl40                                 INTEGER (0..39),
      sl80                                 INTEGER (0..79),
      sl160                                INTEGER (0..159),
      sl320                                INTEGER (0..319),
      sl640                                INTEGER (0..639),
      sl1280                               INTEGER (0..1279),
      sl2560                               INTEGER (0..2559)
    }
OPTIONAL, -- Cond Setup
    duration                               INTEGER               (2..2559)
OPTIONAL, -- Need R
  (Monitoring Duration)
    monitoringSymbolsWithinSlot                          BIT STRING (SIZE (14))
OPTIONAL, -- Cond Setup
  (Monitoring symbol location in slot)
    nrofCandidates                     SEQUENCE {
  (Number of PDCCH candidates for each aggregation level)
      aggregationLevel1                  ENUMERATED {n0, n1, n2, n3, n4, n5, n6, n8},
      aggregationLevel2                  ENUMERATED {n0, n1, n2, n3, n4, n5, n6, n8},
      aggregationLevel4                  ENUMERATED {n0, n1, n2, n3, n4, n5, n6, n8},
      aggregationLevel8                  ENUMERATED {n0, n1, n2, n3, n4, n5, n6, n8},
      aggregationLevel16                 ENUMERATED {n0, n1, n2, n3, n4, n5, n6, n8}
    }
OPTIONAL, -- Cond Setup
    searchSpaceType                    CHOICE {
  (Search Space Type)
      common                                 SEQUENCE {
      (Common Search Space)
        dci-Format0-0-AndFormat1-0         SEQUENCE {
          ...
        }
OPTIONAL, -- Need R
        dci-Format2-0                      SEQUENCE {
          nrofCandidates-SFI                   SEQUENCE {
            aggregationLevel1                            ENUMERATED {n1, n2}
OPTIONAL, -- Need R
            aggregationLevel2                            ENUMERATED {n1, n2}
OPTIONAL, -- Need R
            aggregationLevel4                            ENUMERATED {n1, n2}
OPTIONAL, -- Need R
            aggregationLevel8                            ENUMERATED {n1, n2}
```

TABLE 6-continued

```
OPTIONAL, -- Need R
            aggregationLevel16                                    ENUMERATED {n1, n2}
OPTIONAL  -- Need R
          },
          ...
        }
OPTIONAL, -- Need R
        dci-Format2-1                          SEQUENCE {
          ...
        }
OPTIONAL, -- Need R
        dci-Format2-2                          SEQUENCE {
          ...
        }
OPTIONAL, -- Need R
        dci-Format2-3                          SEQUENCE {
          dummy1                                            ENUMERATED { sl1, sl2, sl4, sl5,
sl8, sl10, sl16, sl20} OPTIONAL, -- Cond Setup
          dummy2                                            ENUMERATED {n1, n2},
          ...
        }
OPTIONAL  -- Need R
      },
      ue-Specific                           SEQUENCE {
      (UE-specific search space)
        dci-Formats                                       ENUMERATED {formats0-0-And-1-
0, formats0-1-And-1-1},
          ...,
        }
    }
OPTIONAL  -- Cond Setup2
  }
```

According to the configuration information, the BS may configure the UE with one or a plurality of search space sets. The BS may configure the UE with search space set 1 and search space set 2. For the search space set 1, the UE may be configured to monitor in a CSS for a DCI format A scrambled by X-RNTI, and for the search space set 2, the UE may be configured to monitor in a USS for a DCI format B scrambled by Y-RNTI.

According to the configuration information, one or a plurality of search space sets may exist in the CSS or USS. For example, search space set #1 and search space set #2 may be configured as the CSS, and search space set #3 and search space set #4 may be configured as the USS.

The UE may monitor in the CSS for the following combinations of DCI formats and RNTIs. However, the combinations are not limited thereto.

- DCI format 0_0/1_0 with CRC scrambled by C-RNTI, CS-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI The UE may monitor in the USS for the following combinations of DCI formats and RNTIs. However, the combinations are not limited to an example set forth below.

- DCI format 0_0/1_0 with CRC scrambled by C-RNTI, CS-RNTI, TC-RNTI
- DCI format 1_0/1_1 with CRC scrambled by C-RNTI, CS-RNTI, TC-RNTI The above RNTIs may comply with the following definitions and uses.

- Cell RNTI (C-RNTI): used for scheduling a UE-specific PDSCH or PUSCH
- Temporary cell RNTI (TC-RNTI): used for scheduling a UE-specific PDSCH.
- Configured scheduling RNTI (CS-RNTI): used for scheduling a semi-statically configured UE-specific PDSCH
- RA-RNTI: used for scheduling a PDSCH in an RA procedure
- Paging RNTI (P-RNTI): used for scheduling a PDSCH on which paging information is transmitted
- System information RNTI (SI-RNTI): used for scheduling a PDSCH on which system information is transmitted
- Interruption RNTI (INT-RNTI): used for notifying of whether to puncture a PDSCH
- Transmit power control for PUSCH RNTI (TPC-PUSCH-RNTI): used for indicating a power control command for a PUSCH
- TPC for PUCCH RNTI (TPC-PUCCH-RNTI): used for indicating a power control command for a PUCCH
- TPC for sounding reference signal RNTI (TPC-SRS-RNTI): for indicating a power control command for SRS The DCI formats specified above may be defined as shown below in Table 7.

TABLE 7

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying the PRB(s) and OFDM symbol(s) where UE cancels the corresponding UL transmission from the UE |

TABLE 7-continued

| DCI format | Usage |
|---|---|
| 2_5 | Notifying the availability of soft resources |
| 2_6 | Notifying the power saving information outside DRX Active Time for one or more UEs |
| 2_7 | Notifying paging early indication and TRS availability indication for one or more UEs. |
| 3_0 | Scheduling of NR sidelink in one cell |
| 3_1 | Scheduling of LTE sidelink in one cell |
| 4_0 | Scheduling of PDSCH with CRC scrambled by MCCH-RNTI/G-RNTI for broadcast |
| 4_1 | Scheduling of PDSCH with CRC scrambled by G-RNTI/GCS-RNTI for multicast |
| 4_2 | Scheduling of PDSCH with CRC scrambled by G-RNTI/GCS-RNTI for multicast |

A search space at an aggregation level Lin a CORESET p and a search space set s may be expressed by Equation (1) below:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \quad (1)$$

In Equation (1)

L: aggregation level $n_{CI}$: carrier index $N_{CCE,p}$: total number of CCEs in CORESET p $n^{\mu}_{s,f}$: slot index $M^{(L)}_{p,s,max}$: number of PDCCH candidates at aggregation level L $m_{snCI}=0, \ldots, M^{(L)}_{p,s,max}-1$: indexes of PDCCH candidates at aggregation level L $i=0, \ldots, L-1$ $$Y_{p,n^{\mu}_{s,f}}=\left(A_p\cdot Y_{p,n^{\mu}_{s,f}-1}\right)\bmod D,$$

$$Y_{p-1}=n_{RNTI}\neq 0,$$

$$A_0=39827,$$

$$A_1=39829,$$

$$A_2=39839,$$

$$D=65537$$

$n_{RNTI}$: UE ID

For CSS, $Y_{p,n^{\mu}_{s,f}}$ value may correspond to 0.

For USS, $Y_{p,n^{\mu}_{s,f}}$ value may correspond to a value that varies according to a UE ID (C-RNTI or ID configured by a BS for a UE) and a time index.

Hereinafter, a method of configuring a TCI state for a PDCCH (or PDCCH DMRS) in the 5G communication system is described in detail.

The BS may configure and indicate a TCI state for a PDCCH (or PDCCH DMRS) via appropriate signaling. Based on the above description, it is possible for the BS to configure and indicate the TCI state for the PDCCH (or PDCCH DMRS) through appropriate signaling. The TCI state may be configured and indicated to notify of a quasi-co-location (QCL) relationship between PDCCH DMRS and another RS or channel. When a reference antenna port A (reference RS #A) is QCLed with another target antenna port B (target RS #B), the UE is allowed to apply all or some of large-scale channel parameters estimated from the antenna port A to channel estimation from the antenna port B. QCL may be required to associate different parameters according to situations such as time tracking affected by average delay and delay spread, frequency tracking affected by Doppler shift and Doppler spread, radio resource management (RRM) affected by average gain, and 4) beam management (BM) affected by a spatial parameter. Accordingly, NR supports four types of QCL relationships as shown below in Table 8.

TABLE 8

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, etc.

The QCL relationship may be configured for the UE via TCI-State and QCL-Info, which are RRC parameters, as shown below in Table 9 where the BS may configure the UE with one or more TCI states to inform the UE of a maximum of two QCL relationships (qcl-Type1 and qcl-Type2) for a RS containing a reference to an ID of the TCI state, i.e., a target RS. In this case, each piece of QCL information QCL-info included in the TCL state may include a serving cell index and a BWP index of a reference RS indicated by the corresponding QCL information, a type and an ID of the reference RS, and a QCL type as shown above in Table 8.

TABLE 9

```
TCI-State ::=                    SEQUENCE {
tci-StateId                        TCI-StateId,
(ID of corresponding TCI state)
qcl-Type1                          QCL-Info,
(QCL information of first reference RS of RS (target RS) referring to corresponding TCI state ID)
qcl-Type2                          QCL-Info
     OPTIONAL,  -- Need R
(QCL information of second reference RS of RS (target RS) referring to corresponding TCI state ID)
...
}
QCL-Info ::=                     SEQUENCE {
cell                               ServCellIndex
   OPTIONAL,  -- Need R
(Serving cell index of reference RS indicated by corresponding QCL information)
bwp-Id                             BWP-Id
```

TABLE 9-continued

```
      OPTIONAL, -- Cond CSI-RS-Indicated
  (BWP index of reference RS indicated by corresponding QCL information)
  referenceSignal                       CHOICE {
     csi-rs                                   NZP-CSI-RS-
ResourceId,
     ssb                                           SSB-Index
     (One of CSI-RS and SSB ID indicated by corresponding QCL information)
  },
  qcl-Type                                  ENUMERATED {typeA, typeB,
typeC, typeD},
  ...
  }
```

Figure 7:
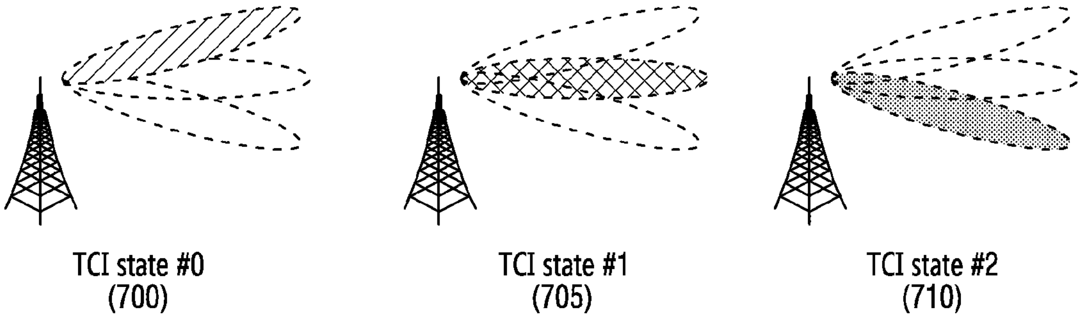
FIG. 7 illustrates BS beam allocation based on a TCI (Transmission Configuration Indication) state configuration according to an embodiment.

FIG. 7 illustrates BS beam allocation based on a TCI state configuration according to an embodiment.

Referring to FIG. 7, a BS may transmit information regarding N different beams to a UE through N different TCI states. For example, when N=3, the BS may provide notification that qcl-Type2 parameters included in three TCI states 700, 705, and 710 are associated with CSI-RS or SSB corresponding to different beams. When N=4, the BS may allow qcl-Type2 parameters to be configured with QCL type D, and thus may provide notification that antenna ports referring to the different TCI states 700, 705, and 710 are associated with different spatial Rx parameters, that is, different beams.

Specifically, TCI state combinations applicable to a PDCCH DMRS antenna port are as shown below in Table 10, where the fourth row is a combination assumed by the UE before RRC configuration, and configuration after RRC is not possible.

TABLE 10

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
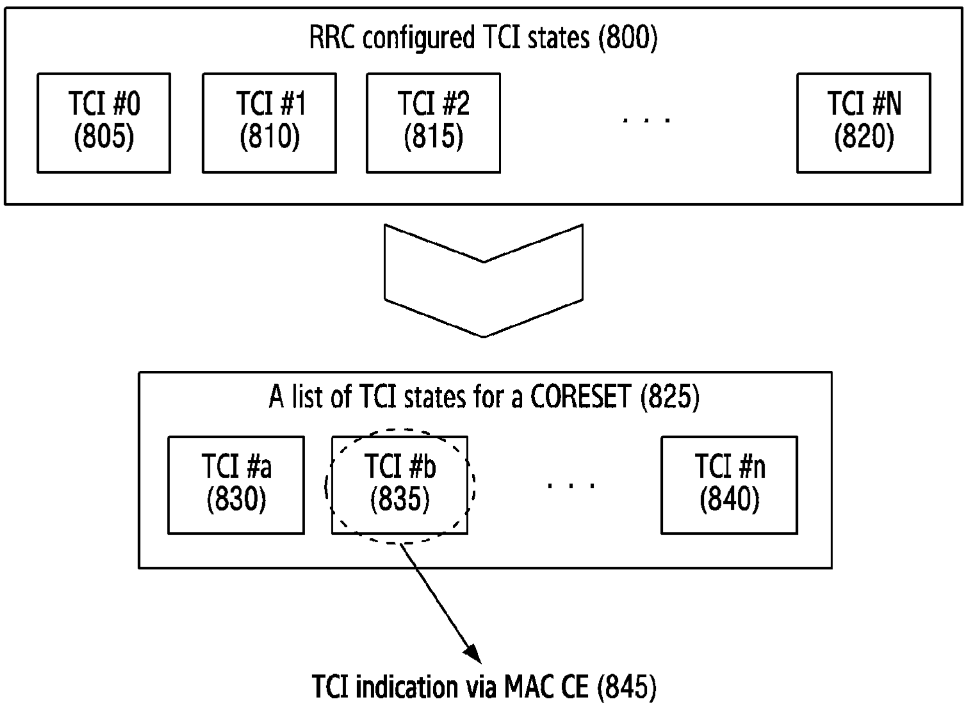
FIG. 8 illustrates a hierarchical signaling method for dynamic allocation of a PDCCH beam of NR according to an embodiment.

In NR, a hierarchical signaling method as shown in FIG. 8 is supported for dynamic allocation of a PDCCH beam. FIG. 8 illustrates a hierarchical signaling method for dynamic allocation of a PDCCH beam of NR according to an embodiment.

Referring to FIG. 8, a BS may configure N TCI states 805, 810, . . . , and 820 for a UE via RRC signaling 800, and may configure some of the TCI states as TCI states for a CORESET (825). Thereafter, the BS may indicate one of the TCI states 830, 835, and 840 for the CORESET to the UE via MAC CE signaling (845). Thereafter, the UE may receive a PDCCH based on beam information included in a TCI state indicated by the MAC CE signaling.

Figure 9:
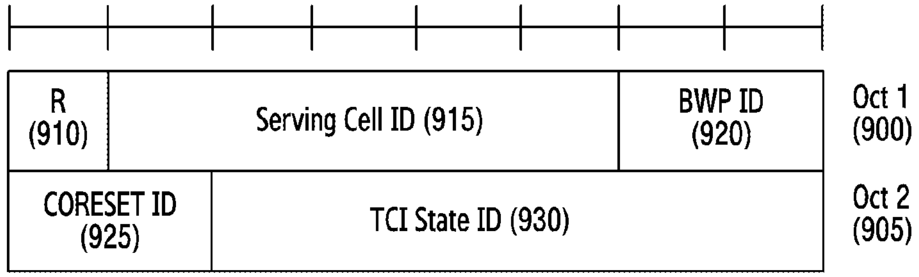
FIG. 9 illustrates a TCI indication medium access control control element (MAC CE) signaling structure for PDCCH DMRS according to an embodiment.

FIG. 9 illustrates a TCI indication MAC CE signaling structure for the PDCCH DMRS according to an embodiment.

Referring to FIG. 9, the TCI indication MAC CE signaling for the PDCCH DMRS is configured by 2 bytes (16 bits), and includes a reserved bit (R) 910 formed of 1 bit, a serving cell ID 915 formed of 5 bits, a BWP ID 920 formed of 2 bits, a CORESET ID 925 formed of 2 bits, and a TCI state ID 930 formed of 6 bits.

The BS may indicate one in a list of TCI states included in a CORESET configuration through MAC CE signaling. Thereafter, before another TCI state is indicated to the corresponding CORESET through another MAC CE signaling, the UE considers that the same QCL information is applied to one or more search spaces connected to the CORESET.

According to the above-described PDCCH beam allocation method, it is difficult to indicate a beam change faster than the MAC CE signaling delay. This method has an advantage in that the same beam is applied to respective CORESETs at once regardless of search space characteristics, flexible PDCCH beam operation is difficult. The following provides a more flexible PDCCH beam configuration and operation method. Hereinafter, in describing an embodiment of the disclosure, several distinguished examples are provided for convenience of description, but these are not mutually exclusive and can be applied by appropriately combining with each other depending on the situation.

The BS may provide, to the UE, configuration of one or multiple TCI states for a specific CORESET, and may activate one of the configured TCI states through a MAC CE activation command. For example, {TCI state #0, TCI state #1, and TCI state #2} are configured as the TCI state in CORESET #1, and the BS may transmit, to the UE, a command of activating to assume the TCI state #0 as the TCI state for CORESET #1 through the MAC CE. Based on the activation command for the TCI state received by the MAC CE, the UE may correctly receive the DMRS of the corresponding CORESET based on QCL information in the activated TCI state.

For CORESET #0 in which the index is configured to be 0, if the UE does not receive the MAC CE activation command for the TCI state of CORESET #0, the UE may assume that DMRS transmitted in CORESET #0 is QCLed with an SS/PBCH block identified during the initial access procedure or non-contention-based random access procedure that is not triggered by a PDCCH command.

In relation to CORESET #X in which the index is configured to be a value other than 0, if the UE has not received the TCI state for CORESET #X, or the UE is configured with one or more TCI states but has not received the MAC CE activation command for activating one of the TCI states, the UE may assume that DMRS transmitted in CORESET #X is QCLed with an SS/PBCH block identified during the initial access procedure.

Next, downlink control information (DCI) in a 5G system will be described in detail.

In the 5G system, scheduling information about uplink data (or physical uplink shared channel (PUSCH) or downlink data (or physical downlink shared channel (PDSCH)) is transmitted from a BS to a UE through the DCI. The UE may monitor a fallback DCI format and a non-fallback DCI format with regard to the PUSCH or the PDSCH. The fallback DCI format may include a fixed field predefined between the BS and the UE, and the non-fallback DCI format may include a configurable field.

The DCI may be transmitted through a PDCCH after channel coding and modulation is performed thereon. A cyclic redundancy check (CRC) may be attached to a DCI message payload, and the CRC may be scrambled by an RNTI corresponding to the identification information of the UE. Different RNTIs may be used according to the purpose of the DCI message a UE-specific data transmission, a power adjustment command, or an RA response. That is, the RNTI is not explicitly transmitted, but is included in a CRC calculation process and then transmitted. When receiving the DCI message transmitted through the PDCCH, the UE may check a CRC by using an assigned RNTI. When a CRC check result is correct, the UE may know that the corresponding message has been transmitted to the UE.

For example, DCI for scheduling a PDSCH for system information (SI) may be scrambled by an SI-RNTI. DCI for scheduling a PDSCH for an RA response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling UE-specific PDSCH or PUSCH may be scrambled by a cell RNTI (C-RNTI).

DCI format 0_0 may be used as a fallback DCI for scheduling a PUSCH. A CRC may be scrambled by a C-RNTI. The DCI format 0_0 in which the CRC is scrambled by the C-RNTI may include pieces of information as shown below in Table 11.

TABLE 11

Identifier for DCI formats - 1 bit
The value of this bit field is always set to 0, indicating an UL DCI format Frequency domain resource assignment - $\lceil \log_2(N_{RB}^{UL,BWP}(N_{RB}^{UL,BWP}+1)/2 \rceil$ bits where $N_{RB}^{UL,BWP}$ is defined in subclause 7.3.1.0

For PUSCH hopping with resource allocation type 1:
$N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values $\lceil \log_2(N_{RB}^{UL,BWP}(N_{RB}^{UL,BWP}+1)/2 \rceil - N_{UL\_hop}$ bits provides the frequency domain resource allocation according to Subclause 6.1.2.2.2 of [6, TS 38.214]
For non-PUSCH hopping with resource allocation type 1:

$\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
Time domain resource assignment- 4 bits as defined in Subclause 6.1.2.1 of [6, TS 38.214]
Frequency hopping flag - 1 bit according to Table 7.3.1.1.1-3, as defined in Subclause 6.3 of [6, TS 38.214]
Modulation and coding scheme - 5 bits as defined in Subclause 6.1.4.1 of [6, TS 38.214]
New data indicator - 1 bit
Redundancy version - 2 bits as defined in Table 7.3.1.1.1-2
HARQ process number - 4 bits
Transmit power control (TPC) command for scheduled PUSCH - 2 bits as defined in Subclause 7.1.1 of [5, TS 38.213]
Padding bits, if required.
Uplink (UL)/Supplementary UL (SUL) indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
If the UL/SUL indicator is not present in DCI format 0_0 and pucch-Config is configured, the corresponding PUSCH scheduled by the DCI format 0_0 is for the UL or SUL for which high layer parameter pucch-Config is configured.
If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as a non-fallback DCI for scheduling a PUSCH. Here, a CRC may be scrambled by a C-RNTI. The DCI format 0_1 in which the CRC is scrambled by the C-RNTI may include pieces of information as shown below in Table 12.

TABLE 12

Identifier for DCI formats - 1 bit
The value of this bit field is always set to 0, indicating an UL DCI format
Carrier indicator - 0 or 3 bits, as defined in Subclause 10.1 of [5, TS 38.213].
Uplink (UL)/Supplementary UL (SUL) indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
Bandwidth part indicator - 0, 1 or 2 bits as determined by the number of UL BWPs $n_{BWP,RRC}$ configured by higher layers, excluding the initial UL bandwidth part. The bit width for this field is determined as $\lceil \log_2(n_{BWP}) \rceil$ bits, where
$n_{BWP} = n_{BWP,RRC} + 1$ if $n_{BWP,RRC} \le 3$, in which case the bandwidth part indicator is equivalent to the ascending order of the higher layer parameter BWP-Id;
otherwise $n_{BWP} = n_{BWP,RRC}$, in which case the bandwidth part indicator is defined in Table 7.3.1.1.2-1;
If a UE does not support active BWP change via DCI, the UE ignores this bit field.
Frequency domain resource assignment - number of bits determined by the following, where $N_{RB}^{UL,BWP}$ is the size of the active UL bandwidth part:
$N_{RBG}$ bits if only resource allocation type 0 is configured, where $N_{RBG}$ is defined in Subclause 6.1.2.2.1 of [6, TS 38.214],
$\lceil \log_2(N_{RB}^{UL,BWP}(N_{RB}^{UL,BWP}+1)/2) \rceil$ bits if only resource allocation type 1 is configured, or $\max(\lceil \log_2(N_{RB}^{UL,BWP}(N_{RB}^{UL,BWP}+1)/2) \rceil, N_{RBG})+1$ bits if both resource allocation type 0 and 1 are configured.
If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the NRBG LSBs provide the resource allocation as defined in Subclause 6.1.2.2.1 of [6, TS 38.214].
For resource allocation type 1, the $\lceil \log_2(N_{RB}^{UL,BWP}(N_{RB}^{UL,BWP}+1)/2) \rceil$ LSBs provide the resource allocation as follows:
For PUSCH hopping with resource allocation type 1:
$N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
$\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
For non-PUSCH hopping with resource allocation type 1:
$\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bit width of the "Frequency domain resource assignment" field of the active bandwidth part is smaller than the bit width of the "Frequency domain resource assignment" field of the indicated bandwidth part.
Time domain resource assignment - 0, 1, 2, 3, or 4 bits as defined in Subclause 6.1.2.1 of [6, TS 38.214]. The bit width for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
Frequency hopping flag - 0 or 1 bit:
0 bit if only resource allocation type 0 is configured or if the higher layer parameter frequencyHopping is not configured;
1 bit according to Table 7.3.1.1.1-3 otherwise, only applicable to resource allocation type 1, as defined in Subclause 6.3 of [6, TS 38.214].
Modulation and coding scheme - 5 bits as defined in Subclause 6.1.4.1 of [6, TS 38.214]
New data indicator - 1 bit TABLE 12-continued Redundancy version - 2 bits as defined in Table 7.3.1.1.1-2
HARQ process number - 4 bits
1st downlink assignment index - 1 or 2 bits:
1 bit for semi-static HARQ-ACK codebook;
2 bits for dynamic HARQ-ACK codebook.
2nd downlink assignment index - 0 or 2 bits:
2 bits for dynamic HARQ-ACK codebook with two HARQ-ACK sub-codebooks;
0 bit otherwise.
Transmit power control (TPC) command for scheduled PUSCH - 2 bits as defined in Subclause 7.1.1 of [5, TS 38.213]
Sounding Reference Signal (SRS) resource indicator -

$\left\lceil \log_2\left(\sum_{k=1}^{min\{LSRS_{max}\{\}\}\Sigma} \binom{N_{SRS}}{k}()\right)\right\rceil$ or $\lceil \log_2(N_{SRS})\rceil$ bits, where $N_{SRS}$ is the number of configured SRS resources in the SRS resource set associated with the higher layer parameter usage of value 'codeBook' or 'nonCodeBook', $\left\lceil \log_2\left(\sum_{k=1}^{min\{LSRS_{max}\{\}\}\Sigma} \binom{N_{SRS}}{k}()\right)\right\rceil$ bits according to Tables 7.3.1.1.2-28/29/30/31 if the higher layer parameter txConfig = nonCodebook, where NSRS is the number of configured SRS resources in the SRS resource set associated with the higher layer parameter usage of value 'nonCodeBook' and if UE supports operation with maxMIMO-Layers and the higher layer parameter maxMIMO-Layers of PUSCH-ServingCellConfig of the serving cell is configured, Lmax is given by that parameter otherwise, Lmax is given by the maximum number of layers for PUSCH supported by the UE for the serving cell for non-codebook based operation.

$\lceil \log_2(N_{SRS})\rceil$ bits according to Tables 7.3.1.1.2-32 if the higher layer parameter txConfig = codebook, where NsRS is the number of configured SRS resources in the SRS resource set associated with the higher layer parameter usage of value 'codeBook'.

Precoding information and number of layers- number of bits determined by the following:
0 bits if the higher layer parameter txConfig = nonCodeBook;
0 bits for 1 antenna port and if the higher layer parameter txConfig = codebook;
4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;
2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset;
2 or 4 bits according to Table7.3.1.1.2-4 for 2 antenna ports, if txConfig = codebook, and according to whether transform precoder is enabled or disabled, and the values of higher layer parameters maxRank and codebookSubset;
1 or 3 bits according to Table7.3.1.1.2-5 for 2 antenna ports, if txConfig = codebook, and according to whether transform precoder is enabled or disabled, and the values of higher layer parameters maxRank and codebookSubset.

Antenna ports - number of bits determined by the following
2 bits as defined by Tables 7.3.1.1.2-6, if transform precoder is enabled, dmrs-Type = 1, and maxLength = 1;
4 bits as defined by Tables 7.3.1.1.2-7, if transform precoder is enabled, dmrs-Type = 1, and maxLength = 2;
3 bits as defined by Tables 7.3.1.1.2-8/9/10/11, if transform precoder is disabled, dmrs-Type = 1, and maxLength = 1, and the value of rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-16/17/18/19, if transform precoder is disabled, dmrs-Type = 2, and maxLength = 1, and the value of rank is determined according to the SRS resource indicator field if the higher layer parameter txConfig = nonCodebook and according to the Precoding information and number of layers field if the higher layer parameter txConfig = codebook;
5 bits as defined by Tables 7.3.1.1.2-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook.

where the number of CDM groups without data of values 1, 2, and 3 in Tables 7.3.1.1.2-6 to 7.3.1.1.2-23 refers to CDM groups {0}, {0, 1}, and {0, 1, 2} respectively.

If a UE is configured with both dmrs-UplinkForPUSCH-MappingTypeA and dmrs-UplinkForPUSCH-MappingTypeB, the bitwidth of this field equals $\max\{x_A, x_B\}$, where $x_A$ is the "Antenna ports" bitwidth derived according to dmrs-UplinkForPUSCH-MappingTypeA and TABLE 12-continued $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.

SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].

Channel State Information (CSI) request - 0, 1, 2, 3, 4, 5, or 6 bits determined by higher layer parameter reportTriggerSize.

Code Block Group (CBG) transmission information (CBGTI) - 0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH.

Phase Tracking Reference Signal (PTRS)- Demodulation Reference Signal (DMRS) association - number of bits determined as follows 0 bit if PTRS-UplinkConfig is not configured and transform precoder is disabled, or if transform precoder is enabled, or if maxRank = 1;

2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field.

If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part.

beta_offset indicator - 0 if the higher layer parameter betaOffsets = semiStatic; otherwise 2 bits as defined by Table 9.3-3 in [5, TS 38.213].

Demodulation reference signal (DMRS) sequence initialization - 0 bit if transform precoder is enabled; 1 bit if transform precoder is disabled.

Uplink-Data channel (UL-SCH) indicator- 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s).

DCI format 1_0 may be used as a fallback DCI for scheduling a PDSCH. Here, a CRC may be scrambled by a C-RNTI. The DCI format 1_0 in which the CRC is scrambled by the C-RNTI may include the following pieces of information as shown below in Table 13.

TABLE 13

Identifier for DCI formats - 1 bits

The value of this bit field is always set to 1, indicating a DL DCI format

Frequency domain resource assignment - $\lceil \log_2(N_{RB}^{DL,BWP}(N_{RB}^{DL,BWP}+1)/2) \rceil$ bits where $N_{RB}^{DL,BWP}$ is given by subclause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index - 6 bits according to ra-PreambleIndex in Subclause 5.1.2 of [8, TS 38.321]

UL/Supplementary UL (SUL) indicator - 1 bit. If the value of the "Random Access Preamble index" is not all zeros and if the UE is configured with supplementaryUplink ServingCellConfig in the cell, this field indicates which UL carrier in the cell to transmit the in PRACH according to Table 7.3.1.1.1-1; otherwise, this field is reserved Synchronization Signal (SS)/Physical Broadcast Channel (PBCH) index - 6 bits. If the value of the "Random Access Preamble index" is not all zeros, this field indicates the SS/PBCH that shall be used to determine the RACH occasion for the PRACH transmission; otherwise, this field is reserved.

Physical Random Access Channel (PRACH) Mask index- 4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS 38.321]; otherwise, this field is reserved Reserved bits - 10 bits Otherwise, all remaining fields are set as follows:

Time domain resource assignment - 4 bits as defined in Subclause 5.1.2.1 of [6, TS 38.214]

Virtual Resource Block (VRB)-to- physical resource block (PRB) mapping - 1 bit according to Table 7.3.1.2.2-5

Modulation and coding scheme - 5 bits as defined in Subclause 5.1.3 of [6, TS 38.214]

TABLE 13-continued

| |
|---|
| New data indicator - 1 bit<br>Redundancy version - 2 bits as defined in Table 7.3.1.1.1-2<br>HARQ process number - 4 bits<br>Downlink assignment index - 2 bits as defined in Subclause 9.1.3 of [5, TS 38.213], as counter DAI<br>Transmit Power Control (TPC) command for scheduled PUCCH - 2 bits as defined in Subclause 7.2.1 of [5, TS 38.213]<br>PUCCH resource indicator - 3 bits as defined in Subclause 9.2.3 of [5, TS 38.213]<br>PDSCH-to-HARQ_feedback timing indicator - 3 bits as defined in Subclause 9.2.3 of [5, TS 38.213] |

DCI format 1_1 may be used as a non-fallback DCI for scheduling a PDSCH. Here, a CRC may be scrambled by a C-RNTI. The DCI format 1_1 in which the CRC is scrambled by the C-RNTI may include pieces of information as shown below in Table 14.

TABLE 14

Identifier for DCI formats - 1 bits

The value of this bit field is always set to 1, indicating a DL DCI format

Carrier indicator - 0 or 3 bits as defined in Subclause 10.1 of [5, TS 38.213].

Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where $n_{BWP} = n_{BWP,RRC} + 1$ if $n_{BWP,RRC} \le 3$, in which case the bandwidth part indicator is equivalent to the ascending order of the higher layer parameter BWP-Id;

otherwise $n_{BWP} = n_{BWP,RRC}$, in which case the bandwidth part indicator is defined in Table 7.3.1.1.2-1;

If a UE does not support active BWP change via DCI, the UE ignores this bit field.

Frequency domain resource assignment - number of bits determined by the following, where $N_{RB}^{DL,BWP}$ is the size of the active DL bandwidth part:

$N_{RBG}$ bits if only resource allocation type 0 is configured, where $N_{RBG}$ is defined in Subclause 5.1.2.2.1 of [6, TS 38.214], $\lceil \log_2(N_{RB}^{DL,BWP}(N_{RB}^{DL,BWP}+1)/2) \rceil$ bits if only resource allocation type 1 is configured, or $\max(\lceil \log_2(N_{RB}^{DL,BWP}(N_{RB}^{DL,BWP}+1)/2) \rceil, N_{RBG}) + 1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, theNRBG LSBs provide the resource allocation as defined in Subclause 5.1.2.2.1 of [6, TS 38.214].

For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]

If “Bandwidth part indicator” field indicates a bandwidth part other than the active bandwidth part and if both resource allocation type 0 and 1 are configured for the indicated bandwidth part, the UE assumes resource allocation type 0 for the indicated bandwidth part if the bitwidth of the “Frequency domain resource assignment” field of the active bandwidth part is smaller than the bitwidth of the “Frequency domain resource assignment” field of the indicated bandwidth part.

Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.

Virtual resource block (PRB)-to- physical resource block (PRB) mapping - 0 or 1 bit:

0 bit if only resource allocation type 0 is configured or if interleaved VRB-to-PRB mapping is not configured by high layers;

1 bit according to Table 7.3.1.2.2-5 otherwise, only applicable to resource allocation type 1, as defined in Subclause 7.3.1.6 of [4, TS 38.211].

PRB bundling size indicator - 0 bit if the higher layer parameter prb-BundlingType is not configured or is set to ‘static’, or 1 bit if the higher layer parameter prb-BundlingType is set to ‘dynamic’ according to Subclause 5.1.2.3 of [6, TS 38.214].

TABLE 14-continued

Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.

Zero power channel state information-reference signal (ZP CSI-RS) trigger - 0, 1, or 2 bits as defined in Subclause 5.1.4.2 of [6, TS 38.214]. The bitwidth for this field is determined as $\lceil \log_2(n_{ZP}+1) \rceil$ bits, where $n_{ZP}$ is the number of aperiodic ZP CSI-RS resource sets configured by higher layer.

For transport block 1:

Modulation and coding scheme - 5 bits as defined in Subclause 5.1.3.1 of [6, TS 38.214]

New data indicator - 1 bit

Redundancy version - 2 bits as defined in Table 7.3.1.1.1-2

For transport block 2 (only present if maxNrofCode WordsScheduledByDCI equals 2):

Modulation and coding scheme - 5 bits as defined in Subclause 5.1.3.1 of [6, TS 38.214]

New data indicator - 1 bit

Redundancy version - 2 bits as defined in Table 7.3.1.1.1-2

If "Bandwidth part indicator" field indicates a bandwidth part other than the active bandwidth part and the value of maxNrofCode WordsScheduledByDCI for the indicated bandwidth part equals 2 and the value of maxNrofCode WordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS 38.213], and the UE ignores the "Modulation and coding scheme", "New data indicator", and "Redundancy version" fields of transport block 2 for the indicated bandwidth part.

HARQ process number - 4 bits

Downlink assignment index - number of bits as defined in the following 4 bits if more than one serving cell are configured in the DL and the higher layer parameter pdsch-HARQ-ACK-Codebook = dynamic, where the 2 MSB bits are the counter DAI and the 2 LSB bits are the total DAI;

2 bits if only one serving cell is configured in the DL and the higher layer parameter pdsch-HARQ-ACK-Codebook = dynamic, where the 2 bits are the counter DAI;

0 bits otherwise.

Transmit power control (TPC) command for scheduled PUCCH - 2 bits as defined in Subclause 7.2.1 of [5, TS 38.213]

PUCCH resource indicator - 3 bits as defined in Subclause 9.2.3 of [5, TS 38.213]

PDSCH-to-HARQ_feedback timing indicator - 0, 1, 2, or 3 bits as defined in Subclause 9.2.3 of [5, TS 38.213]. The bitwidth for this field is determined as [log2(I)] bits, where I is the number of entries in the higher layer parameter dl-DataToUL-ACK.

Antenna port(s) - 4, 5, or 6 bits as defined by Tables 7.3.1.2.2-1/2/3/4, where the number of CDM groups without data of values 1, 2, and 3 refers to CDM groups {0}, {0, 1}, and {0, 1, 2} respectively. The antenna ports $\{P_0, \ldots, P_{v-1}\}$ shall be determined according to the ordering of DMRS port(s) given by Tables 7.3.1.2.2-1/2/3/4.

If a UE is configured with both dmrs-DownlinkForPDSCH-MappingTypeA and dmrs-DownlinkForPDSCH-MappingTypeB, the bitwidth of this field equals max $\{x_A, x_B\}$, where $x_A$ is the "Antenna ports" bitwidth derived according to dmrs-DownlinkForPDSCH-MappingTypeA and XB is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.

Transmission configuration indication - 0 bit if higher layer parameter tci-PresentInDCI is not enabled; otherwise 3 bits as defined in Subclause 5.1.5 of [6, TS 38.214].

If "Bandwidth part indicator" field indicates a bandwidth part other than the active bandwidth part, if the higher layer parameter tci-PresentInDCI is not enabled for the CORESET used for the PDCCH carrying the DCI format 1_1, the UE assumes tci-PresentInDCI is not enabled for all CORESETs in the indicated bandwidth part;

otherwise, the UE assumes tci-PresentInDCI is enabled for all CORESETs in the indicated bandwidth part.

SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].

CBG transmission information (CBGTI) - 0 bit if higher layer parameter codeBlockGroupTransmission for PDSCH is not configured, otherwise, 2, 4, 6, or 8 bits as defined in Subclause 5.1.7 of [6, TS 38.214], determined by the higher layer parameters maxCodeBlockGroupsPerTransportBlock and maxNrofCode WordsScheduledByDCI for the PDSCH.

CBG flushing out information (CBGFI) - 1 bit if higher layer parameter codeBlockGroupFlushIndicator is configured as "TRUE", 0 bit otherwise.

Demodulation reference signal (DMRS) sequence initialization - 1 bit.

Hereinafter, a method of allocating time domain resources to a data channel in a 5G communication system will be described.

A BS may configure, for a UE, a table for time-domain resource allocation information for a DL data channel (physical downlink shared channel (PDSCH)) and a UL data channel (PUSCH) via higher layer signaling (e.g., RRC signaling). For example, the BS may configure, for a PDSCH, a table including maxNrofDL-Allocations=16 entries, and configure, for PUSCH, a table including maxNrofUL-Allocations=16 entries. In an embodiment, the time-domain resource allocation information may include PDCCH-to-PDSCH slot timing (corresponding to a time interval in slot units between a time point at which a PDCCH is received and a time point at which a PDSCH scheduled by the received PDCCH is transmitted, and denoted by K0), PDCCH-to-PUSCH slot timing (corresponding to a time interval in slot units between a time point at which a PDCCH is received and a time point at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, information as shown below in Table 15 or Table 16 may be transmitted from the BS to the UE.

TABLE 15

```
  PDSCH-TimeDomainResourceAllocationList information element
  PDSCH-TimeDomainResourceAllocationList ::=   SEQUENCE (SIZE(1..maxNrofDL-Allocations)) OF
PDSCH-TimeDomainResourceAllocation
  PDSCH-TimeDomainResourceAllocation ::=        SEQUENCE {
    k0                                            INTEGER(0..32)
OPTIONAL,   -- Need S
    (PDCCH-to-PDSCH timing, in slot units)
  mappingType                       ENUMERATED {typeA, typeB},
    (PDSCH mapping type)
  startSymbolAndLength              INTEGER (0..127)
  (Start symbol and length of PDSCH)
  }
```

TABLE 16

```
  PUSCH-TimeDomainResourceAllocation information element
  PUSCH-TimeDomainResourceAllocationList ::=    SEQUENCE (SIZE(1..maxNrofUL-Allocations))
OF PUSCH-TimeDomainResourceAllocation
  PUSCH-TimeDomainResourceAllocation ::=        SEQUENCE {
    k2                                            INTEGER(0..32)     OPTIONAL,  --
Need S
    (PDCCH-to-PUSCH timing, in slot units)
    mappingType                                   ENUMERATED {typeA, typeB},
    (PUSCH mapping type)
    startSymbolAndLength                        INTEGER (0..127)
    (Start symbol and length of PUSCH)
  }
```

The BS may notify one of the entries in the above-described table representing the time-domain resource allocation information to the UE via L1 signaling (e.g., DCI) (e.g., may be indicated by a "time-domain resource allocation" field in DCI). The UE may acquire time-domain resource allocation information for the PDSCH or PUSCH based on the DCI received from the BS.

Hereinafter, a method of allocating a frequency domain resource to a data channel in a 5G communication system will be described.

In the 5G system, two types of resource allocation type 0 and resource allocation type 1 may be supported as a method of indicating frequency domain resource allocation information for a DL data channel (PDSCH) and a UL data channel (PUSCH).

Resource Allocation Type 0

RB allocation information may be notified from the BS to the UE in a bitmap for a resource block group (RBG). The RBG may include a set of consecutive VRBs, and the size P of the RBG may be determined based on a value configured as a higher layer parameter (rbg-Size) and a BWP size value defined as shown below in Table 17.

TABLE 17

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number ($N_{RBG}$) of RBGs of the BWP i with the size of $$N_{BWPi}^{size}$$

may be defined as follows.

$N_{RBG} = \lceil N_{BWPi}^{size} + (N_{BWPi}^{start} \bmod P) \rceil / P$, where the size of the first RBG is $RBG_0^{size} = P - (N_{BWPi}^{start} \bmod P)$, the size of last RBG is $RBG_{last}^{size} = (N_{BWPi}^{start} + N_{BWPi}^{start}) \bmod P$, if $(N_{BWPi}^{start} + N_{BWPi}^{start}) \bmod P > 0$ and P otherwise, the size of all other RBGs is P.

Each of bits of the bitmap with the size of $N_{RBG}$ bits may correspond to each RBG. RBGs may be indexed in the order of increasing frequency, starting from the lowest frequency position of the BWP. For $N_{RBG}$ RBGs in the BWP, RBG #0 to RBG #($N_{RBG}$−1) may be mapped from the MSB to the LSB of the RBG bitmap. When a specific bit value in the bitmap is 1, the UE may determine that the RBG corresponding to the bit value is allocated, and when a specific bit value in the bitmap is 0, the UE may determine that the RBG corresponding to the bit value is not allocated.

The BS may semi-statically configure the UE with time and frequency transmission resources and various transmission and reception parameters for the PDSCH and PUSCH for the purpose of supporting grant free-based transmission and reception for the physical downlink shared channel (PDSCH) or PUSCH to the UE.

More specifically, the BS may configure the UE with the following pieces of information via RRC signaling, as shown below in Table 18, for the purpose of to support DL semi-persistent scheduling (SPS).

TABLE 18

```
SPS-Config ::=                                    SEQUENCE {
  periodicity (Transmission period)                 ENUMERATED {ms10, ms20, ms32, ms40, ms64,
ms80, ms128, ms160, ms320, ms640,
  spare6, spare5, spare4, spare3, spare2, spare1},
  nrofHARQ-Processes (HARQ process number)          INTEGER (1..8),
  n1PUCCH-AN (HARQ transmission resource)                PUCCH-ResourceId
OPTIONAL,   -- Need M
  mcs-Table (MCS table)                                  ENUMERATED {qam64LowSE}
OPTIONAL,   -- Need S
  ...
  }
```

Resource Allocation Type 1

RB allocation information may be notified from the BS to the UE as information about the start position and length of the consecutively allocated VRBs. In this case, interleaving or non-interleaving may be additionally applied to the consecutively allocated VRBs. The resource allocation field of resource allocation type 1 may include a resource indication value (RIV), and the RIV may include the start point ($RB_{start}$) of the VRB and the length ($L_{RBs}$) of the consecutively allocated RB. More specifically, the RIV in the BWP with the size of $$N_{BWP}^{size}$$

may be defined as follows.

if $(L_{RBs} - 1) \leq \lfloor N_{BWP}^{size}/2 \rfloor$ then $$RIV = N_{BWP}^{size}(L_{RBs} - 1) + RB_{start}$$

else $$RIV = N_{BWP}^{size}(N_{BWP}^{size} - L_{RBs} + 1) + (N_{BWP}^{size} - 1 - RB_{start})$$

where $L_{RBs} \geq 1$ and shall not exceed $N_{BWP}^{size} - RB_{start}$.

DL SPS may be configured in a primary cell or a secondary cell, and the DL SPS may be configured in one cell within one cell group.

With regard to a transmission method based on a grant-free (or is also referred to as a configured grant) for a UL data channel (e.g., PUSCH), the 5G system supports two types: grant-free based PUSCH transmission type 1 (or type-1 PUSCH transmission with a configured grant); and grant-free based PUSCH transmission type 2 (or type-2 PUSCH transmission with a configured grant).

Grant-Free Based PUSCH Transmission Type 1

In the grant-free based PUSCH transmission type 1, the BS may configure the UE with particular time/frequency resources 600 that allow grant-free based PUSCH transmission through higher layer signaling, e.g., RRC signaling. For example, as shown in FIG. 6, time domain allocation information 601, frequency domain allocation information 602, periodicity information 603, etc., for the resources 600 may be configured by RRC signaling. The BS may configure the UE with various parameters for PUSCH transmission (e.g., frequency hopping, DMRS configuration, an MCS table, an MCS, an RBG size, the number of repeated transmission times, an RV, etc.) via higher layer signaling. Specifically, configuration information as shown below in Table 19 may be included.

TABLE 19

```
ConfiguredGrantConfig ::=                                     SEQUENCE {
  frequencyHopping (Frequency hopping)                              ENUMERATED {mode1,
mode2}                                                                OPTIONAL,    --
Need S,
  cg-DMRS-Configuration  (DMRS configuration)                       DMRS-
UplinkConfig,
  mcs-Table                                                           ENUMERATED
{qam256, spare1}                                                    OPTIONAL,    -- Need S
  mcs-TableTransformPrecoder (MCS table)                      ENUMERATED {qam256, spare1}
                                                                    OPTIONAL,    -- Need S
  uci-OnPUSCH (UCI on PUSCH or not)
  SetupRelease { CG-UCI-OnPUSCH },
  resource Allocation                         (Resource allocation type)     ENUMERATED
{ resourceAllocationType0, resourceAllocationType1, dynamicSwitch },
  rbg-Size (RBG size)                                                 ENUMERATED
{config2}
  OPTIONAL,                   -- Need S
  powerControlLoopToUse(closed loop power adjustment)               ENUMERATED {n0, n1},
  p0-PUSCH-Alpha (Power adjustment parameter)
  P0-PUSCH-AlphaSetId,
  transformPrecoder (Transform precoding applied or not)
  ENUMERATED {enabled}
    OPTIONAL,                                 -- Need S
  nrofHARQ-Processes (HARQ process number)                    INTEGER(1..16),
  repK (Number of repetitions)
  ENUMERATED {n1, n2, n4, n8},
  repK-RV (Redundancy version)
  ENUMERATED {s1-0231, s2-0303, s3-0000}
  OPTIONAL,                   -- Cond RepK
  periodicity                                                         ENUMERATED {
  sym2, sym7, sym1x14, sym2x14, sym4x14, sym5x14, sym8x14, sym10x14, sym16x14, sym20x14,
  sym32x14, sym40x14, sym64x14, sym80x14, sym128x14, sym160x14, sym256x14, sym320x14,
sym512x14,
  sym640x14, sym1024x14, sym1280x14, sym2560x14, sym5120x14,
  sym6, sym1x12, sym2x12, sym4x12, sym5x12, sym8x12, sym10x12, sym16x12, sym20x12,
sym32x12,
  sym40x12, sym64x12, sym80x12, sym128x12, sym160x12, sym256x12, sym320x12, sym512x12,
sym640x12,
  sym1280x12, sym2560x12
                                                                                   },
  configuredGrantTimer (Configured grant timer)                     INTEGER (1..64)
                                                                      OPTIONAL,    --
Need R
  rrc-ConfiguredUplinkGrant                                   SEQUENCE {
                          timeDomainOffset(Time domain offset)
  INTEGER (0..5119),
                          timeDomainAllocation(Time domain allocation)
  INTEGER (0..15),
                          frequencyDomainAllocation(Frequency domain allocation)
  BIT STRING (SIZE(18)),
      antennaPort(Antenna port)                                     INTEGER  (0..31),
      dmrs-SeqInitialization(DMRS sequence initialization)                   INTEGER
(0..1)                                                              OPTIONAL,     -- Cond
NoTransformPrecoder
      precodingAndNumberOfLayers(Precoding and number of layers)
  INTEGER (0..63),
      srs-ResourceIndicator(SRS resource indicator)                   INTEGER
(0..15),
                          mcsAndTBS(MCS and TBS)
  INTEGER (0..31),
                          frequencyHoppingOffset(Frequency hopping offset)           INTEGER
(1..maxNrofPhysicalResourceBlocks-1)                      OPTIONAL,    -- Need M
                          pathlossReferenceIndex(Path-loss reference index)     INTEGER
(0..maxNrofPUSCH-PathlossReferenceRSs-1),
                          ...
  }
    OPTIONAL   -- Need R
  }
```

When receiving configuration information for the grant-free based PUSCH transmission type 1 from the BS, the UE may transmit a PUSCH through the periodically configured resources 600 without a grant from the BS. The various parameters required for PUSCH transmission (e.g., frequency hopping, DMRS configuration, an MCS, an RBG size, the number of repeated transmission times, an RV, precoding and the number of layers, antenna ports, a frequency hopping offset, etc.) may all comply with configuration values notified by the BS.

Grant-Free Based PUSCH Transmission Type 2

In the grant-free based PUSCH transmission type 2, the BS may configure the UE with some (e.g., periodicity information 603) of the information about particular time/frequency resources 600 that allow grant-free based PUSCH transmission through higher layer signaling, e.g., RRC signaling. The BS may configure the UE with various parameters for PUSCH transmission (e.g., frequency hopping, DMRS configuration, an MCS table, an RBG size, the number of repeated transmission times, an RV, etc.) via higher layer signaling. Specifically, the BS may configure the UE with configuration information as shown below in Table 20 by higher layer signaling.

TABLE 20

```
ConfiguredGrantConfig ::=                                SEQUENCE {
  frequencyHopping (Frequency hopping)                     ENUMERATED
{mode1, mode2}
  OPTIONAL,                              -- Need S,
  cg-DMRS-Configuration (DMRS configuration)                  DMRS-
UplinkConfig,
  mcs-Table
  ENUMERATED {qam256, spare 1 }
  OPTIONAL,                              -- Need S
  mcs-TableTransformPrecoder (MCS table)                 ENUMERATED   {qam256,
spare1}                                                    OPTIONAL,        --
Need S
  uci-OnPUSCH (UCI on PUSCH or not)
  SetupRelease { CG-UCI-OnPUSCH },
(Resource allocation type)
  resource Allocation   (Resource allocation type)             ENUMERATED
{ resource AllocationType0, resource AllocationType1, dynamicSwitch },
  rbg-Size (RBG size)
  ENUMERATED {config2}
                                         OPTIONAL,   -- Need S
  powerControlLoopToUse(Closed loop power adjustment)          ENUMERATED {n0,
n1},
  p0-PUSCH-Alpha (Power adjustment parameter)
  P0-PUSCH-AlphaSetId,
  transformPrecoder (Transform precoding applied or not)
  ENUMERATED {enabled}
                                         OPTIONAL,   -- Need S
  nrofHARQ-Processes (HARQ process number)               INTEGER(1..16),
  repK (Number of repetitions)
    ENUMERATED {n1, n2, n4, n8},
  repK-RV (Redundancy version)
  ENUMERATED {s1-0231, s2-0303, s3-0000}
  OPTIONAL,                              -- Cond RepK
  periodicity
  ENUMERATED {
  sym2, sym7, sym1x14, sym2x14, sym4x14, sym5x14, sym8x14, sym10x14, sym16x14,
sym20x14,
  sym32x14, sym40x14, sym64x14, sym80x14, sym128x14, sym160x14, sym256x14,
sym320x14, sym512x14,
  sym640x14, sym1024x14, sym1280x14, sym2560x14, sym5120x14,
  sym6, sym1x12, sym2x12, sym4x12, sym5x12, sym8x12, sym10x12, sym16x12, sym20x12,
sym32x12,
  sym40x12, sym64x12, sym80x12, sym128x12, sym160x12, sym256x12, sym320x12,
sym512x12, sym640x12,
  sym1280x12, sym2560x12
                                                                                 },
  configuredGrantTimer (Configured grant timer)            INTEGER (1..64)
  OPTIONAL,                              -- Need R
  }
```

The BS may transmit DCI consisting of a specific DCI field value to the UE for the purpose of scheduling activation or scheduling release for DL SPS and UL grant Type 2.

More specifically, the BS may configure the UE with a configured scheduling RNTI (CS-RNTI), and the UE may monitor a DCI format in which a CRC is scrambled by the CS-RNTI. When a CRC of a DCI format received by the UE is scrambled by the CS-RNTI, a new data indicator (NDI) is configured as “0”, and the DCI field satisfies Table 21 below, the UE may regard the DCI as a command to activate transmission and reception for DL SPS or UL grant Type 2.

TABLE 21

| | DCI format 0_0/0_1 | DCI format 1_0 | DCI format 1_1 |
|---|---|---|---|
| HARQ process number | set to all ‘0’s | set to all ‘0’s | set to all ‘0’s |
| Redundancy version | set to ‘00’ | set to ‘00’ | For the enabled transport block: set to ‘00’ |

The BS may configure a configured scheduling-RNTI (CS-RNTI) for the UE, and the UE may monitor the DCI format in which the CRC is scrambled by CS-RNTI. When the CRC of the DCI format received by the UE is scrambled by CS-RNTI, a new data indicator (NDI) is configured as “0”, and the DCI field satisfies Table 22 below, the UE may regard the DCI as a command to release transmission and reception for DL SPS or UL grant Type 2.

TABLE 22

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

Since the DCI indicating the release for DL SPS or UL grant Type 2 follows a DCI format corresponding to DCI format 0_0 or DCI format 10, and DCI format 0_0 or 1_0 does not include a carrier indicator field (CIF), the UE should always monitor the PDCCH on a cell in which the DL SPS or UL grant Type 2 is configured to receive release commands for DL SPS or UL grant Type 2 for a particular cell. Even if a particular cell is configured by cross-carrier scheduling, the UE should always monitor the DCI format 1_0 or DCI format 0_0 on the corresponding cell to receive release commands for DL SPS or UL grant Type 2 configured on the corresponding cell.

Hereinafter, a carrier aggregation and scheduling method in a 5G communication system will be described in detail.

A UE may receive a configuration of a plurality of cells (cells or component carriers (CCs)) from a BS and may receive a configuration of whether to perform cross-carrier scheduling for the cells configured in the UE. If cross-carrier scheduling is configured for a particular cell (cell A, a scheduled cell), PDCCH monitoring for cell A may be performed on another cell (cell B, a scheduling cell) indicated by cross-carrier scheduling, instead of being performed on cell A. In this case, the scheduling cell (cell A) and the scheduling cell (cell B) may be configured as different numerologies. The numerology may include a subcarrier spacing, a cyclic prefix, and the like. When cell A and cell B have different numerologies, and when the PDCCH of cell B schedules the PDSCH of cell A, the following minimum scheduling offset between the PDCCH and PDSCH may be additionally considered.

Cross-Carrier Scheduling Method

When a subcarrier spacing ($\mu_B$) of cell B is less than a subcarrier spacing ($\mu_A$) of cell A, the PDSCH may be scheduled starting from the next PDSCH slot corresponding to X symbols after the last symbol of the PDCCH received in cell B. Here, X may differ depending on $\mu_B$, and may be defined as X=4 symbols when $\mu_B$=15 kHz, X=4 symbols when $\mu_B$=30 kHz, and X=8 symbols when $\mu_B$=60 kHz.

When the subcarrier spacing ($\mu_B$) of cell B is greater than the subcarrier spacing ($\mu_A$) of cell A, the PDSCH may be scheduled starting from a time point corresponding to X symbols after the last symbol of the PDCCH received in cell B. X may differ depending on $\mu_B$, and may be defined as X=4 symbols when $\mu_B$=30 kHz, X=8 symbols when $\mu_B$=60 kHz, and X=12 symbols when $\mu_B$=120 kHz.

Hereinafter, a rate matching operation and a puncturing operation will be described in detail.

When a time and frequency resource A to transmit a symbol sequence A overlaps with another time and frequency resource B, the rate matching or puncturing operation shown below may be considered for the transmission/reception operation of a channel A considering a resource C which is a region in which the resources A and B are overlapped.

Rate Matching Operation

The BS may map channel A only for the remaining resource region except for resource C overlapping with resource B in the entire resource A for transmitting the symbol sequence A to the UE. For example, when the symbol sequence A is configured by {symbol #1, symbol #2, symbol #3, symbol 4}, resource A is {resource #1, resource #2, resource #3, resource #4}, and resource B is {resource #3, resource #5}, the BS may sequentially map the symbol sequence A to {resource #1, resource #2, resource #4}, which is the remaining resources except for {resource #3} corresponding to resource C in resource A. As a result, the BS may map the symbol sequence {symbol #1, symbol #2, symbol #3} to {resource #1, resource #2, resource #4} and transmit the same.

The UE may determine resource A and resource B from scheduling information for the symbol sequence A from the BS, and thus determine resource C, which is an overlap region between resources A and B. The UE may receive symbol sequence A, assuming that the symbol sequence A is mapped and transmitted in the remaining region except for resource C in the entire resource A. For example, when the symbol sequence A is configured by {symbol #1, symbol #2, symbol #3, symbol 4}, resource A is {resource #1, resource #2, resource #3, resource #4}, and resource B is {resource #3, resource #5}, the UE may receive the symbol sequence A on the assumption that it is mapped to {resource #1, resource #2, resource #4}, which are the remaining resources except for {resource #3} corresponding to resource C in resource A. As a result, the UE may perform the subsequent reception operation on the assumption that the symbol sequence {symbol #1, symbol #2, symbol #3} is mapped to {resource #1, resource #2, resource #4} and transmitted.

Puncturing Operation

When there is resource C corresponding to a region overlapping with resource B in the entire resource A for transmitting the symbol sequence A to the UE, the symbol sequence A is mapped to the entire resource A, but the transmission may be performed only in the remaining resource region except for resource C in resource A. For example, when the symbol sequence A is configured by {symbol #1, symbol #2, symbol #3, symbol 4}, resource A is {resource #1, resource #2, resource #3, resource #4}, and resource B is {resource #3, resource #5}, the BS may map the symbol sequence A {symbol #1, symbol #2, symbol #3, symbol #4} to resource A {resource #1, resource #2, resource #3, resource #4}, transmit only a symbol sequence {symbol #1, symbol #2, symbol #4} corresponding the remaining resources {resource #1, resource #2, resource #4} except for resource C {resource #3} in resource A, and refrain from transmitting {symbol #3} mapped to {resource #3} corresponding to resource C. As a result, the BS may map the symbol sequence {symbol #1, symbol #2, symbol #4} to {resource #1, resource #2, resource #4} and transmit the same.

The UE may determine resource A and resource B from scheduling information for the symbol sequence A from the BS, and thus determine resource C, which is an overlap region between resources A and B. The UE may receive the symbol sequence A, assuming that the symbol sequence A is mapped to the entire resource A, but transmitted only in the remaining region except for resource C in the entire resource A. For example, when the symbol sequence A is configured by {symbol #1, symbol #2, symbol #3, symbol 4}, resource A is {resource #1, resource #2, resource #3, resource #4}, and resource B is {resource #3, resource #5}, the UE may receive the symbol sequence A on the assumption that the symbol sequence A {symbol #1, symbol #2, symbol #3, symbol 4} is mapped to resource A {resource #1, resource

#2, resource #4}, but {symbol #3} mapped to {resource #3} corresponding to resource C is not transmitted, and the symbol sequence {symbol #1, symbol #2, symbol #4} mapped to the remaining resources {resource #1, resource #2, resource #4} except for {symbol #3} corresponding to resource C in resource A is transmitted. As a result, the UE may perform the subsequent reception operation on the assumption that the symbol sequence {symbol #1, symbol #2, symbol #4} is mapped to {resource #1, resource #2, resource #4} and transmitted.

Figure 10:
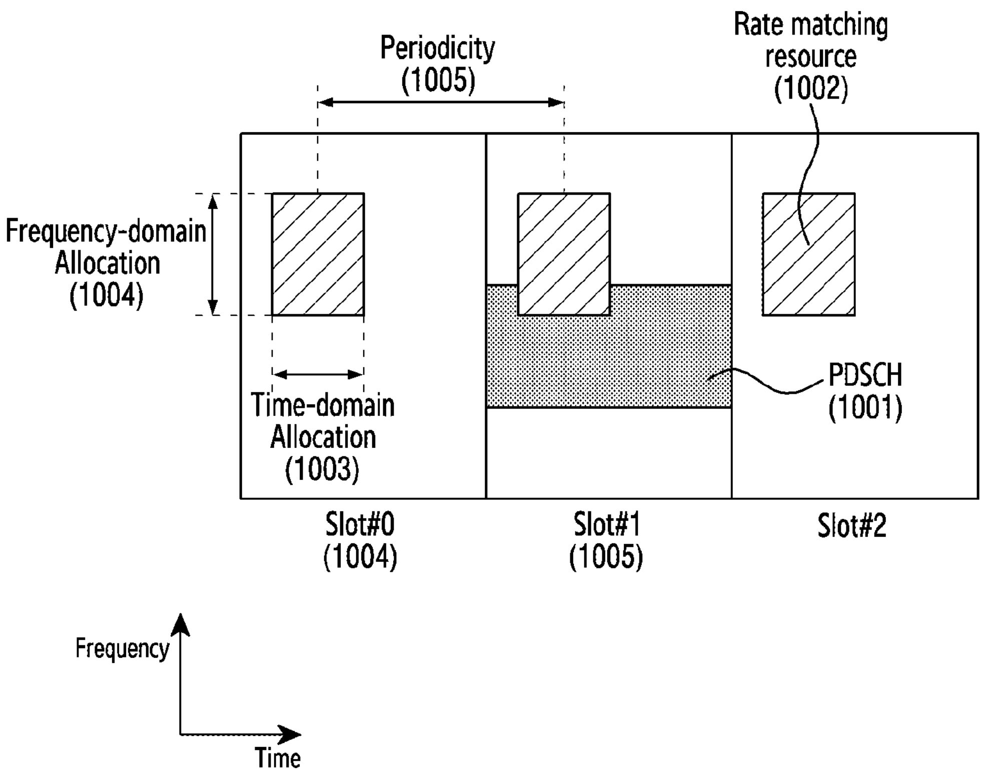
FIG. 10 illustrates a method in which a BS and a UE transmit and receive data by considering a downlink data channel and rate matching resources according to an embodiment.

FIG. 10 illustrates a method in which a BS and a UE to transmit and receive data by considering a DL data channel and a rate matching resource according to an embodiment.

Referring to FIG. 10, a PDSCH 1001 and a rate matching resource 1002 are shown. The BS may configure one or more rate matching resources 1002 to the UE through RRC signaling. Configuration information of the rate matching resource 1002 may include time-domain resource allocation information 1003, frequency-domain resource allocation (FDRA) information 1004, and period information 1005. In the disclosure, a bitmap corresponding to the frequency-domain resource allocation information 1004 will be referred to as a "first bitmap", a bitmap corresponding to the time-domain resource allocation information 1003 will be referred to as a "second bitmap", and a bitmap corresponding to the period information 1005 will be referred to as a "third bitmap". When all or part of the time and frequency resources of the scheduled data channel 1001 overlap with the configured rate matching resource 1002, the BS may rate-match the data channel 1001 in the rate matching resource 1002 and transmits it, and the UE may perform reception and decoding on the assumption that the data channel 1001 is rate-matched in the rate matching resource 1002.

Through additional configuration, the BS may dynamically notify the UE through DCI whether to rate-match the data channel in the configured rate matching resource (this corresponds to the rate matching indicator in the DCI format described above). Specifically, the BS may select some of the configured rate matching resources and group them into a rate matching resource group, and it may indicate to the UE, using a bitmap method with DCI, whether rate matching of the data channel for each rate matching resource group is performed. For example, when four rate matching resources, RMR #1, RMR #2, RMR #3, and RMR #4, are configured, the BS may configure, as rate matching groups, RMG #1={RMR #1, RMR #2}, RMG #2={RMR #3, RMR #4}, and indicate to the UE whether to perform rate matching in each of RMG #1 and RMG #2 with a bitmap by using 2 bits in the DCI field. For example, a case of having to perform rate matching may be indicated with "1", and a case of having to perform no rate matching may be indicated with "0".

In the 5G system, granularity of "RB symbol level" and "RE level" is supported as a method of configuring the above-described rate matching resource in the UE, as follows:

RB Symbol Level

The UE may receive configuration of up to four RateMatchPatterns per BWP via higher layer signaling, and one RateMatchPattern may include the following contents:

As a reserved resource in the BWP, a resource in which a time and frequency resource region of the reserved resource is configured with a combination of an RB-level bitmap and a symbol-level bitmap on the frequency axis may be included. The reserved resource may span one or two slots. Additionally, a time domain pattern (periodicityAndPattern) in which the time and frequency domain configured by each RB-level and symbol-level bitmap pair is repeated may be configured.

A time and frequency domain resource region configured as a CORESET in the BWP and a resource region corresponding to a time domain pattern configured as a search space in which the corresponding resource region is repeated may be included.

RE Level

The UE may receive configuration of the following contents through higher layer signaling: As configuration information (lte-CRS-ToMatchAround) for RE corresponding to the LTE CRS (Cell-specific RS or Common Reference SignalRS) pattern, the number of ports (nrofCRS-Ports) and LTE-CRS-vshift(s) value (v-shift) of LTE CRS, the center subcarrier location information (carrierFreqDL) of the LTE carrier from the reference frequency point (e.g., reference point A), the bandwidth size information (carrierBandwidthDL) of the LTE carrier, the subframe configuration information (mbsfn-SubframConfigList) corresponding to multicast-broadcast single-frequency network (MBSFN), and the like may be included. The UE may determine the location of the CRS in the NR slot corresponding to the LTE subframe, based on the above-described information.

Configuration information for a resource set corresponding to one or more zero power (ZP) CSI-RSs in the BWP may be included.

Hereinafter, a method for channel state measurement and channel state report in a 5G communication system will be described in detail.

The CSI may include channel quality information (CQI), precoding matric indicator (PMI), CSI-RS resource indicator (CRI), SS/PBCH block resource indicator (SSBRI), layer indicator (LI), rank indicator (RI), and/or L1-reference signal received power (L1-RSRP). The BS may control time and frequency resources for the above-described UE CSI measurement and report.

For the above-described CSt measurement and report, the UE may be configured with setting information (CS-ReportConfig) for N(1) CS reports, setting information (CS-ResourceConfig) for M(≥1) RS transmission resources, and one or two trigger state (CSI-AperiodicTriggerStateList and CSI-SemiPersistentOnPUSCH-TriggerStateList) list information through higher layer signaling.

More specifically, configuration information for the above-described CS measurement and report may be as shown below in Table 23 to Table 29.

TABLE 23

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

```
CSI-ReportConfig information element
-- ASN1START
-- TAG-CSI-REPORTCONFIG-START
CSI-ReportConfig ::=                SEQUENCE {
```

TABLE 23-continued

```
    reportConfigId                           CSI-ReportConfigId,
    carrier                                     ServCellIndex                    OPTIONAL,
-- Need S
    resourcesForChannelMeasurement           CSI-ResourceConfigId,
    csi-IM-ResourcesForInterference          CSI-ResourceConfigId             OPTIONAL,   --
Need R
    nzp-CSI-RS-ResourcesForInterference      CSI-ResourceConfigId             OPTIONAL,   --
Need R
    reportConfigType                         CHOICE {
      periodic                                      SEQUENCE {
                          reportSlotConfig                CSI-ReportPeriodicityAndOffset,
                          pucch-CSI-ResourceList             SEQUENCE (SIZE (1..maxNrofBWPs))
OF PUCCH-CSI-Resource
      },
      semiPersistentOnPUCCH                         SEQUENCE {
                          reportSlotConfig                CSI-ReportPeriodicityAndOffset,
                          pucch-CSI-ResourceList             SEQUENCE (SIZE (1..maxNrofBWPs))
OF PUCCH-CSI-Resource
      },
      semiPersistentOnPUSCH                         SEQUENCE {
                          reportSlotConfig                     ENUMERATED {sl5, sl10, sl20, sl40,
sl80, sl160, sl320},
                          reportSlotOffsetList                 SEQUENCE (SIZE (1.. maxNrofUL-
Allocations)) OF INTEGER(0..32),
                          p0alpha                            P0-PUSCH-AlphaSetId
      },
      aperiodic                                    SEQUENCE {
                          reportSlotOffsetList      SEQUENCE (SIZE (1..maxNrofUL-Allocations))
OF INTEGER(0..32)
      }
    },
    reportQuantity                           CHOICE {
      none                                          NULL,
      cri-RI-PMI-CQI                               NULL,
      cri-RI-i1                                    NULL,
      cri-RI-i1-CQI                                SEQUENCE {
                          pdsch-BunleSizeForCSI                          ENUMERATED {n2, n4}
OPTIONAL     --Need S
      },
      cri-RI-CQI                                   NULL,
      cri-RSRP                                      NULL,
      ssb-Index-RSRP                               NULL,
      cri-RI-LI-PMI-CQI                            NULL,
    },
    reportFreqConficuration                  SEQUENCE {
      cqi-FormatIndicator                         ENUMERATED { widebandCQI, subbandCQI }
OPTIONAL,    -- Need R
      pmi-FormatIndicator                                        ENUMERATED { widebandPMI,
subbandPMI }                         OPTIONAL,            -- Need R
      csi-ReportingBand                            CHOICE {
                          subbands3                      BIT STRING(SIZE(3)),
                          subbands4                      BIT STRING(SIZE(4)),
                          subbands5                      BIT STRING(SIZE(5)),
                          subbands6                      BIT STRING(SIZE(6)),
                          subbands7                      BIT STRING(SIZE(7)),
                          subbands8                      BIT STRING(SIZE(8)),
                          subbands9                      BIT STRING(SIZE(9)),
                          subbands10                     BIT STRING(SIZE(10)),
                          subbands11                     BIT STRING(SIZE(11)),
                          subbands12                     BIT STRING(SIZE(12)),
                          subbands13                     BIT STRING(SIZE(13)),
                          subbands14                     BIT STRING(SIZE(14)),
                          subbands15                     BIT STRING(SIZE(15)),
                          subbands16                     BIT STRING(SIZE(16)),
                          subbands17                     BIT STRING(SIZE(17)),
                          subbands18                     BIT STRING(SIZE(18)),
                          ...,
                          subbands19-v1530               BIT STRING(SIZE(19)),
      }                   OPTIONAL    -- Need S
    }
OPTIONAL,    -- Need R
    timeRestrictionForChannelMeasurements                     ENUMERATED {configured,
notConfigured},
    timeRestrictionForInterferenceMeasurements      ENUMERATED {configured, notConfigured},
    codebookConfig                                                       CodebookConfig
OPTIONAL,    -- Need R
    dummy                                                       ENUMERATED {n1, n2}
OPTIONAL,    -- Need R
    groupBasedBeamReporting                        CHOICE {
      enabled                                          NULL,
```

TABLE 23-continued

```
        disabled                                        SEQUENCE {
                    nrofReportedRS                               ENUMERATED {n1, n2, n3, n4}
OPTIONAL     -- Need S
        }
      },
      cqi-Table                              ENUMERATED {table1, table2, table3, spare1}
OPTIONAL,   -- Need R
      subbandSize                     ENUMERATED {value1, value2},
      non-PMI-PortIndication                          SEQUENCE (SIZE (1..maxNrofNZP-CSI-RS-
ResourcesPerConfig)) OF PortIndexFor8Ranks OPTIONAL,    -- Need R
      ...,
      [[
      semiPersistentOnPUSCH-v1530            SEQUENCE {
        reportSlotConfig-v1530                   ENUMERATED {sl4, sl8, sl16}
      }
OPTIONAL     -- Need R
      ]]
    }
    CSI-ReportPeriodicityAndOffset ::= CHOICE {
      slots4                          INTEGER(0..3),
      slots5                          INTEGER(0..4),
      slots8                          INTEGER(0..7),
      slots10                         INTEGER(0..9),
      slots16                         INTEGER(0..15),
      slots20                         INTEGER(0..19),
      slots40                         INTEGER(0..39),
      slots80                         INTEGER(0..79),
      slots160                        INTEGER(0..159),
      slots320                        INTEGER(0..319)
    }
    PUCCH-CSI-Resource ::=           SEQUENCE {
      uplinkBandwidthPartId           BWP-Id,
      pucch-Resource                  PUCCH-ResourceId
    }
    PortIndexFor8Ranks ::=           CHOICE {
      portIndex8                      SEQUENCE{
        rank1-8                                                      PortIndex8
OPTIONAL,   -- Need R
        rank2-8                              SEQUENCE(SIZE(2)) OF PortIndex8
OPTIONAL,   -- Need R
        rank3-8                              SEQUENCE(SIZE(3)) OF PortIndex8
OPTIONAL,   -- Need R
        rank4-8                              SEQUENCE(SIZE(4)) OF PortIndex8
OPTIONAL,   -- Need R
        rank5-8                              SEQUENCE(SIZE(5)) OF PortIndex8
OPTIONAL,   -- Need R
        rank6-8                              SEQUENCE(SIZE(6)) OF PortIndex8
OPTIONAL,   -- Need R
        rank7-8                              SEQUENCE(SIZE(7)) OF PortIndex8
OPTIONAL,   -- Need R
        rank8-8                              SEQUENCE(SIZE(8)) OF PortIndex8
OPTIONAL     -- Need R
      },
      portIndex4                      SEQUENCE{
        rank1-4                                                      PortIndex4
OPTIONAL,   -- Need R
        rank2-4                              SEQUENCE(SIZE(2)) OF PortIndex4
OPTIONAL,   -- Need R
        rank3-4                              SEQUENCE(SIZE(3)) OF PortIndex4
OPTIONAL,   -- Need R
        rank4-4                              SEQUENCE(SIZE(4)) OF PortIndex4
OPTIONAL     -- Need R
      },
      portIndex2                      SEQUENCE{
        rank1-2                                                      PortIndex2
OPTIONAL,   -- Need R
        rank2-2                              SEQUENCE(SIZE(2)) OF PortIndex2
OPTIONAL     -- Need R
      },
      portIndex1                      NULL
    }
```

TABLE 23-continued

| | |
|---|---|
| PortIndex8::= | INTEGER (0..7) |
| PortIndex4::= | INTEGER (0..3) |
| PortIndex2::= | INTEGER (0..1) |
| -- TAG-CSI-REPORTCONFIG-STOP | |
| -- ASN1STOP | |

CSI-ReportConfig field descriptions
carrier
Indicates in which serving cell the CSI-ResourceConfig indicated below are to be found. If the field is absent, the resources are on the same serving cell as this report configuration.
codebookConfig
Codebook configuration for Type-1 or Type-II including codebook subset restriction.
cqi-FormatIndicator
Indicates whether the UE shall report a single (wideband) or multiple (subband) CQI. (see TS 38.214 [19], clause 5.2.1.4).
cqi-Table
Which CQI table to use for CQI calculation (see TS 38.214 [19], clause 5.2.2.1).
csi-IM-ResourcesForInterference
CSI IM resources for interference measurement. csi-ResourceConfigId of a CSI-ResourceConfig included in the configuration of the serving cell indicated with the field “carrier” above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.
csi-ReportingBand
Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).
dummy
This field is not used in the specification. If received it shall be ignored by the UE.
groupBasedBeamReporting
Turning on/off group beam based reporting (see TS 38.214 [19], clause 5.2.1.4)
non-PMI-PortIndication
Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2).
The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.
nrofReportedRS
The number (N) of measured RS resources to be reported per report setting in a non-group-based report. N <= N_max, where N_max is either 2 or 4 depending on UE capability.
(see TS 38.214 [19], clause 5.2.1.4) When the field is absent the UE applies the value 1
nzp-CSI-RS-ResourcesForInterference
NZP CSI RS resources for interference measurement. csi-ResourceConfigId of a CSI-ResourceConfig included in the configuration of the serving cell indicated with the field “carrier” above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.
p0alpha
Index of the p0-alpha set determining the power control for this CSI report transmission (see TS 38.214 [19], clause 6.2.1.2).
pdsch-BundleSizeForCSI
PRB bundling size to assume for CQI calculation when reportQuantity is CRI/RI/i1/CQI. If the field is absent, the UE assumes that no PRB bundling is applied (see TS 38.214 [19], clause 5.2.1.4.2).
pmi-FormatIndicator
Indicates whether the UE shall report a single (wideband) or multiple (subband) PMI. (see TS 38.214 [19], clause 5.2.1.4).
pucch-CSI-ResourceList
Indicates which PUCCH resource to use for reporting on PUCCH.
reportConfigType
Time domain behavior of reporting configuration
reportFreqConfiguration
Reporting configuration in the frequency domain. (see TS 38.214 [19], clause 5.2.1.4).
reportQuantity
The CSI related quantities to report. Corresponds to L1 parameter ‘ReportQuantity’ (see TS 38.214 [19], clause 5.2.1).
reportSlotConfig
Periodicity and slot offset (see TS 38.214 [19], clause 5.2.1.4) .
reportSlotConfig-v1530

TABLE 23-continued

Extended value range for reportSlotConfig for semi-persistent CSI on PUSCH. If the field is present, the UE shall ignore the value provided in the legacy field (semiPersistentOnPUSCH.reportSlotConfig).

reportSlotOffsetList

Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity.

Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 5.2.3).

resourcesForChannelMeasurement

Resources for channel measurement. csi-ResourceConfigId of a CSI-ResourceConfig included in the configuration of the serving cell indicated with the field “carrier” above. The CSI-ResourceConfig indicated here contains only NZP-CSI-RS resources and/or SSB resources. This CSI-ReportConfig is associated with the DL BWP indicated by bwp-Id in that CSI-ResourceConfig.

subbandSize

Indicates one out of two possible BWP-dependent values for the subband size as indicated in TS 38.214 [19], table 5.2.1.4-2 . If csi-ReportingBand is absent, the UE shall ignore this field.

timeRestrictionForChannelMeasurements

Time domain measurement restriction for the channel (signal) measurements (see TS 38.214 [19], clause 5.2.1.1)

time RestrictionForInterferenceMeasurements

Time domain measurement restriction for interference measurements (see TS 38.214 [19], clause 5.2.1.1)

TABLE 24

The IE CSI-ResourceConfig defines a group of one or more NZP-CSI-RS-ResourceSet, CSI-IM-ResourceSet and/or CSI-SSB-ResourceSet.

CSI-ResourceConfig information element

```
-- ASN1START
-- TAG-CSI-RESOURCECONFIG-START
CSI-ResourceConfig ::=              SEQUENCE {
  csi-ResourceConfigId                CSI-ResourceConfigId,
  csi-RS-ResourceSetList              CHOICE {
    nzp-CSI-RS-SSB                      SEQUENCE {
      nzp-CSI-RS-ResourceSetList          SEQUENCE (SIZE (1..maxNrofNZP-CSI-RS-
ResourceSetsPerConfig)) OF NZP-CSI-RS-ResourceSetId
OPTIONAL, -- Need R
      csi-SSB-ResourceSetList             SEQUENCE (SIZE (1..maxNrofCSI-SSB-
ResourceSetsPerConfig)) OF CSI-SSB-ResourceSetId
OPTIONAL   -- Need R
    },
    csi-IM-ResourceSetList              SEQUENCE (SIZE (1..maxNrofCSI-IM-
ResourceSetsPerConfig)) OF CSI-IM-ResourceSetId
  },
  bwp-Id                              BWP-Id,
  resourceType                        ENUMERATED { aperiodic, semiPersistent, periodic },
  ...
}
-- TAG-CSI-RESOURCECONFIG-STOP
-- ASN1STOP
```

CSI-ResourceConfig field descriptions bwp-Id

The DL BWP which the CSI-RS associated with this CSI-ResourceConfig are located in (see TS 38.214 [19], clause 5.2.1.2 csi-ResourceConfigId

Used in CSI-ReportConfig to refer to an instance of CSI-ResourceConfig csi-RS-ResourceSetList Contains up to maxNrofNZP-CSI-RS-ResourceSetsPerConfig resource sets if ResourceConfigType is ‘aperiodic’ and 1 otherwise (see TS 38.214 [19], clause 5.2.1.2)

csi-SSB-ResourceSetList

List of SSB resources used for beam measurement and reporting in a resource set (see TS 38.214 [19], section FFS_Section)

resourceType

Time domain behavior of resource configuration (see TS 38.214 [19], clause 5.2.1.2). It does not apply to resources provided in the csi-SSB-ResourceSetList.

TABLE 25

```
The IE NZP-CSI-RS-ResourceSet is a set of Non-Zero-Power (NZP) CSI-RS resources (their IDs) and set-specific parameters.
  NZP-CSI-RS-ResourceSet information element
  -- ASN1START
  -- TAG-NZP-CSI-RS-RESOURCESET-START
  NZP-CSI-RS-ResourceSet ::=          SEQUENCE {
    nzp-CSI-ResourceSetId               NZP-CSI-RS-ResourceSetId,
    nzp-CSI-RS-Resources                  SEQUENCE (SIZE (1..maxNrofNZP-CSI-RS-
ResourcesPerSet)) OF NZP-CSI-RS-ResourceId,
    repetition                              ENUMERATED { on, off }
OPTIONAL,   -- Need S
    aperiodicTriggeringOffset                    INTEGER(0..6)
OPTIONAL,   -- Need S
    trs-Info                                  ENUMERATED {true}
OPTIONAL,   -- Need R
    ...
  }
  -- TAG-NZP-CSI-RS-RESOURCESET-STOP
  -- ASN1STOP
```

NZP-CSI-RS-ResourceSet field descriptions aperiodicTriggeringOffset

Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.

nzp-CSI-RS-Resources

NZP-CSI-RS-Resources associated with this NZP-CSI-RS resource set (see TS 38.214 [19], clause 5.2). For CSI, there are at most 8 NZP CSI RS resources per resource set repetition Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"

trs-Info

Indicates that the antenna port for all NZP-CSI-RS resources in the CSI-RS resource set is same. If the field is absent or released the UE applies the value "false" (see TS 38.214 [19], clause 5.2.2.3.1).

TABLE 26

```
The IE CSI-SSB-ResourceSet is used to configure one SS/PBCH block resource set which refers to SS/PBCH as indicated in ServingCellConfigCommon.
  CSI-SSB-ResourceSet information element
  -- ASN1START
  -- TAG-CSI-SSB-RESOURCESET-START
  CSI-SSB-ResourceSet ::=      SEQUENCE {
    csi-SSB-ResourceSetId         CSI-SSB-ResourceSetId,
    csi-SSB-ResourceList               SEQUENCE
(SIZE(1..maxNrofCSI-SSB-ResourcePerSet)) OF SSB-Index,
    ...
  }
  -- TAG-CSI-SSB-RESOURCESET-STOP
  -- ASN1STOP
```

TABLE 27

```
The IE CSI-IM-ResourceSet is used to configure a set of one or more CSI Interference Management (IM) resources (their IDs) and set-specific parameters.
  CSI-IM-ResourceSet information element
  -- ASN1START
  -- TAG-CSI-IM-RESOURCESET-START
  CSI-IM-ResourceSet ::=   SEQUENCE {
    csi-IM-ResourceSetId        CSI-IM-ResourceSetId,
    csi-IM-Resources               SEQUENCE (SIZE(1..maxNrofCSI-IM-
ResourcesPerSet)) OF CSI-IM-ResourceId,
    ...
  }
  -- TAG-CSI-IM-RESOURCESET-STOP
  -- ASN1STOP
```

CSI-IM-ResourceSet field descriptions csi-IM-Resources

CSI-IM-Resources associated with this CSI-IM-ResourceSet (see TS 38.214 [19], clause 5.2)

TABLE 28

```
The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.
  CSI-AperiodicTriggerStateList information element
  -- ASN1START
  -- TAG-CSI-APERIODICTRIGGERSTATELIST-START
  CSI-AperiodicTriggerStateList ::=        SEQUENCE (SIZE (1..maxNrOfCSI-AperiodicTriggers)) OF CSI-
Aperiodic TriggerState
  CSI-AperiodicTriggerState ::=              SEQUENCE {
    associatedReportConfigInfoList                          SEQUENCE
```

TABLE 28-continued

```
(SIZE(1..maxNrofReportConfigPerAperiodicTrigger)) OF CSI-AssociatedReportConfigInfo,
    ...
  }
  CSI-AssociatedReportConfigInfo ::=          SEQUENCE {
    reportConfigId                              CSI-ReportConfigId,
    resourcesForChannel                         CHOICE {
      nzp-CSI-RS                                  SEQUENCE {
        resourceSet                                   INTEGER (1..maxNrofNZP-CSI-RS-
ResourceSetsPerConfig),
        qcl-info                                      SEQUENCE (SIZE(1..maxNrofAP-CSI-RS-
ResourcesPerSet)) OF TCI-StateId OPTIONAL -- Cond Aperiodic
      },
      csi-SSB-ResourceSet                             INTEGER (1..maxNrofCSI-SSB-
ResourceSetsPerConfig)
    },
    csi-IM-ResourcesForInterference             INTEGER(1..maxNrofCSI-IM-ResourceSetsPerConfig)
OPTIONAL, -- Cond CSI-IM-ForInterference
    nzp-CSI-RS-ResourcesForInterference           INTEGER     (1..maxNrofNZP-CSI-RS-
ResourceSetsPerConfig)   OPTIONAL, -- Cond NZP-CSI-RS-ForInterference
    ...
  }
  -- TAG-CSI-APERIODICTRIGGERSTATELIST-STOP
  -- ASN1STOP
```

CSI-AssociatedReportConfigInfo field descriptions csi-IM-ResourcesForInterference CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.

csi-SSB-ResourceSet

CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).

nzp-CSI-RS-ResourcesForInterference

NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).

qcl-info

List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)

reportConfigId

The reportConfigId of one of the CSI-ReportConfigToAddMod configured in CSI-MeasConfig resourceSet NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on).

| Conditional Presence | Explanation |
|---|---|
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

TABLE 29

The CSI-SemiPersistentOnPUSCH-TriggerStateList IE is used to configure the UE with list of trigger states for semi-persistent reporting of channel state information on L1. See also TS 38.214 [19], clause 5.2.

CSI-SemiPersistentOnPUSCH-TriggerStateList information element

```
-- ASN1START
```

TABLE 29-continued

```
-- TAG-CSI-SEMIPERSISTENTONPUSCHTRIGGERSTATELIST-START
CSI-SemiPersistentOnPUSCH-TriggerStateList ::= SEQUENCE(SIZE
(1..maxNrOfSemiPersistentPUSCH-Triggers)) OF CSI-SemiPersistentOnPUSCH-TriggerState
CSI-SemiPersistentOnPUSCH-TriggerState ::= SEQUENCE {
  associatedReportConfigInfo          CSI-ReportConfigId,
  ...
}
-- TAG-CSI-SEMIPERSISTENTONPUSCHTRIGGERSTATELIST-STOP
-- ASN1STOP
```

For the above-described CSI report setting (CSI-ReportConfig), each report setting CSI-ReportConfig may be associated with the CSI resource setting associated with the corresponding report configuration, and one DL BWP identified by a higher layer parameter BWP identifier (bwp-id) given to the CSI-ResourceConfig. As a time domain report operation for each report setting CSI-ReportConfig, "aperiodic", "semi-persistent", and "periodic" methods are supported, and they may be configured from the BS to the UE by a reportConfigType parameter configured from the higher layer. The semi-persistent CSI report method supports "PUCCH based semi-persistent (semi-PersistentOnPUCCH)" and "PUSCH based semi-persistent (semi-PersistentOnPUSCH)". In the periodic or semi-persistent CSI report method, the UE may be configured with PUCCH or PUSCH resources to transmit the CSI from the BS through higher layer signaling. The period and slot offset of the PUCCH or PUSCH resource to transmit the CSI may be given based on numerology of the UL BWP configured to transmit the CSI report. In the aperiodic CSI report method, the UE may be scheduled with the PUSCH resource to transmit the CSI from the BS through L1 signaling (DCI, the above-described DCI format 0_1).

For the above-described CSI resource setting (CSI-ResourceConfig), each CSI resource setting CSI-ReportConfig may include S(≥1) CSI resource sets (configured as the higher layer parameter csi-RS-ResourceSetList). The CSI resource set list may be composed of a non-zero power (NZP) CSI-RS resource set and an SS/PBCH block set or may be composed of a CSI-interference measurement (CSI-IM) resource set. Each CSI resource setting may be located in a DL BWP being identified by the higher layer parameter bwp-id, and the CSI resource setting may be connected to the CSI report setting of the same downlink BWP. The time domain operation of the CSI-RS resource in the CSI resource setting may be configured as one of "aperiodic", "periodic", or "semi-persistent" from the higher layer parameter resourceType. For the periodic or semi-persistent CSI resource setting, the number of CSI-RS resource sets may be limited to 5=1, and the configured period and slot offset may be given based on the numerology of the DL BWP being identified by the bwp-id. The UE may be configured with one or more CSI resource settings for channel or interference measurement from the BS through the higher layer signaling, and for example, may include CSI-IM resource for interference measurement, NZP CSI-RS resource for interference measurement, and NZP CSI-RS resource for channel measurement.

For the CSI-RS resource sets in which the higher layer parameter resourceType is associated with the resource setting configured as "aperiodic", "periodic", or "semi-persistent", the trigger state for the CSI report setting in which the reportType is configured as "aperiodic", and the resource setting for channel or interference measurement for one or a plurality of CCs may be configured as the higher layer parameter CSI-AperiodicTriggerStateList.

The aperiodic CSI report of the UE may be performed by using the PUSCH, the periodic CSI report may be performed by using the PUSCH, and the semi-persistent CSI report may be performed by using the PUSCH in being triggered or activated by the DCI, and may be performed by using the PUCCH after being activated by a MAC CE. As described above, the CSI resource setting may also be configured as aperiodic, periodic, or semi-persistent. A combination between the CSI report setting and the CSI resource setting may be supported based on Table 30 below.

TABLE 30

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI report may be triggered to a "CSI request" field of the above-described DCI format 0_1 corresponding to the scheduling DCI for the PUSCH. The UE may monitor the PDCCH, obtain the DCI format 0_1, and obtain PUSCH scheduling information and a CSI request indicator. The CSI request indicator may be configured with NTS (=0, 1, 2, 3, 4, 5, or 6) bits, and the number of bits of the CSI request indicator may be determined by the higher layer signaling (reportTriggerSize). One trigger state among one or a plurality of aperiodic CSI report trigger states that may be configured by the higher layer signaling (CSI-AperiodicTriggerStateList) may be triggered by the CSI request indicator.

If all bits of the CSI request field are 0, this signifies that the CSI report is not requested.

If the number M of CSI trigger states in the configured CSI-AperiodicTriggerStateLite is larger than 2NTs-1, in accordance with a predefined mapping relationship, M CSI trigger states may be mapped on 2NTs-1, and one of 2NTs-1 trigger states may be indicated as a CSI request field.

If the number M of CSI trigger states in the configured CSI-AperiodicTriggerStateLite is equal to or smaller than 2NTs-1, one of M CSI trigger states may be indicated as the CSI request field.

Table 31 below represents an example of the relationship between the CSI request indicator and the CSI trigger state that may be indicated as the corresponding indicator.

TABLE 31

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1<br>CSI report#2 | CSI resource#1,<br>CSI resource#2 |
| 10 | CSI trigger state#2 | CSI report#3 | CSI resource#3 |
| 11 | CSI trigger state#3 | CSI report#4 | CSI resource#4 |

The UE may perform measurement for the CSI resources in the CSI trigger state, triggered to the CSI request field and accordingly, may generate the CSI (including at least one of CQI, PMI, CRI, SSBRI, LI, RI, or L1-RSRP as described above). The UE may transmit the obtained CSI by using the PUSCH being scheduled by the corresponding DCI format 0_1. If one bit corresponding to the UL data indicator (UL-SCH indicator) in the DCI format 0_1 indicates "1", the UE may multiplex the UL data (UL-SCH) and the obtained CSI onto the PUSCH resource scheduled by the DCI format 0_1 and transmit the same. If one bit corresponding to the UL data indicator (UL-SCH indicator) in the DCI format 0_1 indicates "0", the UE may map only the CSI on the PUSCH resource scheduled by the DCI format 0_1 without uplink data (UL-SCH) and transmit the same.

Figure 11:
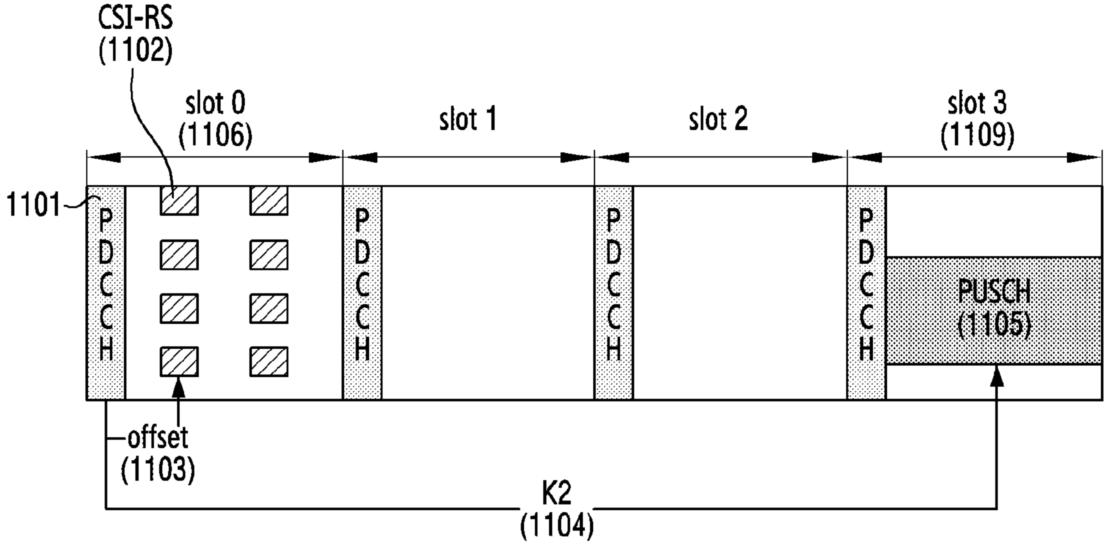
FIG. 11 illustrates an aperiodic channel state information (CSI) reporting method when the CSI-reference signal (RS) offset has a value of 0 according to an embodiment.

FIG. 11 illustrates an aperiodic CSI reporting method when a CSI-RS offset has a value of 0 according to an embodiment.

Referring to FIG. 11, a UE may obtain DCI format 0_1 by monitoring a PDCCH 1101 and obtain CSI request information and scheduling information for the PUSCH 1105 from DCI format 0_1. The UE may obtain resource information for a CSI-RS 1102 to be measured from the received CSI request indicator. The UE may determine a time to measure a resource of the CSI-RS 1102 based on a reception time of DCI format 0_1 and a CSI resource set configuration (e.g., an offset parameter (aperiodicTriggeringOffset above described) in NZP-CSI-RS resource set configuration (NZP-CSI-RS-ResourceSet)). More specifically, the UE may receive configuration of an offset value X 1103 from a parameter aperiodicTriggeringOffset in the NZP-CSI-RS resource set via higher layer signaling from the BS. The offset value X 1103 may refer to an offset between a slot in which DCI triggering aperiodic CSI reporting is received and a slot in which the CSI-RS resource is transmitted. For example, the value of aperiodicTriggeringOffset parameter and the offset value X 1103 may be in a mapping relationship shown below in Table 32.

TABLE 32

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

Figure 12:
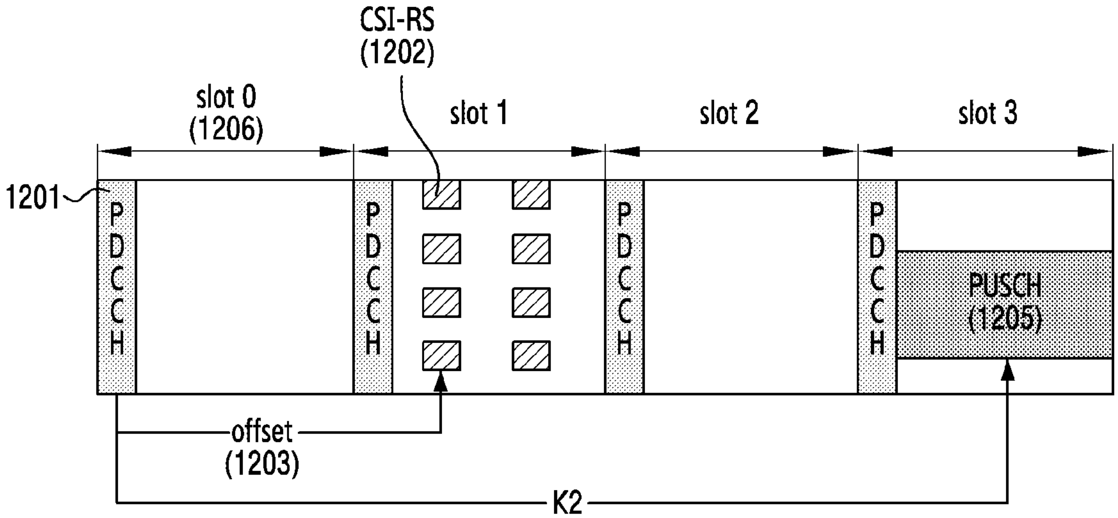
FIG. 12 illustrates an aperiodic CSI reporting method when the CSI-RS offset has a value of 1 according to an embodiment.

FIG. 12 illustrates an aperiodic CSI reporting method when a CSI-RS offset has a value of 1 according to an embodiment.

Referring to FIG. 12, the above-described offset value X is configured as 0 (X=0). In this case, the UE may receive the CSI-RS 1102 from a slot (corresponding to slot 0 of FIG. 11) having received the DCI format 0_1 triggering the aperiodic CSI report and may report the CSI information measured by the received CSI-RS to the BS through the PUSCH 1205. The UE may obtain scheduling information (information corresponding to each field of the above-described DCI format 0_1) on the PUSCH 1105 for the CSI report from the DCI format 0_1. As an example, the UE may obtain information on the slot to transmit the PUSCH 1205 from the above-described time domain resource allocation information on the PUSCH 1205 in the DCI format 0_1. In FIG. 11, the UE obtains a K2 value 1104 of 3 corresponding to the slot offset value for the PDCCH-to-PUSCH, and accordingly, the PUSCH 1105 may be transmitted form slot 3 1109 that is 3 slots apart from a time point at which the PDCCH 1101 is received, that is, slot 0 1106.

In FIG. 12, the UE may obtain DCI format 0_1 by monitoring a PDCCH 1201 and may obtain therefrom CSI request information and scheduling information for a PUSCH 1205. The UE may obtain resource information for a CSI-RS 1202 to be measured from a received CSI request indicator. In FIG. 12, the offset value X 1203 for the above-described CSI-RS 1202 is configured as 1 (X=1) is shown. In this case, the UE may receive the CSI-RS 1202 from a slot 0 1206 in which the DCI format 0_1 triggering the aperiodic CSI report is received and may report the CSI information measured by the received CSI-RS to the BS through the PUSCH 1205.

Figure 13:
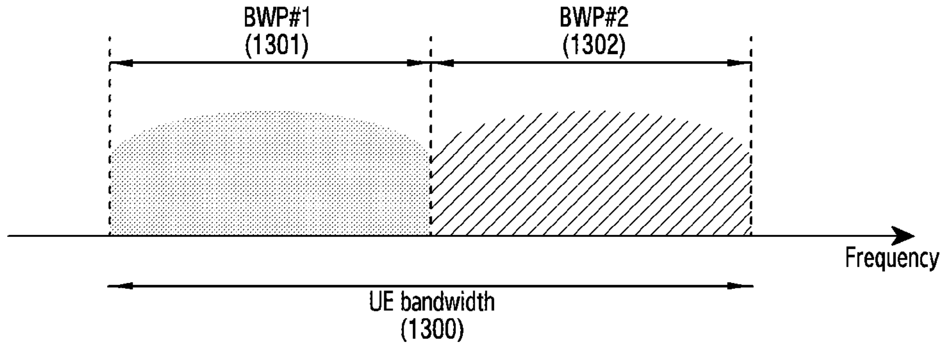
FIG. 13 illustrates configuration for a bandwidth part (BWP) in a 5G communication system according to an embodiment.

FIG. 13 illustrates a configuration about a BWP in a 5G communication system according to an embodiment.

Referring to FIG. 13, a UE bandwidth 1300 may be configured by BWP #1 1301 and BWP #2 1302. The BS may configure one or multiple BWPs for the UE and may configure pieces of information as shown below in Table 33 for each BWP.

TABLE 33

```
BWP ::=                         SEQUENCE {
bwp-Id                            BWP-Id,
(Bandwidth Part Identity)
locationAndBandwidth            INTEGER (1..65536),
(BWP Location)
subcarrierSpacing               ENUMERATED {n0, n1, n2, n3, n4, n5},
(Subcarrier spacing)
cyclicPrefix                    ENUMERATED { extended }
(Cyclic prefix)
}
```

The pieces of information may be transmitted by the BS to the UE via higher layer signaling such as RRC signaling. At least one BWP among the configured one or multiple BWPs may be activated. Whether to activate the configured BWP may be semi-statically transmitted from the BS to the UE via RRC signaling or may be dynamically transmitted through DCI.

Prior to an RRC connection, the UE may be configured with an initial BWP for initial access from a BS through an MIB. More specifically, the UE may receive configuration information about a search apace and a CORESET through which the PDCCH for reception of system information required for initial access (which may correspond to remaining system information (RMSI) or SIB 1) may be transmitted through the MIB in an initial access operation. The CORESET and search space, which are configured through the MIB, may be regarded as ID 0, respectively. The BS may notify the UE of configuration information, such as frequency allocation information, time allocation information, and numerology for CORESET #0 through the MIB. The BS may notify the UE of configuration information regarding the monitoring periodicity and occasion for CORESET #0, that is, configuration information regarding the search space #0, through the MIB. The UE may regard the frequency domain configured as CORESET #0, obtained from the MIB, as an initial BWP for initial access. The identifier of the initial BWP may be regarded as zero.

The configuration of the BWP supported by the 5G system may be used for various purposes.

Herein, when a bandwidth being supported by the UE is less than a system bandwidth, the bandwidth may be supported through the BWP configuration. For example, the BS configures, in the UE, a frequency location (configuration information 2) of the BWP to enable the UE to transmit or receive data at a specific frequency location within the system bandwidth.

The BS may configure multiple BWPs in the UE for the purpose of supporting different numerologies. For example, to support both data transmission and reception to and from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed, and when attempting to transmit or receive data at a specific subcarrier spacing, the BWP configured with the corresponding subcarrier spacing may be activated.

The BS may configure, in the UE, BWPs having bandwidths of different sizes for the purpose of reducing power consumption of the UE. For example, when the UE supports a very large bandwidth a bandwidth of 100 MHz, and always transmits or receives data at the corresponding bandwidth, the transmission or reception may cause very high power consumption in the UE. specifically, when the UE performs monitoring on an unnecessary downlink control channels of a large bandwidth of 100 MHz even when there is no traffic, the monitoring may be very inefficient in terms of power consumption. Therefore, to reduce power consumption of the UE, the BS may configure, for the UE, a BWP of a relatively small bandwidth a BWP of 20 MHz. When there is no traffic, the UE may perform a monitoring operation in a BWP of 20 MHz. When data to be transmitted or received has occurred, the UE may transmit or receive data in a BWP of 100 MHz according to an indication of the BS.

In a method of configuring the BWP, the UEs before the RRC connection may receive configuration information about the initial BWP through the MIB in the initial connection operation. More specifically, the UE may be configured with a CORESET for a DL control channel through which DCI for scheduling an SIB may be transmitted from a MIB of a PBCH. The bandwidth of the CORESET configured through the MIB may be regarded as the initial BWP. The UE may receive, through the configured initial BWP, a PDSCH through which the SIB is transmitted. The initial BWP may be used for other system information (OSI), paging, and random access as well as the reception of the SIB.

When one or more BWPs have been configured for a UE, a BS may indicate the UE to switch the BWP by using a BWP indicator field in DCI. For example, referring back to FIG. 3, when the currently activated BWP of the UE is BWP #1 301, the BS may indicate BWP #2 302 to the UE by using the BWP indicator in DCI, and the UE may perform a BWP switch to the BWP #2 302 indicated by the BWP indicator in the received DCI.

As described above, since the DCI-based BWP switch may be indicated by the DCI scheduling the PDSCH or PUSCH, when receiving a request to switch the BWP, the UE should smoothly receive or transmit the PDSCH or PUSCH, which is scheduled by the DCI, without difficulty in the switched BWP. To this end, the standard stipulates the requirements for a delay time (TBWP) required when switching the BWP and may be defined as shown below in Table 34.

TABLE 34

| | | BWP switch delay TBWP (slots) | |
|---|---|---|---|
| μ | NR Slot length (ms) | Type 1Note 1 | Type 2Note 1 |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

The requirements for the BWP switch delay time support type 1 or type 2 depending on UE capability. The UE may report a BWP delay time type that is supportable to the BS.

When the UE receives the DCI including the BWP switch indicator in slot n according to the requirements for the BWP switch delay time, the UE may complete a switch to a new BWP indicated by the BWP switch indicator at a time point not later than slot (n+TBWP), and may perform transmission and reception with respect to a data channel scheduled by the corresponding DCI in the switched new BWP. When the BS intends to schedule the data channel to the new BWP, the BS may determine a time domain resource assignment for the data channel by considering the BWP switch delay time (TBWP) of the UE. That is, when the BS schedules the data channel to the new BWP, the BS may schedule the corresponding data channel after the BWP switch delay time according to a method of determining time domain resource assignment for the data channel. Accordingly, the UE may not expect the DCI indicating the BWP switch to indicate a slot offset (K0 or K2) value less than the BWP switch delay time (TBWP).

If the UE has received the DCI (for example, DCI format 1_1 or 0_1) indicating the BWP switch, the UE may not perform transmission or reception during a time interval from a third symbol of the slot in which the PDCCH including the DCI is received to a start time of the slot indicated by the slot offset (K0 or K2) value indicated by the time domain resource assignment indicator field in the DCI. For example, when the UE has received the DCI indicating the BWP switch in slot n and the slot offset value indicated by the DCI is K, the UE may not perform transmission or reception from the third symbol of the slot n to the symbol prior to slot (n+K) (i.e., the last symbol of slot (n+K−1)).

Next, a method of configuring transmission/reception-related parameters for each bandwidth part in the 5G system will be described.

The UE may be configured with one or more BWPs from the BS, and may be additionally configured with parameters to be used for transmission/reception (e.g., UL/DL data channel and control channel-related configuration information) for each configured BWP. For example, referring to FIG. 13, when the UE is configured with BWP #1 1301 and BWP #2 1302, the UE may receive configuration of transmission/reception parameter #1 with respect to BWP #1 1301, and may receive configuration of transmission/reception parameter #2 with respect to BWP #2 1302. When the BWP #1 1301 is activated, the UE may perform transmission/reception to/from the BS based on the transmission/reception parameter #1, and when the BWP #2 1302 is activated, the UE may perform transmission/reception to/from the BS based on the transmission/reception parameter #2.

More specifically, the following parameters may be configured from the BS to the UE.

First, with regard to the UL BWP, the following pieces of information may be configured as shown below in Table 35.

TABLE 35

```
BWP-Uplink ::= SEQUENCE {
bwp-Id                      BWP-Id,
(Bandwidth Part Identity)
bwp-Common                  BWP-UplinkCommon OPTIONAL, -- Cond SetupOtherBWP
(Cell-specific or common parameter)
bwp-Dedicated               BWP-UplinkDedicated OPTIONAL, -- Cond SetupOtherBWP
(UE-specific parameter)
...
}
BWP-UplinkCommon ::= SEQUENCE {
genericParameters           BWP,
(General parameter)
rach-ConfigCommon           SetupRelease { RACH-ConfigCommon } OPTIONAL, -- Need M
(Random access-relate common parameter)
pusch-ConfigCommon          SetupRelease { PUSCH-ConfigCommon } OPTIONAL, -- Need M
(PUSCH-related common parameter)
pucch-ConfigCommon          SetupRelease { PUCCH-ConfigCommon } OPTIONAL, -- Need M
(PUSCH-related common parameter)
...
}
BWP-UplinkDedicated ::= SEQUENCE {
pucch-Config                SetupRelease { PUCCH-Config } OPTIONAL, -- Need M
(PUCCH-related common parameter)
pusch-Config                SetupRelease { PUSCH-Config } OPTIONAL, -- Need M
(PUSCH-related common parameter)
configuredGrantConfig
(Configured grant-related parameter)   SetupRelease { ConfiguredGrantConfig } OPTIONAL, -- Need
M
srs-Config
(SRS-related parameter)
SetupRelease { SRS-Config } OPTIONAL, -- Need M
beamFailureRecoveryConfig
(Beam failure recovery-related parameter) SetupRelease { BeamFailureRecoveryConfig } OPTIONAL,
-- Cond SpCellOnly
...
}
```

According to Table 35, the UE may receive, from the BS, configuration of cell-specific (or cell common or common) transmission-related parameters (e.g., parameters related to an RA channel (RACH), PUCCH, and a UL data channel (PUSCH)) (corresponding to BWP-UplinkCommon). The UE may receive, from the BS, configuration of a UE-specific (or dedicated)transmission-related parameters (e.g., parameters related to a PUCCH, a PUSCH, grant-free based uplink transmission (configured grant PUSCH), and a sounding reference signal (SRS) (corresponding to BWP-UplinkDedicated).

With regard to a DL BWP, the following pieces of information may be configured as shown below in Table 36.

TABLE 36

```
BWP-Downlink ::= SEQUENCE {
bwp-Id                      BWP-Id,
(BWP Identity)
bwp-Common                  BWP-DownlinkCommon OPTIONAL, -- Cond SetupOtherBWP
(Cell-specific or common parameter)
bwp-Dedicated               BWP-DownlinkDedicated OPTIONAL, -- Cond SetupOtherBWP
```

TABLE 36-continued

```
(UE-specific parameter)
...
}
BWP-DownCommon ::= SEQUENCE {
genericParameters                BWP,
(General parameter)
pdcch-ConfigCommon               SetupRelease { PDCCH-ConfigCommon } OPTIONAL, -- Need M
(PDCCH-related common parameter)
pdsch-ConfigCommon               SetupRelease { PDSCH-ConfigCommon } OPTIONAL, -- Need M
(PDSCH-related common parameter)
...
}
BWP-DownDedicated ::= SEQUENCE {
pdcch-Config                     SetupRelease { PDCCH-Config } OPTIONAL, -- Need M
(PDCCH-related UE-specific parameter)
pdsch-Config                     SetupRelease { PDSCH-Config } OPTIONAL, -- Need M
(PDSCH-related UE-specific parameter)
sps-Config
(SPS-related parameter)   SetupRelease { SPS-Config } OPTIONAL, -- Need M
radioLinkMonitoringConfig
(RLM-related parameter)       SetupRelease { radioLinkMonitoringConfig} OPTIONAL, -- Cond
SpCellOnly
...
}
```

According to Table 36, the UE may receive, from the BS, configuration of cell-specific (or cell common or common) reception-related parameters (e.g., parameters related to a PDCCH) and PDSCH) (corresponding to BWP-Downlink-Common). The UE may receive, from the BS, configuration of a UE-specific (or dedicated) reception-related parameters (e.g., parameters related to a PDCCH, a PDSCH, grant-free based downlink transmission (semi-persistent scheduled PDSCH), and a radio link monitoring (RLM) (corresponding to BWP-UplinkDedicated).

Hereinafter, discontinuous reception (DRX) configurations in a 5G communication system will be described in detail.

Figure 14:
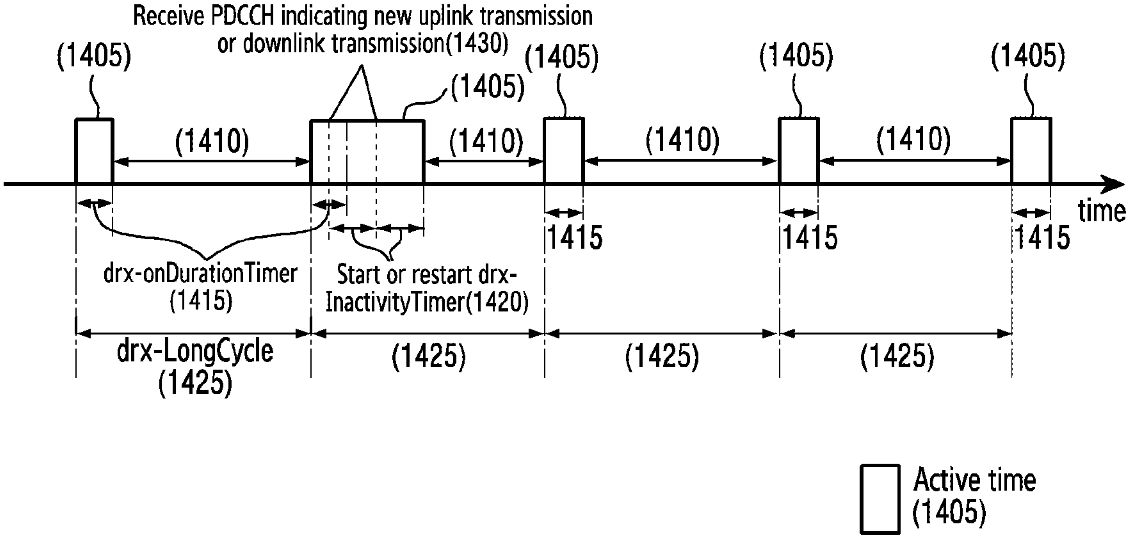
FIG. 14 illustrates discontinuous reception (DRX) in a 5G communication system according to an embodiment.

FIG. 14 illustrates DRX in the 5G system according to an embodiment.

DRX is an operation in which a UE, which is using a service, discontinuously receives data in an RRC connected state in which a radio link is established between the BS and the UE. When the DRX is applied, the UE turns on a receiver at a specific time point to monitor a control channel and turns off the receiver when no data is received during a predetermined period, and thus the power consumption of the UE may be reduced. The DRX operation may be controlled by a MAC layer device based on various parameters and a timer.

Referring to FIG. 14, an active time 1405 is when the UE wakes up every DRX cycle and monitors the PDCCH. The active time 1405 may be defined as follows.

- drx-onDurationTimer, drx-InactivityTimer, drx-RetransmissionTimerDL, drx-RetransmissionTimerUL, or ra-ContentionResolutionTimer is running;
- a scheduling request is sent on a PUCCH and is pending; or
- a PDCCH indicating a new transmission addressed to the C-RNTI of the MAC entity has not been received after successful reception of an RA response for the RA preamble not selected by the MAC entity among the contention-based random access preamble
- drx-onDurationTimer, drx-Inactivity Timer, drx-RetransmissionTimerDL, drx-RetransmissionTimerUL, ra-ContentionResolutionTimer, and the like are timers, the values of which are configured by the BS and have a function of configuring the UE to monitor the PDCCH in a situation in which a predetermined condition is satisfied.
- drx-onDurationTimer 1415 is a parameter for configuring a minimum time for which the UE is awake in a DRX cycle. drx-InactivityTimer 1420 is a parameter for configuration of a time for which the UE is additionally awake when receiving a PDCCH indicating new UL transmission or DL transmission (1430). drx-RetransmissionTimerDL is a parameter for configuring a maximum time for which the UE is awake so as to receive DL retransmission in a DL HARQ procedure. The drx-RetransmissionTimerUL is a parameter for configuring a maximum time for which the UE is awake so as to receive an UL retransmission grant in an UL HARQ procedure. drx-onDurationTimer, drx-InactivityTimer, drx-RetransmissionTimerDL, and drx-RetransmissionTimerUL may be configured as the time, the number of subframes, the number of slots, and the like. ra-ContentionResolutionTimer is a parameter for monitoring the PDCCH in an RA procedure.
- inActive time 1410 is a time configured not to monitor the PDCCH during the DRX operation and/or a time configured not to receive the PDCCH, and the remaining time excluding the active time 1405 from the total time of performing the DRX operation may become the inActive time 1410. When the PDCCH is not monitored for the active time 1405, the UE may enter a sleep or inActive state to reduce power consumption.

The DRX cycle refers to when the UE wakes up and monitors the PDCCH. In other words, the DRX cycle refers to an "on" duration occurrence period or a time interval until the UE monitors the PDCCH and then monitors the next PDCCH. There are two types of DRX cycles, that is, short DRX cycle and long DRX cycle. The short DRX cycle may be optionally applied.

The long DRX cycle (e.g., drx-LongCycle 1425) is the longer cycle of two DRX cycles configured in the UE. While operating in the long DRX, the UE starts again the drx-onDurationTimer 1415 at a time point at which the long DRX cycle 1425 has elapsed from a start point (e.g., start symbol) of the drx-onDurationTimer 1415. When operating in the long DRX cycle 1425, the UE may start the drx-onDurationTimer 1415 in a slot after drx-SlotOffset in a subframe satisfying Equation (2) below. The drx-SlotOffset refers to a delay before the drx-onDurationTimer 1415 starts. The drx-SlotOffset may be configured with a time, the number of slots, and the like.

$$[(SFN\ X\ 10) + \text{subframe number}] \text{ modulo } (drx\text{-}LongCycle) = drx - StartOffset \tag{2}$$

In Equation (2), the drx-LongCycleStartOffset may include the long DRX cycle 1525 and drx-StartOffset and may be used to define a subframe to start the long DRX cycle 1425. The drx-LongCycleStartOffset may be configured with a time, the number of subframes, the number of slots, and the like.

The Short DRX cycle is the shorter cycle of the two DRX cycles defined for the UE. While operating in a long DRX cycle 1425 and, when a predetermined event a case of receiving a PDCCH that indicates a new uplink transmission or downlink transmission occurs at the active time 1405 (1430), the UE may start or restart the drx-InactivityTimer 1420, and may operate in the short DRX cycle if the drx-InactivityTimer 1420 expires or if the UE receives a DRX command MAC CE. For example, in FIG. 14, the UE may start the drx-ShortCycleTimer at the expiration time of the previous drx-onDurationTimer 1415 or drx-InactivityTimer 1420 and may operate in the short DRX cycle until the drx-ShortCycleTimer expires. When receiving a PDCCH indicating a new uplink transmission or downlink transmission (1430), the UE may extend the Active Time 1405 and/or delay the arrival of the InActive Time 1410 to anticipate additional uplink or downlink transmissions in the future. While operating in the short DRX, the UE starts again the drx-onDurationTimer 1415 at a time point at which the short DRX cycle has elapsed from a start point of the previous on-duration. Thereafter, when the drx-ShortCycleTimer expires, the UE operates again in the Long DRX cycle 1425.

When operating in the short DRX cycle, the UE may start the drx-onDurationTimer 1415 after drx-SlotOffset in a subframe satisfying Equation (3) below. The drx-SlotOffset refers to a delay before the start of the drx-onDurationTimer 1415. The drx-SlotOffset may be configured with a time, the number of slots, and the like.

$$[(SFN\ X\ 10) + \text{subframe number}] \text{ modulo } (drx\text{-}LongCycle) = drx\text{-}StartOffset \text{ modulo } (drx\text{-}LongCycle) \tag{3}$$

In Equation (3), the drx-LongCycleStartOffset may be used to define a subframe to start the short DRX cycle. The drx-ShortCycle and drx-StartOffset may be configured with the time, the number of subframes, the number of slots, and the like.

DRX operation has been described with reference to FIG. 14. A UE may reduce power consumption of the UE by performing DRX operation. However, even if the UE performs DRX operation, the UE may not always receive a PDCCH associated with the UE at the active time 1405. Therefore, the disclosure may provide a signal to control the operation of the UE to save power of the UE more efficiently.

As described above, to achieve ultra-high speed data services of several Gbps, the 5G system supports ultra-wide bandwidth signal transmission and reception or utilize a spatial multiplexing method using multiple transmission and reception antennas, while supporting various power saving modes to reduce power consumption of the UE. However, a BS also consumes excessive power. For example, the number of power amplifiers (PAs) required increases in proportion to the number of transmission antennas provided in the BS or UE. The maximum power output of the BS and UE depends on the power amplifier characteristics, and in general, the maximum power output of the BS differs according to the cell size covered by the BS. The maximum power output is usually expressed in decibel milliwatts (dBm). The maximum power of the UE is typically 23 dBm or 26 dBm. As an example of a commercial 5G BS, the BS may include 64 transmission antennas and 64 power amplifiers corresponding thereto in a 3.5 GHz frequency band and operate in a 100 MHz bandwidth. As a result, the energy consumption of the BS increases in proportion to the output of the power amplifier and the operation time of the power amplifier. Compared to LTE BSs, 5G BSs have wide bandwidths and many transmission antennas due to a relatively high operating frequency band. These features have the effect of increasing data rates, resulting in increasing the cost of the energy consumption of the BS. Therefore, the more the BSs that constitute a mobile communication network, the greater the energy consumption of the entire mobile communication network.

As described in the above, the energy consumption of a BS is highly dependent on the operation of the power amplifier. Since the power amplifier is involved in the BS transmission operation, the DL transmission operation of the BS is highly associated with the energy consumption of the BS. The UL reception operation of the BS does not occupy a large portion of the energy consumption of the BS. Physical channels and physical signals transmitted by the BS via the DL are as follows.

A PDSCH includes data to be transmitted to one or more UEs.

A PDCCH: A DL includes scheduling information for a PDSCH and a PUSCH. Alternatively, control information such as a slot format and a power control command may be transmitted through the PDCCH alone without the PDSCH or PUSCH to be scheduled. The scheduling information includes resource information, HARQ-related information, power control information, etc. to which the PDSCH or PUSCH is mapped.

A physical broadcast channel (PBCH): A DL provides an MIB, which is the essential system information required to transmit and receive the data channel and control channel of the UE.

The Primary synchronization signal (PSS) serves as the reference for DL time/frequency synchronization and provides some pieces of information about cell ID.

The Secondary synchronization signal (SSS) serves as the reference for DL time and/or frequency (hereafter time/frequency) synchronization and provides the remaining pieces of information about the cell ID.

A DMRS is for estimating the channel of the UE for each of the PDSCH, PDCCH, and PBCH.

A channel-state information reference signal (CSI-RS): A DL serves as the reference for measuring the DL channel state of the UE.

A phase-tracking reference signal (PT-RS): A DL is used for phase tracking

In terms of BS energy savings, when the BS stops the DL transmission operation, the power amplifier operation may stop accordingly and thus increase the effect of BS energy savings, and the operation of not only the power amplifier but also the remaining BS devices such as a baseband device may be reduced and thus additional energy savings are possible. Similarly, even if the UL reception operation occupies a relatively small part of the total energy consumption of the BS, additional energy savings can be realized if the UL reception operation can be stopped.

The DL transmission operation of the BS is basically dependent on the amount of downlink traffic. For example, if there is no data to transmit to the UE on the DL, the BS does not need to transmit a PDSCH or a PDCCH to schedule the PDSCH. When suspension of transmission is enabled for a while for a reason such that data is not sensitive to transmission delay, the BS may not perform PDSCH and/or PDCCH transmission.

However, physical channels and physical signals such as PSS, SSS, PBCH, CSI-RS, etc. are characterized by being transmitted repeatedly at predetermined and promised intervals, independent of data transmission to the UE. Therefore, even if there is no data reception, the UE may continuously update downlink time/frequency synchronization, downlink channel status, radio link quality, etc. In other words, PSS, SSS, PBCH, and CSI-RS necessarily need to be transmitted through a DL regardless of downlink data traffic, resulting in BS energy consumption. Accordingly, BS energy savings can be achieved by controlling the transmission of signals unrelated (or less relevant) to data traffic to occur less frequently.

Two methods of BS energy saving can be used to maximize the energy saving effect of the BS by stopping or minimizing the operation of RF devices, baseband devices, etc. associated with the operation of the power amplifier of the BS during a time interval in which the BS does not perform downlink transmission.

In another method in which the energy consumption of the BS can be reduced by switching off a part of antennas or power amplifiers of the BS (hereinafter referred to as “BS energy saving method 2”), the energy savings of the BS may be accompanied by adverse effects, such as reduced cell coverage or reduced throughput. For example, when a BS, which is operating in 100 MHz bandwidth and provided with 64 transmission antennas and 64 power amplifiers corresponding thereto in the 3.5 GHz frequency band as described above, activates only 4 transmission antennas and 4 power amplifiers during a predetermined time interval and switches off the remaining transmission antennas and power amplifiers to save BS energy, the BS energy consumption during the corresponding time interval will be reduced to about 1/16 (=4/64). However, the reduction of the maximum transmission power and beamforming gain will make it difficult to achieve the cell coverage and throughput obtained by assuming the existing 64 antennas and power amplifiers.

The BS energy saving methods may be further classified into a BS energy saving method in a frequency domain that adjusts the size of a BWP according to the traffic of the BS, a BS energy saving method in a spatial domain that adaptively decreases the number of antenna ports, and a BS energy saving method in a time domain that adjusts the cycles of CSI-RS, SSB, and DRX. These three types of BS energy saving methods may be used alone or in combination depending on the characteristics of the BS, such as BS traffic or coverage, and the corresponding change information should be shared with the UE.

As a result, when the above changed information or energy saving mode is shared with the UE, the impact of coexistence of high-energy consuming technologies such as existing carrier aggregation/dual connectivity (CA/DC), PDSCH/PUSCH/PUCCH repetition, and mTRP with energy-saving modes should be examined.

The following embodiments describe the BS energy saving method disclosed herein.

First Embodiment

The First Embodiment describes each operation of a method in which a BS indicates a BS energy saving mode to a UE for BS energy savings.

The BS energy saving mode may be indicated to UEs within the BS via RRC/MAC-CE/DCI signaling.

Figure 15:
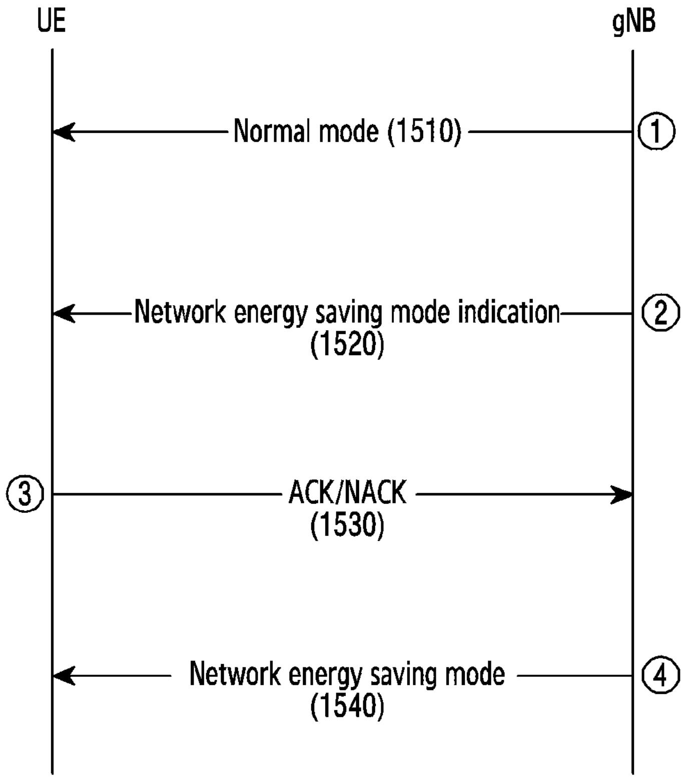
FIG. 15 illustrates a signaling method by which a BS indicates a BS energy saving mode to a UE for BS energy savings according to an embodiment.

FIG. 15 illustrates a signaling method by which a BS indicates a BS energy saving mode to a UE for BS energy savings according to an embodiment.

Referring to FIG. 15, when the BS has a large quantity of traffic and requires sufficient transmission capacity (transmission power, number of antennas), the BS serves the UE in a normal mode 1510. The UE may obtain system information of the BS through the SIB, and thus know all pieces of information about the frequency band and number of antenna ports. When the quantity of traffic within the BS decreases and, if transmission and reception are performed in the same normal mode, excessive power consumption occurs in the BS. To limit the excessive power consumption, the BS may perform procedures for the BS energy saving mode. With regard to the above-mentioned classification of the three BS energy saving modes for the frequency, spatial, and time domains, the BS may consider adjusting the detailed parameters for BS energy saving without significantly reducing the performance of the UEs served by the BS, and may notify the UE of this consideration through signaling. For example, for BS energy savings, the BS may perform discontinuous transmission and reception (DTRX) operation to transmit and receive data information and control information at every predetermined period. DTRX operation is similar to DRX applied to a UE, and may be classified as a transmission/reception mode (TRX mode) in which both transmission and reception are performed according to the BS operation, a reception mode (RX-only mode) in which only uplink reception is performed, and a transmission mode (TX-only mode) in which only downlink transmission is performed. Multiple DTRX operations may be configured for one sleep mode.

A duration in which the BS is able to transmit and receive information is determined according to slot n in which the DTRX mode is configured, a DTRX periodicity which indicates a frequency of transmitting and receiving information by a BS, and a DTRX wakeup-duration which indicates a time in which a BS remains active when the BS transmits and receives information once. When the BS is operating in a sleep mode, a time except for the DTRX wakeup-duration determined according to multiple DTRX configuration values is a DTRX sleep-duration, and during the sleep duration, the BS may save energy by not performing any operation.

The periodicity of DTRX operation of the BS may be configured based on the periodicity of the signals transmitted and received by the UE and applied with a larger value than the existing configurable value, to reduce the energy consumption of the BS. For example, the periodicity of the SS/PBCH block may be configured as one of 5 ms, 10 ms, 20 ms, 40 ms, 80 ms, and 160 ms, and the periodicity of the DTRX operation may be configured as 320 ms, 640 ms, etc., which are longer than the periodicity of the SS/PBCH block. In addition, a sleep mode may be categorized as deep sleep when the periodicity is longer than 1280 ms, and light sleep when the periodicity is 640 ms or less.

In other words, by parameterizing the periodicity of DTRX as described above, the BS may perform a BS energy saving mode.

There are two main methods to perform indication of a BS energy saving mode. First, there is a method in which a BS and a UE are configured with a set of predetermined parameters for BS energy saving and perform indication 1520 to switch from the normal mode 1510 to the BS energy saving mode 1540 with a very small number of bits. For example, 1 bit may be used to turn the BS energy saving mode on/off. This method has minimal signaling overhead but has the disadvantage of limited dynamic BS energy savings, which may be referred to as "bit-based BS energy saving mode indication".

The following describes a method in which a BS transmits detailed parameters for BS energy saving to a UE. In contrast to the previous method, dynamic BS energy saving is possible but high signaling overhead occurs, which may be referred to as "parameter-based BS energy saving mode indication". The BS energy saving mode indication may be signaled using RRC, MAC-CE, or DCI, which will be discussed below.

When the BS energy saving mode is indicated as a "bit-based BS energy saving mode indication" through RRC messages, this indication may be configured as shown below in Table 37.

TABLE 37

```
NetworkEnergySavingModeConfig ::=          SEQUENCE {
  nes-ModeConfiguration (Network energy saving mode
configuration)ENUMERATED {sleepmode1, sleepmode2,...,
sleepmodeN}
  OPTIONAL,                        -- Need S
  nes-ModeonDurationTimer (Network energy saving mode duration)
  ENUMERATED {value1, value2,..., valueN}
                                   OPTIONAL,   -- Need S
  nes-ModeStartOffset (Network energy saving mode start slot definition)
  ENUMERATED {value1, value2,..., valueN}
                                   OPTIONAL,   -- Need S
  }
```

The BS notifies the UE of a predefined BS energy saving configuration, the duration of the BS energy saving mode, and the location of starting slot according to a sleep mode, traffic, and power level to be used.

However, since RRC messages have relatively less restrictions on signaling overhead than MAC-CE or DCI-based signaling, it is possible to configure the above "bit-based BS energy saving mode indication", but it may be more reasonable to use "parameter-based BS energy saving mode indication". In this case, the values of existing RRC messages such as BWP, CSI-RS, and SSB may be updated and signaled to the UE or the parameters may be updated as shown below in Table 38.

TABLE 38

```
  NetworkEnergySavingModeConfig ::=          SEQUENCE {
  BWP ::=                                  SEQUENCE {
     bwp-Id                                     BWP-Id,
       (Bandwidth Part Identity)
     locationAndBandwidth                  INTEGER (1..65536),
     (Bandwidth Part location)
     subcarrierSpacing                        ENUMERATED {n0, n1,
n2, n3, n4, n5},
     (Subcarrier spacing)
```

TABLE 38-continued

```
    cyclicPrefix                              ENUMERATED {
                                              extended }
    (Cyclic prefix)
  }
  nes-ModeonDurationTimer (Network energy saving mode
  duration)
  ENUMERATED {value1, value2,..., valueN}
       OPTIONAL,               -- Need S
  nes-ModeStartOffset (Network energy saving mode start slot
  definition)
  ENUMERATED {value1, value2,..., valueN}
       OPTIONAL,               -- Need S
  }
```

For example, when the size of the BWP is to be adjusted via the BS energy saving mode, specifically, the RRC message for the BWP is called again and transfer a message to adjust the location and bandwidth size of the BWP. In addition, similar to the "bit-based BS energy saving mode", the location of the starting slot and the duration of the BS energy saving mode may be indicated.

In MAC CE, activation or deactivation of a specific function may be performed in a logical channel ID (LCID) for a DL-SCH. For example, in SCID indexes 111001 and 111010, information about the activation/deactivation of the SCell is signaled. Since currently about 15 bits of 100001-101111 are reserved for activation/deactivation of other functions that will be standardized in the future, the BS energy saving mode may also be indicated by one or more bits. However, since the LCID of the MAC CE deals with activation/deactivation, it is more practical to represent the activation/deactivation of the BS energy saving mode by a single bit. The specific embodiment is similar to the example of L1 signaling below and thus may refer to L1 signaling.

In FIG. 15, when the BS energy saving mode indication is signaled to the UE, the UE may transmit, to the BS, an ACK/NACK 1530 indicating whether the BS energy saving mode indication is properly received. After the BS successfully receives the ACK from the UE, the BS switches to the BS energy saving mode 1540 and provides services. Additionally, the ACK/NACK 1530 may be absent in some cases, in which case the BS switches to the BS energy saving mode 1540 regardless of whether the DCI is received from the UE.

Second Embodiment

The signaling method for indicating a BS energy saving mode of a BS described in the Second Embodiment is described based on, but not limited to, the procedure for indicating a BS energy saving mode of a BS described in the First Embodiment.

The BS may configure parameters related to the BS operation, such as a list of channels for transmission or monitoring, the periodicity of periodically transmitted signals, or the size of frequency resource, according to a sleep mode of the BS similarly to a sleep mode of a UE. To reduce unnecessary energy consumption and improve performance by adapting to the BS operation, the UE should be aware of the change in operation due to the BS state transition. In this process, the BS may indicate, to the UE, the BS energy saving mode through RRC, MAC-CE, or DCI signaling, which will be discussed in detail below.

When the BS energy saving mode is indicated as "bit-based BS energy saving mode indication" through RRC messages, this indication may be configured as shown above in Table 37.

The BS notifies the UE of a predefined BS energy saving configuration, the duration of the BS energy saving mode, and the location of a starting slot according to a sleep mode, traffic, and power level to be used.

However, since RRC messages have relatively less restrictions on signaling overhead than MAC-CE or DCI-based signaling, it is possible to configure the above "bit-based BS energy saving mode indication", but it may be more reasonable to use "parameter-based BS energy saving mode indication". This case may be used by updating the values of existing RRC messages such as BWP, CSI-RS, and SSB to signal to the UE or by updating the parameters as shown above in Table 38.

For example, when the size of the BWP is to be adjusted via the BS energy saving mode, the RRC message for the BWP is requested again and a message is transmitted to adjust the location and bandwidth size of the BWP. In addition, similar to the "bit-based BS energy saving mode", the location of a starting slot and the duration of the BS energy saving mode may be indicated.

In MAC CE, activation or deactivation of a specific function may be performed in an LCID for a DL-SCH. For example, in SCID indexes 111001 and 111010, information about the activation/deactivation of the SCell is signaled. Since currently about 15 bits of 100001-101111 are reserved for activation/deactivation of other functions that will be standardized in the future, the BS energy saving mode may also be indicated by one or more bits. However, since the LCID of the MAC CE deals with activation/deactivation, it is more practical to represent the activation/deactivation of the BS energy saving mode by a single bit. This embodiment is similar to the example of layer 1 (L1) signaling below and thus may refer to the L1 signaling embodiment.

The BS energy saving mode indication through RRC or MAC signaling is more reliable than that of L1 signaling, but the change to the BS energy saving mode has a long delay and is not dynamically applied, making it difficult to respond immediately to the state transition of the BS. Since a method of indicating the UE to omit transmission and reception of a specific channel that should be performed also differs depending on the type of channel and should be separately indicated for each channel, there is a large amount of signaling overhead to adapt the UE operation to the state transition of the BS. However, L1 signaling has a low latency but has a clear limitation on signaling overhead, and thus compact indications are required and reliability is low (errors occur with a probability of about 1%).

The following three points indicate the BS energy saving mode by L1 signaling.

Point 1: Cell-Specific DCI Vs. UE-Specific DCI

Unlike modes for power saving for a single UE, the BS energy saving mode affects all UEs in a cell, and thus it is more appropriate to use cell-specific DCI than using UE-specific DCI when considering overhead.

Point 2: CSS Vs. USS

In addition to RRC_CONNECTED UEs in the cell, RRC_IDLE UEs also need to notify that the BS should enter the BS energy saving mode, and operation through CSS rather than USS is more reasonable.

Point 3: Scheduling DCI Vs. Non-Scheduling DCI

There is no need to be bound by scheduling DCI.

DCI format 1_0 or new DCI format 2_x for BS energy saving mode are appropriate to satisfy the above three points. As described above, DCI format 1_0 is scrambled by several types of RNTIs such as C-RNTI, SI-RNTI, RA-RNTI, and MsgB-RNTI. DCI format 1_0 scrambled by P-RNTI is shown below in Table 39.

TABLE 39

| Field | bits | Note |
|---|---|---|
| short messages Indicator | 2 | |
| short messages | 8 | |
| Frequency domain resource assignment | $\lceil \log_2(N_{RB}^{DL,BWP}(N_{RB}^{DL,BWP}+1)/2) \rceil$ | * |
| Time domain resource assignment | 4 | * |
| VRB-to-PRB mapping | 1 | * |
| Modulation and coding scheme | 5 | * |
| TB scaling | 2 | * |
| TRS availability indication | M = 0~6 | ** |
| Reserved bits | (8 − M) or (6 − M) | *** |

If only the short message is carried, this bit field is reserved

M=1~6 bits (if TRS-ResourceSetConfig is configured), 0 (otherwise)

with spectrum sharing or without spectrum sharing

In Table 39, $$N_{RB}^{DL,BWP}$$

is the size of CORESET 0. The short messages indicator in the first row is 2 bits of information and serves to indicate whether it is short message information or paging information, or both, as shown below in Table 40.

TABLE 40

| Bit field | short message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

The short message includes information related to changes in system information or information regarding a disaster, as shown below in Table 41.

TABLE 41

| Bit | short message |
|---|---|
| 1 | systemInfoModification |
| 2 | etwsAndCmasIndication |
| 3 | stopPagingMonitoring |
| 4 | systemInfoModification-eDRX |
| 5-8 | Not used in this release of the specification, and shall be ignored by UE if received. |

Similar to the MAC CE, there is a large quantity of reserved bits. In particular, when only a short message is transmitted through the first note shown above in Table 39 (i.e., short message indicator='10'), all bits in the row marked * are changed to reserved bits, and thus various indications for the BS energy saving mode may be provided.

At least one of the following short message indicator, reuse of 5-8 bits for short messages, and reserved bit reuse, may be used depending on the situation.

Short Message Indicator='00'

Short message indicator='00', which is a reserved bit, may be configured as the BS energy saving mode indication. In this case, only one piece of information may be transmitted, and thus this is only used for on/off of the BS energy saving mode. This short message indicator may be used like other reserved bits as needed.

In this case, since the presence or absence of paging information is unable to be expressed such that the short message indicator={'01', '10', '11'}, the following alternatives may be used.

When the short message indicator='00', there is neither short message nor paging information.

When the short message indicator='00', the short message is identified in a short message field, and there is no paging information.

When the short message indicator='00', the short message is used to indicate detailed parameters of the BS energy saving mode, and paging information always exists.

When the short message indicator='00', short messages are identified in a short message field, and paging information always exists.

When the short message indicator='00', the short message field is reserved, and paging information always exists.

Reuse 5-8 Bits for Short Messages

As shown above in Table 41, the 5th to 8th bits for short messages are reserved, and thus this reserved bits may be used in the BS energy saving mode. Like the short message indicator, 1 bit information may be used for on/off, or all 4 bits may be used to configure a predefined BS energy saving mode according to energy level.

When the short message indicator is configured as '01', all short messages are reserved, and thus all 8 bits may be utilized.

Reserved Bit Reuse

Unlike the field for short message indicator and the field for short message, the field for reserved bits may utilize only the reserved bits of the (6-M) bits noted by *** as shown above in Table 39 or may be configured with short message indicator='10', or the fields noted by * and including frequency domain resource assignment (FDRA) bits are all reserved and thus to be utilized in the BS energy saving mode. When only the reserved bits of the (6-M) bits noted by *** is usable, the number of available bits is not large and thus a predefined BS energy saving mode may be configured and operated in a limited manner. However, when all fields noted by * and including FDRA bits are usable, "parameter-based BS energy saving mode indication" may also be operated because the number of bits that can be expressed is large.

However, when operating based on "parameter-based BS energy saving mode indication", since the UE should recognize that the operation is based on the BS energy saving mode indication, additional bits may be needed to indicate BS energy saving mode for each parameter. When "parameter-based BS energy saving mode indication" is operated simultaneously with the short message indicator='00' described above, additional bits to indicate BS energy saving mode for each parameter may be saved.

As described above, DCI format 1_0 may be scrambled not only by P-RNTI, but also by C-RNTI, SI-RNTI, RA-RNTI, MsgB-RNTI, and TC-RNTI. Regardless of which RNTI is scrambled with DCI format 1_0, the total number of bits is constant and there will be reserved bits similar to P-RNTI, and thus 'bit-based BS energy saving mode indication' or 'parameter-based energy saving mode indication' may be used according to the number of available bits. For example, for the PDCCH order, a case in which DCI format 1_0 is scrambled by C-RNTI and all fields corresponding to FDRA are 1 is shown below in Table 42.

TABLE 42

| Field | bits | Note |
|---|---|---|
| Identifier for DCI formats | 1 | |
| Frequency domain resource assignment | $\lceil \log_2(N_{RB}^{DL,BWP}(N_{RB}^{DL,BWP}+1)/2) \rceil$ | All ones |
| Random Access Preamble index | 6 | * |
| UL/SUL indicator | 1 | * |
| SS/PBCH index | 6 | * |
| PRACH Mask index | 4 | |
| Reserved bits | 12 or 10 | |

*If "Random Access Preamble index" is all zeros, this field is reserved

When there are 10 bits of reserved bits, and in addition, if the RA preamble index field is all 0, all fields corresponding to * are reserved, and thus "bit-based BS energy saving mode indication" or "parameter-based BS energy saving mode indication" are all available.

If DCI format 1_0 is scrambled by SI-RNTI, the BS energy saving mode indication may be performed using only the specified reserved bits without additional conditions, as shown below in Table 43.

TABLE 43

| Field | Bits | Note |
|---|---|---|
| Frequency domain resource assignment | $\lceil \log_2(N_{RB}^{DL,BWP}(N_{RB}^{DL,BWP}+1)/2) \rceil$ | |
| Time domain resource assignment | 4 | |
| VRB-to-PRB mapping | 1 | |
| Modulation and coding scheme | 5 | |
| Redundancy version | 2 | |
| System information indicator | 1 | |
| Reserved bits | 17 or 15 | |

When DCI format 1_0 is scrambled by RA-RNTI or MsgB-RNTI, the BS energy saving mode indication may be performed using only the specified reserved bits without additional conditions, as shown below in Table 44.

TABLE 44

| Field | Bits | Note |
|---|---|---|
| Frequency domain resource assignment | $\lceil \log_2(N_{RB}^{DL,BWP}(N_{RB}^{DL,BWP}+1)/2)) \rceil$ | |
| Time domain resource assignment | 4 | |
| VRB-to-PRB mapping | 1 | |
| Modulation and coding scheme | 5 | |
| TB scaling | 2 | |
| LSBs of SFN | A = 2 or 0 | |
| Reserved bits | 17 or 15 | |

When DCI format 1_0 is scrambled by TC-RNTI, the BS energy saving mode indication may be performed using the reserved bits and reserved downlink assignment index field as shown in Table 44. In this case, since there are not many bits available, it is reasonable to perform "bit-based BS energy saving mode indication".

The following is a method of scrambling DCI format 1_0 using a new RNTI for the BS energy saving mode. For example, when NES-RNTI is newly established and DCI format 1_0 is scrambled, $$\lceil \log_2(N_{RB}^{DL,BWP}(N_{RB}^{DL,BWP}+1)/2\rceil + 29$$

bits can be used as the BS energy saving mode. Since there are many available bits, the "parameter-based BS energy saving mode indication" is performed.

The "bit-based BS energy saving mode indication" specified above may be operated in embodiments as shown below in Table 45 to Table 46.

TABLE 45

| Field | Bits | Note |
|---|---|---|
| . . . | . . . | |
| Network energy saving mode indicator | 2 | |
| Network energy saving mode offset (K3) | 2 | |
| Network energy saving mode duration | 2 | |
| . . . | . . . | |

TABLE 46

| Bit Field | Network energy saving mode indicator |
|---|---|
| 00 | Network energy saving mode 0 |
| 01 | Network energy saving mode 1 |
| 10 | Network energy saving mode 2 |
| 11 | Network energy saving mode 3 |

"Network saving mode indicator" serves to indicate N preconfigured "Network saving modes". In an example, since N=4, the network saving mode has 2 bits, but in actual application, the network saving mode may be configured as $\lceil \log_2 N \rceil$ bits within the range available in DCI format 1_0. Specially, the case of N=2 may play the role of turning on/off "Network saving mode".

The predefined "Network saving mode" may include {SSB/CSI-RS transmission configurations, power level, DTRX configurations, BS transmission/reception bandwidths, the number of BS transmission/reception antenna ports, etc.} as follows. The predefined "Network saving mode" below may be defined in RRC or SIB, and DCI may be referenced to refer to the corresponding mode.

Network saving mode 0: frequency domain
  BWP_ID {sequence 0, 1, 2, 3}
Network saving mode 1: spatial domain
  nrofPorts (number of antenna ports)/CSI-ResourceSet (number of CSI-RS resources)/BWP-ID {sequence 0, 1, 2, 3}
Network saving mode 2: time domain
  DTRX=640 ms;
  CSI-RS periodicity TCSI-RS=80 ms
  Secondary cell activation/deactivation
Network saving mode 3: combination
  BWP_ID {sequence 0, 1, 2, 3}
  DTRX=640 ms The "Network saving mode" requires additional information about the detailed options under each mode, e.g., which BWP_ID to select. This may be defined in the RRC or SIB as previously described. However, the following shows a modified embodiment of 'Network saving mode'.

Network saving mode 0
  nrofPorts (number of antenna ports)=64
  BW=100 MHz
  PSD=33 dBM/Hz
Network saving mode 1
  nrofPorts (number of antenna ports)=32
  BW=50 MHz
  PSD=30 dBM/Hz
Network saving mode 2
  nrofPorts (number of antenna ports)=16
  BW=25 MHz
  PSD=27 dBM/Hz
Network saving mode 3
  nrofPorts (number of antenna ports)=8
  BW=10 MHz
  PSD=24 dBM/Hz The above embodiment is one option without a detailed configuration under each mode, and thus the UE does not need to receive additional RRC messages for each detailed configuration.

However, the starting position of the BW, etc. may be transferred separately through an RRC message (e.g., offset with reference to point A). The following is an embodiment of the modification of the above single option mode.

Network saving mode 0
  (k, m, n)=(1,1,1)
Network saving mode 1
  (k, m, n)=(1,0.5,0.5)
Network saving mode 2
  (k, m, n)=(0.5,0.5,0.5)
Network saving mode 3
  (k, m, n)=(0.25,0.25,0.25)

The above embodiment shows the scaling factor (k, m, n) for each parameter under the criteria of {nrofPorts (number of antenna ports)=64, BW=100 MHz, PSD=33 dBM/Hz}. For example, in network saving mode 1, each factor is scaled by (1, 0.5, 0.5) and operates such that {nrofPorts (number of antenna ports)=64, BW=50 MHz, PSD=30 dBM/Hz}. The values of (k, m, n) may be predefined or received through RRC messages.

In the 'Network energy saving mode offset' field as shown above in Table 45, the BS energy saving mode may be implemented after K3 offset from a time point at which when the DCI is received. Of course, as mentioned above, the BS energy saving mode may be performed after receiving ACKs from all UEs in the cell and may also be performed under the determination of the BS itself without ACK/NACK. K3 may be configured with a predefined value such as K3={1, 2, 4, 8 slots}. 'Network energy saving mode duration' refers to a duration during which the BS energy saving mode is performed and may be configured as {20, 40, 160, 320 slots or symbols}.

The 'parameter-based BS energy saving mode indication' may be operated as shown below in Table 47. The difference with the 'bit-based BS energy saving mode indication' is that, unlike the predefined BS energy saving mode, parameters are adjusted for flexible BS energy saving according to the BS situation. A value of the corresponding parameter should be expressed in bits and should be placed within a predefined set.

TABLE 47

| Field | Bits | Note |
|---|---|---|
| . . . | . . . | |
| Network energy saving mode indicator | 1 | |

TABLE 47-continued

| Field | Bits | Note |
|---|---|---|
| BWP_ID | 2 | |
| DTRX periodicity | 3 | |
| Network energy saving mode offset (K3) | 2 | |
| Network energy saving mode duration | 2 | |
| . . . | . . . | |

For example, 'Network energy saving mode indicator' is assigned with 1 bit to specify that the DCI is in the BS energy saving mode and adjust the specific BWP or DTRX periodicity. In addition, K3 and duration may be applied in the same manner as the case of 'bit-based BS energy saving mode indication'.

Additional DCIs may be used to terminate the BS energy saving mode or to switch to another BS energy saving mode. For example, when a gNB is operating in 'Network energy saving mode 1' and, if an additional DCI for 'Network energy saving mode 2' is received, the gNB switches to 'Network energy saving mode 2' after K3 slot again from a time point at which the additional DCI is received, and the UE also operates in the corresponding mode.

The following describes a method of scrambling a new DCI format 2_8 by NES-RNTI instead of DCI format 1_0 for the BS energy saving mode. The new DCI format 2_8 is used for the BS energy saving mode and is indicated to all UEs within the BS. Similar to the existing DCI formats 2_1 through 7, the new DCI format 28 may be defined as follows.

DCI format 2_8 is used for the BS energy saving mode, and information about the BS energy saving mode may be transmitted to all UEs within the BS. The following information is transmitted by DCI format 2_8 via CRC scrambled by the NES-RNTI.

block number 1, block number 2, . . . , block number N

The starting position of the block is determined by a parameter nes-PositionDCI-2-8, which is provided by a higher layer for a UE configured by blocks. Here, when UEs are grouped by N blocks so that all UEs within the BS are notified of the information about the BS energy saving mode, N is configured as 1 (N=1).

When the UE is configured by DCI format 2_8 and a higher layer parameter NES-RNTI, one block is configured for each higher layer, and fields defined for the corresponding block are a network energy saving mode indication: 1 bit, and a network saving mode: 8 bit.

The size of DCI format 2_8 is indicated by higher layer parameter sizeDCI-2-8.

The example shows that DCI format 2_8 is configured based on 'bit-based BS energy saving mode indication', and the DCI format 28 may also be configured based on the 'parameter-based BS energy saving mode indication' as needed. Unlike DCI format 1_0 which uses reserved bits, DCI format 2_8 is defined independently and thus may be efficiently configured to support a higher resolution BS energy saving mode.

Third Embodiment

The Third Embodiment relates to, when the 'bit-based BS energy saving mode indication' or 'parameter-based BS energy saving mode indication' of the Second Embodiment is indicated to the UE, the effect of coexistence between the energy saving mode and energy-consuming technologies such as conventional carrier aggregation (CA)/dual connectivity (DC), PUSCH/PDSCH/PUCCH repetition, and mTRP.

When energy-consuming technologies such as CA/DC, PUSCH/PDSCH/PUCCH repetition, and mTRP are indicated, the BS may indicate an energy saving mode by considering future traffic conditions.

In this case, the BS may include several options for CA/DC, PUSCH/PDSCH/PUCCH repetition, and mTRP configurations by considering the BS energy saving mode. First, the CA/DC, PUSCH/PDSCH/PUCCH repetition, and mTRP configurations and the BS energy saving mode should not be configured at the same time. Therefore, the BS indicates the BS energy saving mode to the UE while simultaneously instructing the UE to at least partially disable the CA/DC, PUSCH/PDSCH/PUCCH repetition, and mTRP. For example, when the BS energy saving mode is indicated via RRC, the BS simultaneously updates the RRC configurations for CA/DC, PUSCH/PDSCH/PUCCH repetition, and mTRP so that the UE is able to receive the RRC configurations simultaneously. To instruct the UE to perform the above operation via MAC-CE or DCI, additional signaling should be used, or signaling regarding the existing CA/DC, PUSCH/PDSCH/PUCCH repetition, and mTRP should be updated to indicate the above operation to the UE. Of course, although this method introduces additional overhead, there is no misunderstanding between the UE and the BS.

As another alternative, although the BS energy saving mode and the CA/DC, PUSCH/PDSCH/PUCCH repetition, and mTRP mode may be configured simultaneously, the UE may perform operation based on the BS energy saving mode. In this case, even if the BS energy saving mode is indicated in the middle, the UE may determine to update the CA/DC, PUSCH/PDSCH/PUCCH repetition, and mTRP without additional indication, thereby limiting technologies that increase BS energy to match the BS energy saving mode.

In another example, a method according to the BS configuration may allow accurate instructions for UE operation to be provided under the determination of the BS. For example, there may be a BS operation of simultaneously performing the BS energy saving mode and the CA/DC, PUSCH/PDSCH/PUCCH repetition, and mTRP operations, or indicating only one of two modes to operate. Therefore, this method introduces additional overhead similar to the first alternative.

Fourth Embodiment

Figure 16:
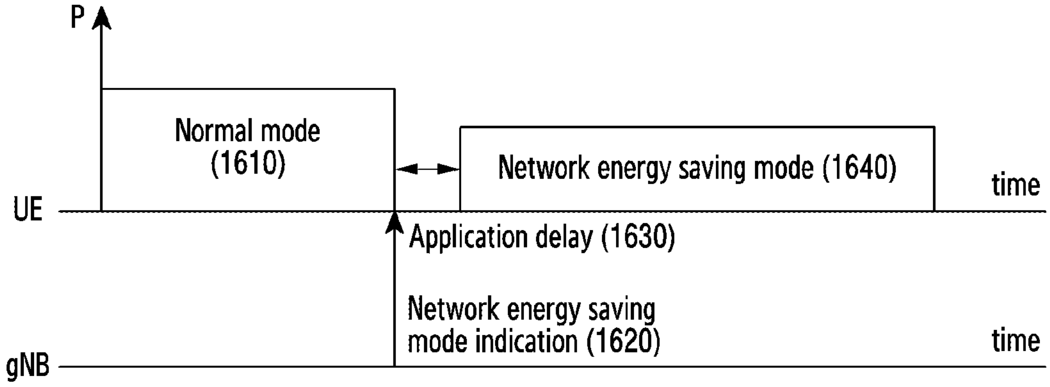
FIG. 16 illustrates a timeline in which a UE operates in a BS energy saving mode according to an embodiment.

FIG. 16 illustrates a timeline in which a UE operates in a BS energy saving mode according to an embodiment. Specifically, FIG. 16 concerns when the BS energy saving mode is indicated by a BS while CA/DC, PUSCH/PDSCH/PUCCH repetition, and mTRP (hereinafter referred to as normal mode) are in operation.

Referring to FIG. 16, when a BS energy saving mode indication 1620 is signaled to the UE from the BS while the UE is operating in a normal mode 1610, the UE may operate in a BS energy saving mode 1640 after a predetermined application delay (K3 in the Second Embodiment) 1630 between the BS and the UE or after a delay based on capability. In this case, the UE may disable all operations for the normal mode.

Figure 17:
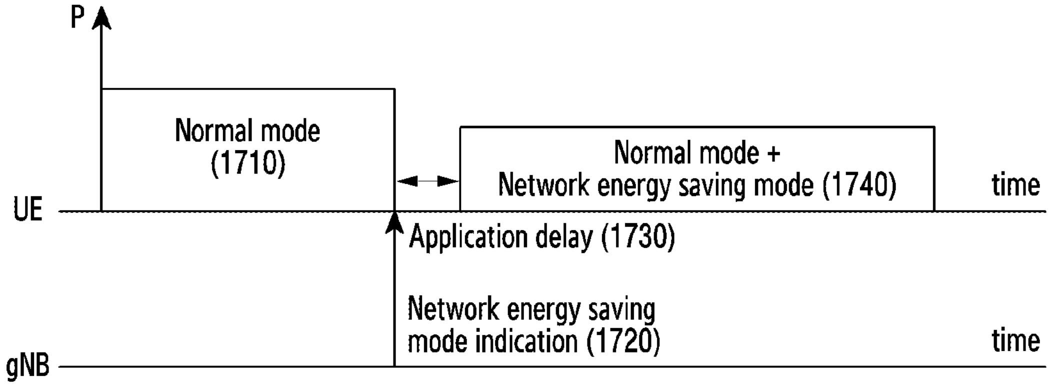
FIG. 17 illustrates a timeline in which a UE operates in a BS energy saving mode in addition to a normal mode according to an embodiment.

FIG. 17 illustrates a timeline in which a UE operates in a BS energy saving mode in addition to a normal mode according to an embodiment. Specifically, FIG. 17 concerns when the BS energy saving mode is indicated by a BS while operating in the normal mode.

Referring to FIG. 17, when a BS energy saving mode indication 1720 is signaled to the UE from the BS while the UE is operating in a normal mode 1710, the UE operates in a BS energy saving mode 1740 after a predetermined application delay (K3 in the Second Embodiment) 1730 between the BS and the UE or after a delay based on capability. In this case, the UE may not disable all operations in the normal mode but may restrict some operations. In other words, the UE may perform operations for the normal mode and operations for the BS energy saving mode 1740 together. As mentioned in the Second Embodiment, the operations of the UE may differ depending on the content of the BS energy saving mode. For example, if the UE receives an indication of the BS energy saving mode for the spatial domain during PDSCH repetition, the UE may perform BS energy savings for the spatial domain (such as reducing the number of transmission/reception antennas) while maintaining PDSCH repetition because there is no correlation between the two operations. However, when the BS energy saving mode for the time domain is indicated, it may be appropriate to end the PDSCH repetition as shown in FIG. 16 since there is a correlation between the two operations.

Fifth Embodiment

The Fifth Embodiment describes a detailed embodiment of a UE operation when a BS energy saving mode with a high correlation to each operation during CA/DC operation is indicated to the UE.

Assume that the UE is performing CA/DC operation in a normal mode.

Figure 18:
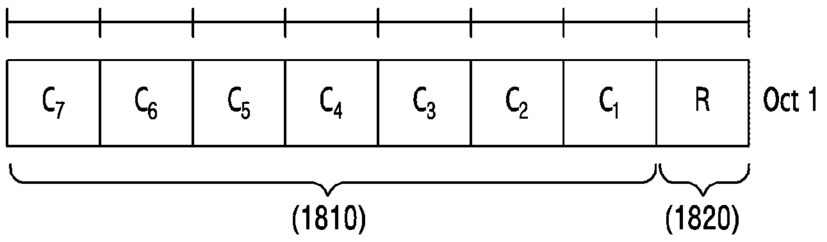
FIG. 18 illustrates SCell activation/deactivation indications through MAC CE according to an embodiment.

FIG. 18 illustrates SCell activation/deactivation indications through a MAC CE according to an embodiment. Referring to FIG. 18, through MAC CE, each UE receives one PCell and N SCell activation/deactivation indications (N up to 7). If N>7, Oct4 may be used to indicate up to 24 SCell activation/deactivation indications of SCell. The corresponding data structure is configured by $C_1$ to $C_7$ 1810 corresponding to each SCell, and R 1820 which is a reserved bit. If $C_1$ to $C_7$ 1810 corresponding to each SCell is '0', the SCell is in deactivation, and if $C_1$ to $C_7$ 1810 is '1', the SCell is in activation state. If the BS energy saving mode is indicated or triggered in a particular SCell during the process, the UE may perform deactivation for the corresponding SCell. However, if the BS energy saving mode is indicated or triggered in a particular PCell during the process, operations such as those shown in FIGS. 19 to 21 may be performed.

Figure 19:
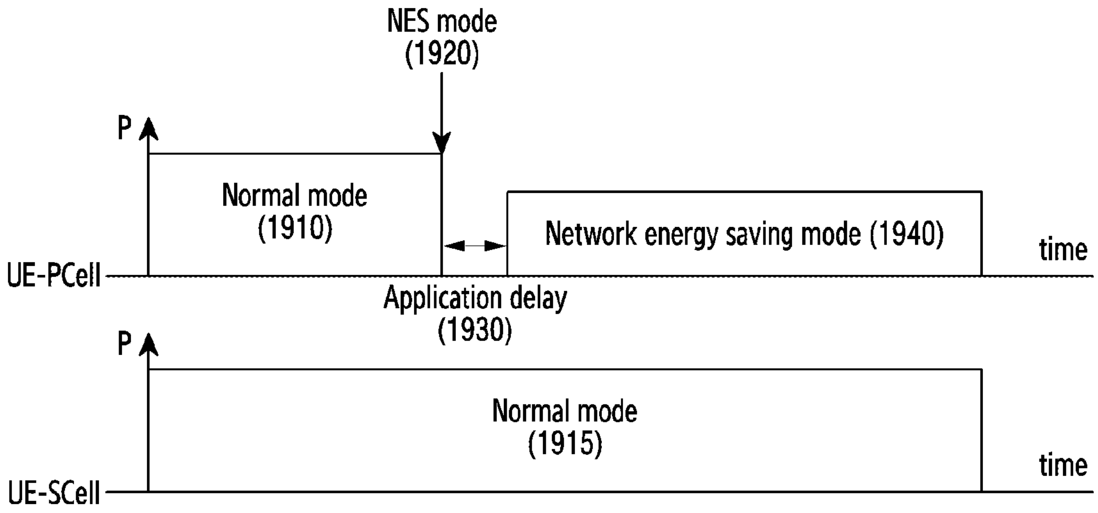
FIG. 19 illustrates a UE operation for PCell/SCell when a BS energy saving mode is indicated to a UE from a PCell according to an embodiment.

FIG. 19 illustrates a UE operation for PCell/SCell when a BS energy saving mode is indicated to a UE from a PCell according to an embodiment.

Referring to FIG. 19, when a BS energy saving mode ("NES mode" 1920) is indicated to the UE from the PCell, the UE may determine that the energy saving mode is an indication for the PCell only. In this case, the UE may switch, for the PCell, from a normal mode 1910 to a BS energy saving mode 1940 after a specific application delay 1930. However, when the UE determines that the indication 1920 is performed only for the PCell, since there is no reason for SCells connected to the UE to enter the BS energy saving mode, the UE may continue to operate in a normal mode 1915. In this case, in order for the SCell to operate in the BS energy saving mode, additional BS energy saving mode indications should be received from the SCell. When the UE receives the additional BS energy saving mode indication from the SCell, the SCell connected to the UE may switch to the BS energy saving mode.

Figure 20:
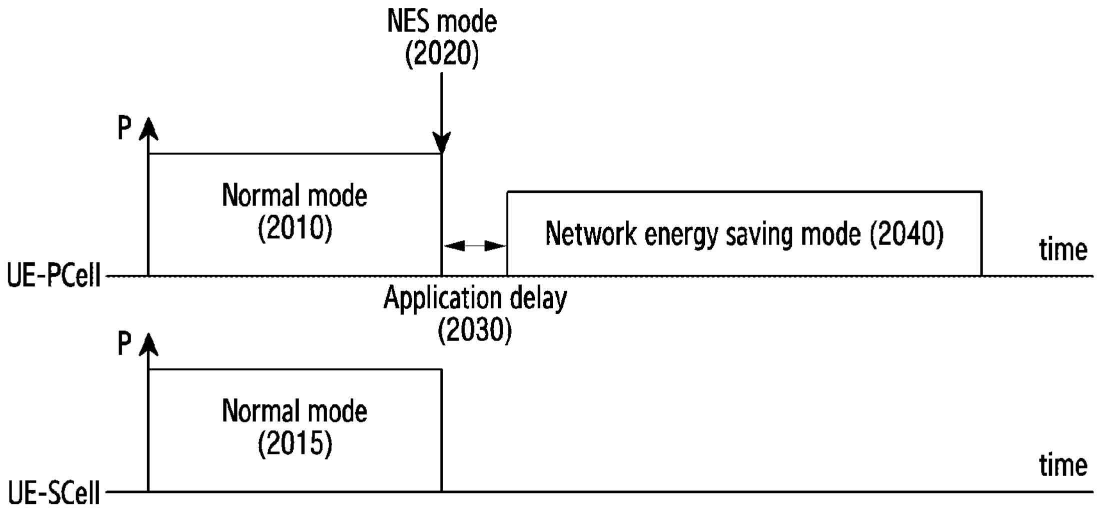
FIG. 20 illustrates a UE operation for PCell/SCell when a BS energy saving mode is indicated to a UE from a PCell according to an embodiment.

FIG. 20 illustrates a UE operation for PCell/SCell when a BS energy saving mode is indicated to a UE from a PCell according to an embodiment.

Referring to FIG. 20, when a BS energy saving mode is indicated to the UE from a PCell (at NES mode 2020, the UE may determine that the energy saving mode is an indication for both a PCell and an SCell. The UE according to an embodiment may determine, for the PCell, to switch from a normal mode 2010 to a BS energy saving mode 2040 and may determine to terminate CA/DC operation at the same time. The UE may switch, for the PCell, from the normal mode 2010 to the BS energy saving mode 2040 after a specific application delay 2030 and may disconnect from the SCell that was operating in the normal mode 2015. If information about the SCell exists for the BS energy saving mode indicated from the PCell according to an embodiment, the UE may terminate the connection with the particular SCell according to the configuration included in the corresponding information.

Figure 21:
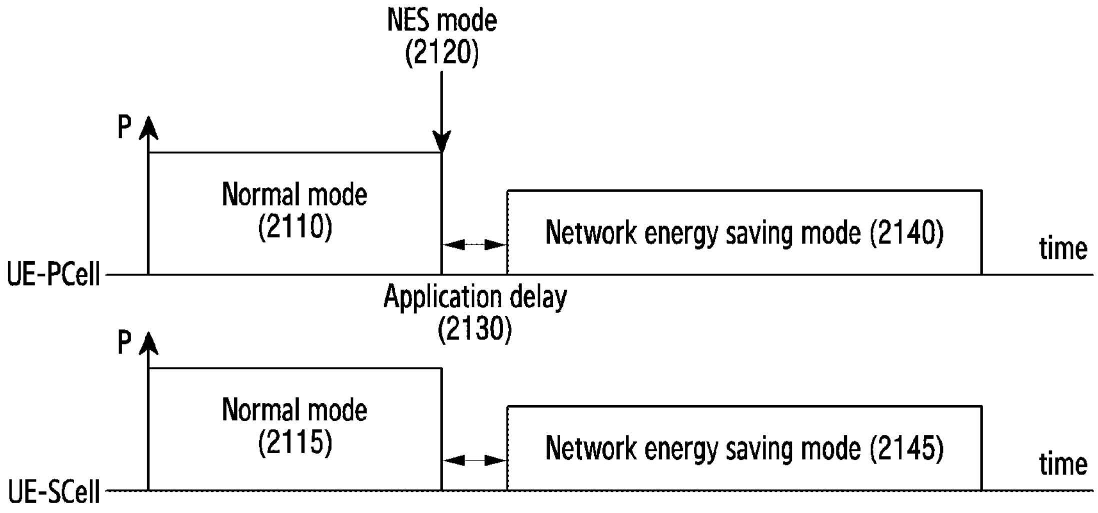
FIG. 21 illustrates a UE operation for PCell/SCell when a BS energy saving mode is indicated to a UE from a PCell according to an embodiment.

FIG. 21 illustrates a UE operation for PCell/SCell when a BS energy saving mode is indicated to a UE from a PCell according to an embodiment.

Referring to FIG. 21, when a BS energy saving mode is indicated to the UE from a PCell (2120), the UE may determine that the energy saving mode is an indication for both the PCell and SCell. In an embodiment, the UE may determine, for the PCell, to switch from a normal mode 2110 to a BS energy saving mode 2140 and simultaneously determine, for the SCell, to switch from a normal mode 2115 to a BS energy saving mode 2145. The UE may switch from the normal mode 2110 to the BS energy saving mode 2140 after a specific application delay 2130 and may also switch to the BS energy saving mode 2145 after the application delay 2130 for the SCell that is operating in the normal mode 2115.

Sixth Embodiment

In the Sixth Embodiment, assuming that a UE is performing PUSCH/PDSCH/PUCH repetition in a normal mode. The number of PUSCH repetitions (dynamic scheduling) is defined in PUSCH-Allocation as shown below in Table 48 in PUSCH-TimeDomainResourceAllocation.

TABLE 48

```
PUSCH-Allocation-r16 ::= SEQUENCE {
    mappingType-r16 ENUMERATED {typeA, typeB} OPTIONAL, -- Cond NotFormat01-02-Or-
TypeA
    startSymbolAndLength-r16 INTEGER (0..127) OPTIONAL, -- Cond NotFormat01-02-Or-TypeA
    startSymbol-r16 INTEGER (0..13) OPTIONAL, -- Cond RepTypeB
    length-r16 INTEGER (1..14) OPTIONAL, -- Cond RepTypeB
    numberOfRepetitions-r16 ENUMERATED {n1, n2, n3, n4, n7, n8, n12, n16} OPTIONAL, --
Cond Format01-02
    ...,
```

TABLE 48-continued

```
    [[
    numberOfRepetitionsExt-r17 ENUMERATED {n1, n2, n3, n4, n7, n8, n12, n16, n20, n24, n28,
n32, spare4, spare3, spare2,
    spare1} OPTIONAL, -- Cond Format01-02-For-TypeA
    numberOfSlotsTBoMS-r17 ENUMERATED {n1, n2, n4, n8, spare4, spare3, spare2, spare1}
OPTIONAL, -- Need R
    extendedK2-r17 INTEGER (0..128) OPTIONAL -- Cond MultiPUSCH
    ]]
  }
```

The number of PUSCH repetitions (configured grant) is defined in PUSCH-Config and ConfiguredGrantConfig as shown below in Table 49.

TABLE 49

```
  PUSCH-Config ::= SEQUENCE {
    dataScramblingIdentityPUSCH INTEGER (0..1023) OPTIONAL, -- Need S
    txConfig ENUMERATED {codebook, nonCodebook} OPTIONAL, -- Need S
    dmrs-UplinkForPUSCH-MappingTypeA SetupRelease { DMRS-UplinkConfig }
OPTIONAL, -- Need M
    dmrs-UplinkForPUSCH-MappingTypeB SetupRelease { DMRS-UplinkConfig }
OPTIONAL, -- Need M
    pusch-PowerControl PUSCH-PowerControl OPTIONAL, -- Need M
    frequencyHopping ENUMERATED {intraSlot, interSlot} OPTIONAL, -- Need S
    frequencyHoppingOffsetLists SEQUENCE (SIZE (1..4)) OF INTEGER (1..
maxNrofPhysicalResourceBlocks-1)
    OPTIONAL, -- Need M
    resource Allocation ENUMERATED { resourceAllocationType0, resourceAllocationType1,
dynamicSwitch},
    pusch-TimeDomainAllocationList SetupRelease { PUSCH-
TimeDomainResourceAllocationList } OPTIONAL, -- Need M
    pusch-AggregationFactor ENUMERATED { n2, n4, n8 } OPTIONAL, -- Need S
    ...
  }
  ConfiguredGrantConfig ::= SEQUENCE {
    frequencyHopping ENUMERATED {intraSlot, interSlot} OPTIONAL, -- Need S
    cg-DMRS-Configuration DMRS-UplinkConfig,
    mcs-Table ENUMERATED {qam256, qam64LowSE} OPTIONAL, -- Need S
    mcs-TableTransformPrecoder ENUMERATED {qam256, qam64LowSE} OPTIONAL, --
Need S
    uci-OnPUSCH SetupRelease { CG-UCI-OnPUSCH } OPTIONAL, -- Need M
    resource Allocation ENUMERATED { resourceAllocationType0, resourceAllocationType1,
dynamicSwitch },
    rbg-Size ENUMERATED {config2} OPTIONAL, -- Need S
    powerControlLoopToUse ENUMERATED {n0, n1},
    p0-PUSCH-Alpha P0-PUSCH-AlphaSetId,
    transformPrecoder ENUMERATED {enabled, disabled} OPTIONAL, -- Need S
    nrofHARQ-Processes INTEGER(1..16),
    repK ENUMERATED {n1, n2, n4, n8},
    ...
    repK-v1710 ENUMERATED {n12, n16, n24, n32} OPTIONAL, -- Need R
    ...
  }
```

The number of PDSCH repetitions (semi-persistent scheduling: SPS) is defined in PDSCH-Config as shown below in Table 50.

TABLE 50

```
  PDSCH-Config ::= SEQUENCE {
    dataScramblingIdentityPDSCH INTEGER (0..1023) OPTIONAL, -- Need S
    dmrs-DownlinkForPDSCH-MappingTypeA SetupRelease { DMRS-DownlinkConfig } OPTIONAL,
-- Need M
    dmrs-DownlinkForPDSCH-MappingTypeB SetupRelease { DMRS-DownlinkConfig } OPTIONAL,
-- Need M
    tci-StatesToAddModList SEQUENCE (SIZE(1..maxNrofTCI-States)) OF TCI-State OPTIONAL, --
Need N
    tci-StatesToReleaseList SEQUENCE (SIZE(1..maxNrofTCI-States)) OF TCI-StateId OPTIONAL, -
- Need N
    vrb-ToPRB-Interleaver ENUMERATED {n2, n4} OPTIONAL, -- Need S
    resource Allocation ENUMERATED { resourceAllocationType0, resourceAllocationType1,
dynamicSwitch},
    pdsch-TimeDomainAllocationList SetupRelease { PDSCH-TimeDomainResourceAllocationList }
```

TABLE 50-continued

```
OPTIONAL, -- Need M
     pdsch-AggregationFactor ENUMERATED { n2, n4, n8 }
     ...
  }
```

The number of PDSCH repetition (dynamic scheduling) is defined in PDSCH-Config as shown below in Table 51.

TABLE 51

```
  PDSCH-TimeDomainResourceAllocation-r16 ::= SEQUENCE {
     k0-r16 INTEGER(0..32) OPTIONAL, -- Need S
     mappingType-r16 ENUMERATED {typeA, typeB},
     startSymbolAndLength-r16 INTEGER (0..127),
     repetitionNumber-r16 ENUMERATED {n2, n3, n4, n5, n6, n7,
n8, n16} OPTIONAL, -- Cond Formats1-0and1-1
     ...,
     [[
     k0-v1710 INTEGER(33..128) OPTIONAL -- Need S
     ]],
     [[
     repetitionNumber-v1730 ENUMERATED {n2, n3, n4, n5, n6, n7,
n8, n16} OPTIONAL -- Cond Format1-2
     ]]
  }
```

The number of PUCH repetitions (semi-static) is defined in PDSCH-FormatConfig as shown below in Table 52.

TABLE 52

```
PUCCH-FormatConfig ::= SEQUENCE {
  interslotFrequencyHopping ENUMERATED {enabled} OPTIONAL,
  -- Need R
  additionalDMRS ENUMERATED {true} OPTIONAL, -- Need R
  maxCodeRate PUCCH-MaxCodeRate OPTIONAL, -- Need R
  nrofSlots ENUMERATED {n2,n4,n8} OPTIONAL, -- Need S
  pi2BPSK ENUMERATED {enabled} OPTIONAL, -- Need R
  simultaneousHARQ-ACK-CSI ENUMERATED {true}
  OPTIONAL -- Need R
}
```

The number of PUCCH repetitions (dynamic linked with PUCCH resource) is defined in PUCCH-ResourceExt as shown below in Table 53.

TABLE 53

```
PUCCH-ResourceExt-v1610 ::= SEQUENCE {
interlaceAllocation-r16 SEQUENCE {
rb-SetIndex-r16 INTEGER (0..4),
interlace0-r16 CHOICE {
scs15 INTEGER (0..9),
scs30 INTEGER (0..4)
}
} OPTIONAL, -- Need R
format-v1610 CHOICE {
interlace1-v1610 INTEGER (0..9),
occ-v1610 SEQUENCE {
occ-Length-v1610 ENUMERATED {n2,n4} OPTIONAL, -- Need M
occ-Index-v1610 ENUMERATED {n0,n1,n2,n3} OPTIONAL -- Need M
}
} OPTIONAL, -- Need R
...,
[[
formatExt-v1700 SEQUENCE {
nrofPRBs-r17 INTEGER (1..16)
} OPTIONAL, -- Need R
pucch-RepetitionNrofSlots-r17 ENUMERATED { n1,n2,n4,n8 }
OPTIONAL -- Need R
]]
}
```

Similar to the CA/DC of the Fifth Embodiment, when the PUSCH/PDSCH/PUCCH repetition is operating in a normal mode and the BS energy saving mode is indicated, the operation of the UE needs to be defined without additional update signaling for the PUSCH/PDSCH/PUCCH repetition. For example, a UE which has received an indication of the BS energy saving mode may fall back with only one transmission and reception without repetition. By assuming the BS energy saving mode in advance through RRC and predefining the number of repetitive transmissions, the UE may perform transmission according to the predetermined number of repetitive transmissions when the BS energy saving mode is indicated.

These operations may be applied to all of PUSCH/PDSCH/PUCH, or, as another example, may be applied only to semi-static configurations (e.g., CG PUSCH or SPS PDSCH). Alternatively, the most bottle-necked channel may not be applied to PUSCH in consideration of coverage.

Seventh Embodiment

The Seventh Embodiment describes a detailed embodiment of UE operation when a BS energy saving mode with a high correlation to each operation is indicated to the UE during mTRP operation. The mTRP operation is an operation in which the UE transmits and receives data through multiple TRPs.

Figure 22:
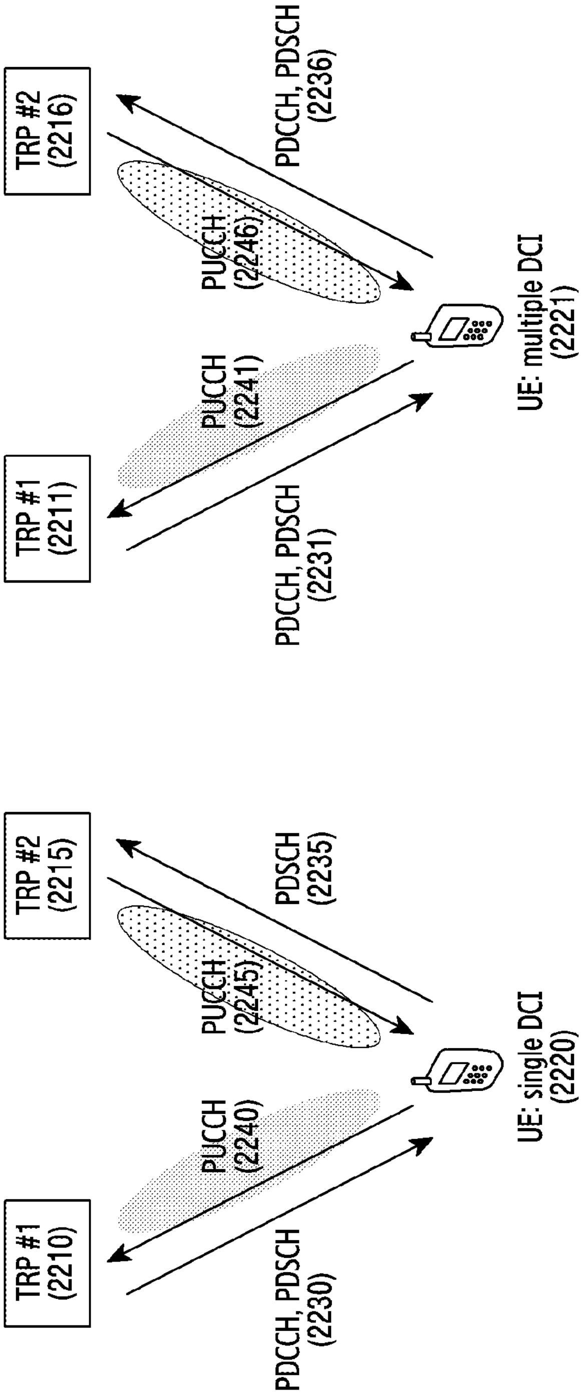
FIG. 22 illustrates a UE operation in which a UE receives single/multiple DCI from two TRPs, respectively according to an embodiment.

FIG. 22 illustrates UE operation in which a UE receives single/multiple DCI from two TRPs, respectively, according to an embodiment.

Referring to FIG. 22, through two TRPs 2210 and 2215 or two TRPs 2211 and 2216, the UE 2220 or 2221 may simultaneously transmit and receive PDSCHs 2230 and 2235 or PDSCHs 2231 and 2236, and PUCCHs 2240 and 2245 or PUCCHs 2241 and 2246 from each TRP. The left diagram of FIG. 22 illustrates when the PDCCH for PDSCH is received at only one TRP (2230), which is referred to as a single DCI at mTRP. However, the PDCCH for the PDSCH may be received at both TRPs 2231 and 2236, as shown in the right diagram of FIG. 22, which may be referred to as multiple DCI at mTRP.

Consider a situation in which the BS energy saving mode is indicated during mTRP operation as previously described. During reception of single DCI at mTRP, the BS energy saving mode may be indicated through two TRPs (when indicated by MAC CE or RRC and, if the BS energy saving mode is indicated by DCI, reception is possible at only one TRP). For example, when the corresponding indication is received from the TRP 2210, the UE may allow the TRP 2210 alone to enter the BS energy saving mode or receive the PDCCH through the TRP 2215. Alternatively, the UE may not perform the mTRP operation from the TRP 2210 and may connect to the TRP 2215. However, when the corresponding indication comes from the TRP 2215, the UE may terminate the connection to the TRP 2215 or receive DCI or the like matching the updated parameters via the PDSCH 2230 (e.g., when the number of TxRUs for the TRP 2215 changes due to the BS energy saving mode for the spatial domain being indicated, updated parameters tailored to the CSI information matching the corresponding TxRU should be transmitted from the TRP 2210).

During reception of multiple DCI at mTRP, the BS energy saving mode may be indicated separately through each TRP. In this case, when the BS energy saving mode is indicated through one TRP, the UE may stop mTRP operation. Alternatively, the UE may perform a single DCI operation to receive DCI through one TRP while continuing to maintain mTRP operation. To this end, a TRP that needs to receive the PDCCH should be defined. Therefore, in the above case, the operations as shown below in Table 54 and Table 55 may be applied as UE operations.

TABLE 54

| |
|---|
| UE monitors PDCCH candidates for CORESET with coresetPoolIndex = X. |

In Table 54, X may indicate the 0th TRP, which is a baseline, or may be pre-configured in a higher layer. Similarly, the same X may be used to describe HARQ-ACK, which may be applied as shown below in Table 55.

TABLE 55

| |
|---|
| And, UE reports HARQ-ACK associated with above CORESET with coresetPoolIndex = X. |

Eighth Embodiment

The Eighth Embodiment describes the operation of a UE after a BS energy saving mode ends.

The end of the BS energy saving mode may be indicated through additional RRC/MAC CE/DCI or may operate based on a timer. Therefore, when the BS energy saving mode ends, the UE needs to transition to a normal mode, and it is necessary to define which configuration for normal mode the UE is to use to determine the transition. For example, when the BS energy saving mode is configured for an extensive period of time, it may be time-consuming to change to the normal mode, which may cause channel state changes, etc. To this end, it is most reliable for the BS to transmit detailed configuration information through RRC or the like. However, when the BS energy saving mode is configured for a short period of time, it does not take a long time to change to the normal mode, and thus additional signaling consumed by the BS may operate as an overhead. Therefore, to reduce this overhead, there may be an operation in which the UE stores the configuration for the normal mode preconfigured by the BS, even if the BS energy saving mode is indicated, and then returns to a previous RRC configuration.

In a combination of the two methods, if there is additional configuration information such as RRC after the BS energy saving mode ends, the corresponding configuration information may be used. Otherwise, the previous RRC configuration information may be applied to allow the UE to operate in the normal mode.

Figure 23:
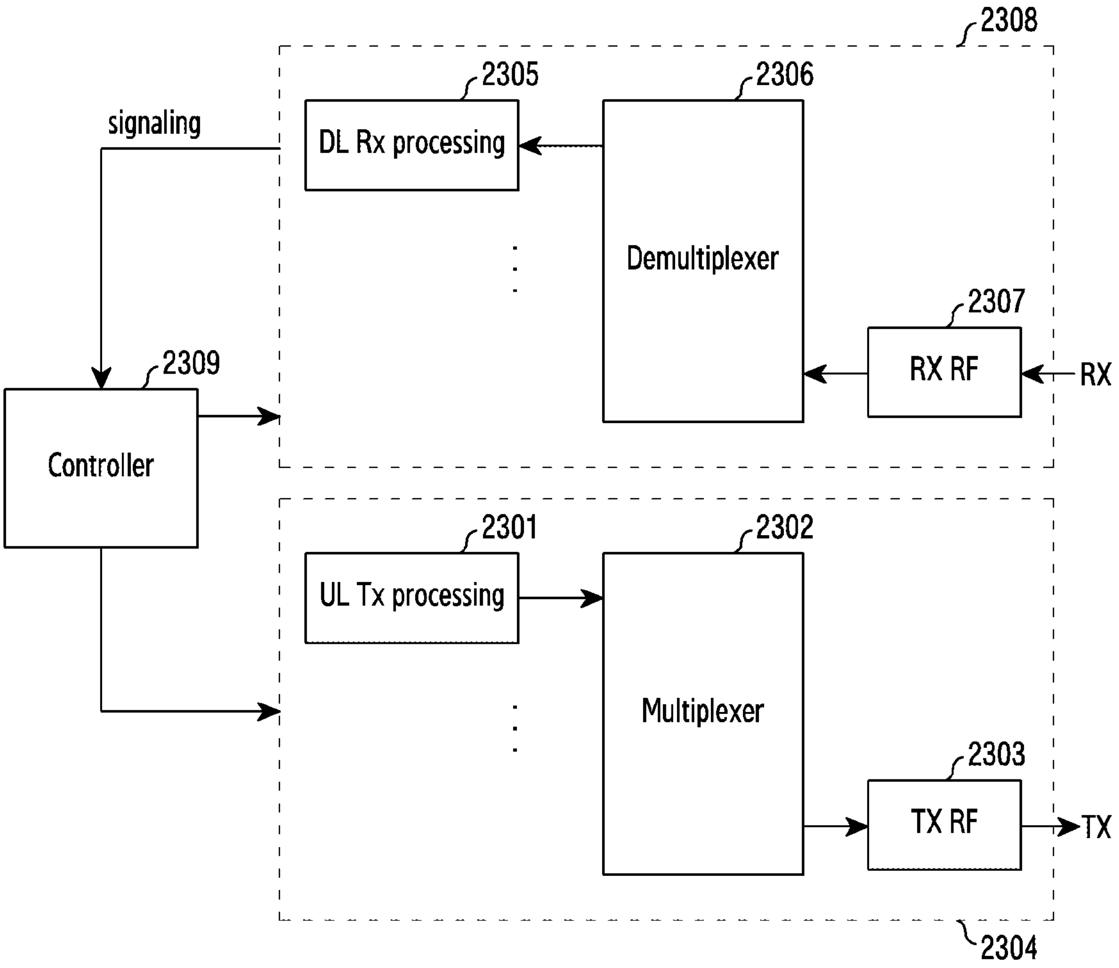
FIG. 23 illustrates a transmission/reception device of a UE according to an embodiment.

FIG. 23 illustrates a transmission/reception device of a UE in a wireless communication system according to an embodiment.

Referring to FIG. 23, the UE may include a transmitter 2304 including a UL transmission processing block 2301, a multiplexer 2302, and a transmission radio frequency (RF) block 2303, a receiver 2308 including a DL reception processing block 2305, a demultiplexer 2306, a reception RF block 2307, and a controller 2309. The controller 2309 may control the respective components of the receiver 2308 for receiving the data channel or control channel transmitted by a BS as described above, and the respective components of the transmitter 2304 for transmitting the UL signal.

In the transmitter 2304 of the UE, the UL transmission processing block 2301 may perform processes such as channel coding and modulation to generate a signal to be transmitted. The signal generated by the UL transmission processing block 2301 may be multiplexed with other uplink signals by the multiplexer 2302, subjected to signal processing in the transmission RF block 2303, and then transmitted to the BS.

The receiver 2308 of the UE demultiplexes the signal received from the BS and distributes the demultiplexed signal to the respective downlink reception processing blocks. The DL reception processing block 2305 may perform processes such as demodulation, channel decoding, and the like on the DL signal of the BS to obtain control information or data transmitted by the BS. The UE receiver 2308 may support the operation of the controller 2309 by applying the output result of the DL reception processing block to the controller 2309.

Figure 24:
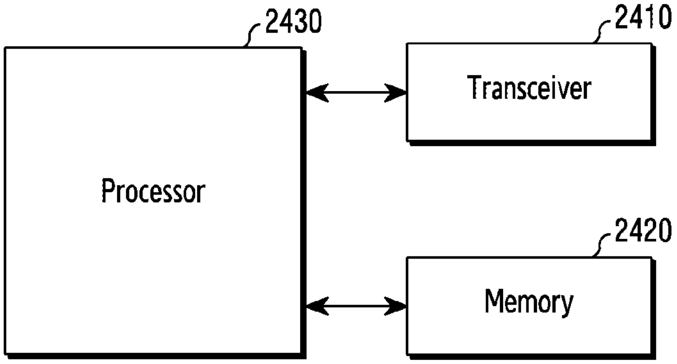
FIG. 24 illustrates the configuration of a UE according to an embodiment.

FIG. 24 illustrates the configuration of a UE according to an embodiment.

Referring to FIG. 24, a UE of the disclosure may include a processor 2430, a transceiver 2410, and a memory 2420. However, the elements of the UE are not limited to the aforementioned examples. For example, the UE may include more or fewer elements than the aforementioned elements. The processor 2430, the transceiver 2410, and the memory 2420 may be implemented on a single chip. The transceiver 2410 of FIG. 24 may include the transmitter 2304 and the receiver 2308 of FIG. 23. Additionally, the processor 2430 of FIG. 24 may include the controller 2309 of FIG. 23.

The processor 2430 may control a series of processes to enable the ULE to operate according to an embodiment described herein. For example, the processor 2430 may control elements of the UE to perform transmission/reception methods of the ULE depending on whether the BS mode is a BS energy saving mode or a BS normal mode, according to an embodiment of the disclosure. There may be one or more processors 2430, and the processor 2430 may execute a program stored in the memory 2420 to perform the transmission and reception operations of the UE in a wireless communication system applying the carrier bundle of the disclosure described above.

The transceiver 2410 may transmit and receive signals to and from a BS. The signals to and from the BS may include control information and data. The transceiver 2410 may include an RF transmitter that up-converts and amplifies the frequency of a signal being transmitted, and an RF receiver that low-noise amplifies and down-converts the frequency of a signal being received. However, the elements of the transceiver 2410 are not limited to the RF transmitter and RF receiver. The transceiver 2410 may also receive signals through a wireless channel, output the signals to the processor 2430, and may transmit signals output from the processor 2430 through the wireless channel.

The memory 2420 may store programs and data required for operation of the UE. The memory 2420 may store control information or data included in signals transmitted or received by the UE. The memory 2420 may include a storage medium, such as read only memories (ROMs), random access memories (RAMs), hard disks, compact disc (CD)-ROMs, and digital versatile discs (DVDs), or a combination of storage media. In addition, a plurality of the memory 2420 may be provided. The memory 2420 may store programs for performing transmission and reception operations of the UE depending on whether the BS mode is a BS energy saving mode or a BS normal mode, which are embodiments of the disclosure described above.

Figure 25:
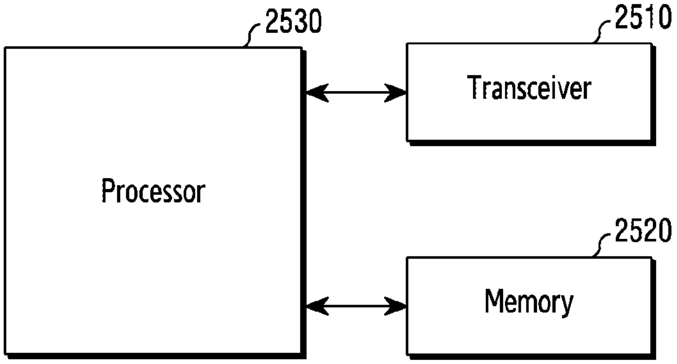
FIG. 25 illustrates the configuration of a BS according to an embodiment.

FIG. 25 illustrates the configuration of a BS according to an embodiment.

Referring to FIG. 25, a BS may include a processor 2530, a transceiver 2510, and a memory 2520. However, the elements of the BS are not limited to the foregoing examples. For example, the BS may include more or fewer elements than the aforementioned elements. Additionally, the processor 2530, transceiver 2510, and memory 2520 may be implemented on a single chip.

The processor 2530 may control a series of processes to enable the BS to operate in accordance with embodiments of the disclosure. For example, the processor 2530 may control elements of the BS to perform a method of scheduling UEs based on whether the BS mode is a BS energy saving mode or a BS normal mode. The processor 2530 may be one or more, and the processor 2530 may execute a program stored in the memory 2520 to perform the method of scheduling the UE based on whether the BS mode is a BS energy saving mode or a BS normal mode.

The transceiver 2510 may transmit and receive signals to and from the UE. The signals to and from the UE may include control information and data. The transceiver 2510 may include an RF transmitter that up-converts and amplifies the frequency of a signal being transmitted, and an RF receiver that down-converts and low-noise amplifies the frequency of a signal being received. However, the elements of the transceiver 2510 are not limited to the RF transmitter and RF receiver. The transceiver 2510 may receive signals through a wireless channel, output the signals to the processor 2530, and transmit the signals output from the processor 2530 through the wireless channel.

The memory 2520 may store programs and data required for operation of the BS. Additionally, the memory 2520 may store control information or data included in signals transmitted or received by the BS. The memory 2520 may include a storage medium, such as ROMs, RAMs, hard disks, CD-ROMs, and DVDs, or a combination of storage media. The memory 2520 may store a program for performing the methods of scheduling a UE based on whether the BS mode is a BS energy saving mode or a BS normal mode, as described herein.

Herein, each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a user equipment (UE) in a wireless communication system, the method comprising:

receiving, from a base station, information for operating in a normal mode, wherein the UE performs a carrier aggregation (CA), a dual connectivity (DC), multiple downlink control information (DCI) reception, or repetition transmission and reception in the normal mode;

receiving, from the base station, an indicator indicating a base station energy saving mode, while operating in the normal mode based on the information; and operating in the base station energy saving mode based on the indicator after a delay based on a UE capability, wherein, in case that the normal mode has a correlation to the base station energy saving mode indicated by the indicator, the method further comprises disabling operating in the normal mode, irrespective of the information for operating in the normal mode, wherein, in case that the normal mode has no correlation to the base station energy saving mode indicated by the indicator, the normal mode is maintained, wherein, in case that the information configures the repetition transmission and reception, and the base station energy saving mode is for time domain energy saving, the disabling of the operating in the normal mode comprises performing a fallback from the repetition transmission and reception to a single transmission and reception, and wherein, in case that the information configures the repetition transmission and reception, and the base station energy saving mode is for spatial domain energy saving, the normal mode is maintained.

2. The method of claim 1, further comprising:

in case that the information configures the multiple DCI reception from a plurality of transmission and reception points (TRPs) and the normal mode is maintained, identifying a designated TRP of the plurality of TRPs based on the indicator, wherein a single DCI is received from the designated TRP.

3. The method of claim 2, wherein the indicator comprises a coresetPoolIndex indicating the designated TRP among the plurality of TRPs.

4. The method of claim 2, further comprising:

monitoring a physical downlink control channel corresponding to the designated TRP.

5. The method of claim 1, wherein, in case that the information configures the CA or the DC operating in the base station energy saving mode comprises operating in the base station energy saving mode for a primary cell (PCell), wherein the indicator is received from the PCell.

6. The method of claim 5, wherein operating in the base station energy saving mode further comprises operating in the base station energy saving mode for a secondary cell (SCell).

7. The method of claim 5, further comprising: performing a secondary cell (SCell) deactivation for a designated SCell, wherein the indicator comprises information on the designated SCell.

8. The method of claim 1, wherein, in case that the information configures the CA or the DC, the indicator is received from a designated secondary cell (SCell) among a plurality of SCells, and wherein the disabling of the operating in the normal mode comprises performing SCell deactivation for the designated SCell.

9. The method of claim 1, wherein the indicator is received via radio resource control signaling, medium access control-control element signaling or downlink control information signaling.

10. A user equipment (UE), comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, information for operating in a normal mode, wherein the UE performs a carrier aggregation (CA), a dual connectivity (DC), multiple downlink control information (DCI) reception, or repetition transmission and reception; in the normal mode;

receive, from the base station, an indicator indicating a base station energy saving mode, while operating in the normal mode based on the information; and operate in the base station energy saving mode based on the indicator after a delay based on a UE capability, wherein, in case that the normal mode has a correlation to the base station energy saving mode indicated by the indicator, the instructions further cause the UE to disable operating in the normal mode, irrespective of the information for operating in the normal mode, wherein, in case that the normal mode has no correlation to the base station energy saving mode indicated by the indicator, the normal mode is maintained, wherein, in case that the information configures the repetition transmission and reception, and the base station energy saving mode is for time domain energy saving, the instructions further cause the UE to perform a fallback from the repetition transmission and reception to a single transmission and reception to disable the operating in the normal mode, and wherein, in case that the information configures the repetition transmission and reception, and the base station energy saving mode is for spatial domain energy saving, the normal mode is maintained.

11. The UE of claim 10, wherein, in case that the information configures the multiple DCI reception from a plurality of transmission and reception points (TRPs) and the normal mode is maintained, the instructions further cause the UE to:

identify a designated TRP of the plurality of TRPs based on the indicator, and receive a single DCI from the designated TRP.

12. The UE of claim 11, wherein the indicator comprises a coresetPoolIndex indicating the designated TRP among the plurality of TRPs.

13. The UE of claim 11, wherein the instructions further cause the UE to monitor a physical downlink control channel corresponding to the designated TRP.

14. The UE of claim 10, wherein, in case that the information configures the CA or the DC, the instructions further cause the UE to operate in the base station energy saving mode for a primary cell (PCell), and wherein the indicator is received from the PCell.

15. The UE of claim 14, wherein the instructions further cause the UE to operate in the base station energy saving mode for a secondary cell (SCell).

16. The UE of claim 14, wherein the instructions further cause the UE to perform secondary cell (SCell) deactivation for a designated SCell, and wherein the indicator comprises information on the designated SCell.

17. The UE of claim 10, wherein, in case that the information configures the CA or the DC, the indicator is received from a designated secondary cell (SCell) among a plurality of SCells, and wherein the instructions further cause the UE to perform SCell deactivation for the designated SCell to disable the operating in the normal mode.

18. The UE of claim 10, wherein the indicator is received via radio resource control signaling, medium access control-control element signaling or downlink control information signaling.

* * * * *